United States Patent
Fujinami

(10) Patent No.: US 10,524,163 B2
(45) Date of Patent: Dec. 31, 2019

(54) BASE STATION, COMMUNICATION TERMINAL, COMMUNICATION METHOD, COMMUNICATION SYSTEM, AND STORAGE MEDIUM

(71) Applicant: NEC CORPORATION, Tokyo (JP)

(72) Inventor: Makoto Fujinami, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 223 days.

(21) Appl. No.: 15/528,156

(22) PCT Filed: Nov. 19, 2015

(86) PCT No.: PCT/JP2015/005789
§ 371 (c)(1),
(2) Date: May 19, 2017

(87) PCT Pub. No.: WO2016/079990
PCT Pub. Date: May 26, 2016

(65) Prior Publication Data
US 2017/0332278 A1  Nov. 16, 2017

(30) Foreign Application Priority Data
Nov. 21, 2014  (JP) ................................. 2014-236079

(51) Int. Cl.
*G06F 15/16* (2006.01)
*H04W 28/08* (2009.01)
(Continued)

(52) U.S. Cl.
CPC ........ *H04W 28/08* (2013.01); *G06F 9/45558* (2013.01); *H04W 36/12* (2013.01); *H04W 36/22* (2013.01); *G06F 2009/45595* (2013.01)

(58) Field of Classification Search
USPC .................... 709/227, 220, 222, 221, 228
See application file for complete search history.

(56) References Cited

U.S. PATENT DOCUMENTS 8,620,376 B2 * 12/2013 Kwon .................. H04W 76/11
455/552.1
9,860,800 B2 *  1/2018 Van Lieshout ... H04W 36/0055
(Continued)

FOREIGN PATENT DOCUMENTS

EP          2844025 A1    3/2015
JP       2010-506468 A    2/2010
(Continued)

OTHER PUBLICATIONS

International Search Report of PCT/JP2015/005789 dated Jan. 26, 2016 [PCT/ISA/210].
(Continued)

*Primary Examiner* — Lan Dai T Truong
(74) *Attorney, Agent, or Firm* — Sughrue Mion, PLLC

(57) ABSTRACT

A base station for offloading communication traffic includes: first means for receiving from a communication terminal a message requesting a connection with a wireless network; and second means for determining whether or not a connection between a base station which has received the message from the communication terminal and the communication terminal is possible based on a terminal attribute identified by the message.

15 Claims, 36 Drawing Sheets

(51) Int. Cl.
*G06F 9/455* (2018.01)
*H04W 36/12* (2009.01)
*H04W 36/22* (2009.01)

(56) References Cited

U.S. PATENT DOCUMENTS

| | | | |
|---|---|---|---|
| 2008/0084272 A1 | 4/2008 | Modiano | |
| 2013/0237267 A1* | 9/2013 | Lee | H04W 76/10 |
| | | | 455/509 |
| 2013/0309999 A1 | 11/2013 | Modiano | |
| 2014/0057670 A1* | 2/2014 | Lim | H04W 8/005 |
| | | | 455/509 |
| 2014/0211728 A1 | 7/2014 | Zembutsu et al. | |
| 2014/0314048 A1 | 10/2014 | Yi et al. | |
| 2015/0195743 A1* | 7/2015 | Sirotkin | H04W 28/08 |
| | | | 370/235 |
| 2015/0312822 A1 | 10/2015 | Bangolae et al. | |
| 2017/0111878 A1* | 4/2017 | Wang | H04W 48/20 |
| 2017/0111954 A1* | 4/2017 | Wilhelmsson | H04W 64/006 |

FOREIGN PATENT DOCUMENTS

| | | |
|---|---|---|
| JP | 2014-512580 A | 5/2014 |
| JP | 2017-514352 A | 6/2017 |
| WO | 2008040391 A1 | 4/2008 |
| WO | 2012/137402 A1 | 10/2012 |
| WO | 2013/047822 A1 | 4/2013 |
| WO | 2013/137629 A1 | 9/2013 |
| WO | 2013159648 A1 | 10/2013 |
| WO | 2014130091 A1 | 8/2014 |
| WO | 2014/171716 A1 | 10/2014 |
| WO | 2015/167722 A1 | 11/2015 |

OTHER PUBLICATIONS

Written Opinion of PCT/JP2015/005789 dated Jan. 26, 2016 [PCT/ISA/237].
Communication Jun. 25, 2018, issued by the European Patent Office in corresponding European Application No. 15860663.2.
Notice of Reasons for Refusal dated Aug. 20, 2019 issued by the Japanese Patent Office in counterpart application No. 2016-560066.

* cited by examiner

BASE STATION, COMMUNICATION TERMINAL, COMMUNICATION METHOD, COMMUNICATION SYSTEM, AND STORAGE MEDIUM

CROSS REFERENCE TO RELATED APPLICATIONS

This application is a National Stage of International Application No. PCT/JP2015/005789, filed Nov. 19, 2015, claiming priority based on Japanese Patent Application No. 2014-236079, filed Nov. 21, 2014, the contents of all of which are incorporated herein by reference in their entirety.

TECHNICAL FIELD

The present invention relates to a base station, a communication terminal, a communication method, a communication system, and a storage medium used for communication.

BACKGROUND ART

In recent years, due to spread of smartphones, smart devices, or the like, communication traffic is rapidly increasing. It is assumed that Machine to Machine (M2M) communication will increase in the future, and the communication traffic may further increase.

In order to alleviate network congestion due to a sudden increase in communication traffic, techniques for offloading communication traffic are being studied.

For example, PTL 1 discloses a technique for offloading communication traffic by switching a plurality of types of wireless methods (such as cellular communication and wireless Local Area Network (LAN)) according to the state of network congestion. In PTL 1, traffic is offloaded, for example, by switching the traffic of the cellular communication to the wireless LAN network.

CITATION LIST

Patent Literature

[PTL 1] Japanese Unexamined Patent Application Publication No. 2009-118356

SUMMARY OF INVENTION

Technical Problem

In PTL 1, communication traffic is offloaded by switching paths of communication traffic between different wireless systems.

However, depending on the attribute/type of a terminal, for example, the terminal may be not able to access a plurality of types of wireless systems. In such cases, offloading of communication traffic by the technique of PTL 1 becomes difficult.

An object of the present invention is to provide a new traffic offloading technique.

Solution to Problem

A base station according to one aspect of the present invention is characterized by comprising: first means for receiving from a communication terminal a message requesting a connection with a wireless network; and second means for determining whether or not a connection between a base station which has received the message from the communication terminal and the communication terminal is permitted based on a terminal attribute identified by the message.

A communication terminal according to one aspect of the present invention is a communication terminal which communicates with a wireless network, characterized by comprising: first means for receiving broadcast information on a base station from the wireless network; and second means for transmitting a message requesting a connection with the wireless network to a base station corresponding to an attribute of the communication terminal based on the broadcast information.

A communication method according to one aspect of the present invention is characterized by comprising: receiving from a communication terminal a message requesting a connection with a wireless network; and determining whether or not a connection between a base station which has received the message from the communication terminal and the communication terminal is permitted based on a terminal attribute identified by the message.

A communication system according to one aspect of the present invention is characterized by comprising: a communication terminal for transmitting a message requesting a connection with a wireless network; and a base station for determining whether or not a connection between a base station which has received the message from the communication terminal and the communication terminal is permitted based on a terminal attribute identified by the message received from the communication terminal.

A storage medium is characterized by storing a program causing a computer to execute: a process for receiving from a communication terminal a message requesting a connection with a wireless network; and a process for determining whether or not a connection between a base station which has received the message from the communication terminal and the communication terminal is permitted based on a terminal attribute identified by the message.

Advantageous Effects of Invention

The present invention makes it possible to provide a new traffic offloading technique.

DESCRIPTION OF EMBODIMENTS

Figure 1:
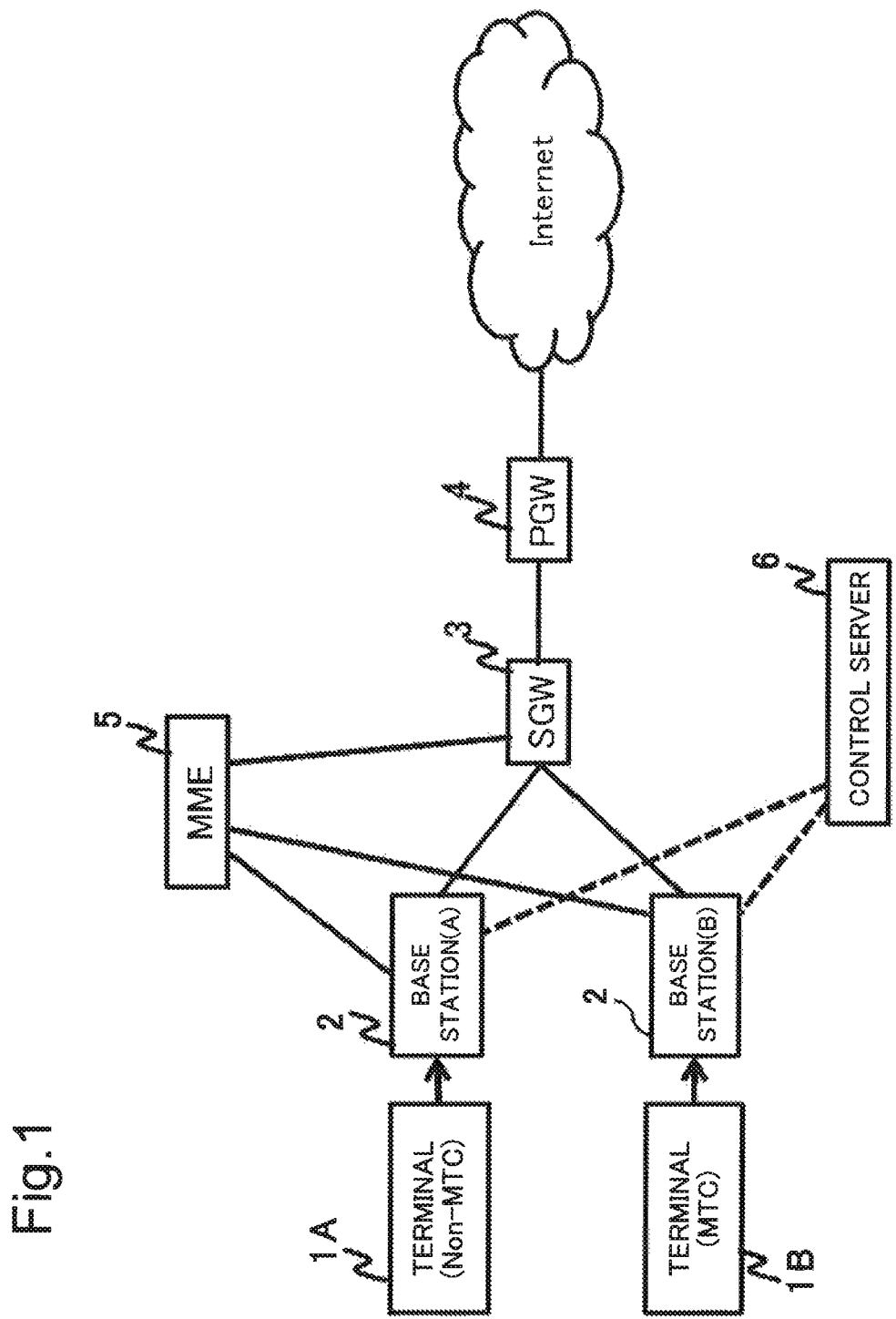
FIG. 1 is a diagram illustrating a configuration example of a communication system according to a first exemplary embodiment.

Hereinafter, exemplary embodiments of the present invention will be described. Each exemplary embodiment is an example, and the present invention is not limited to each exemplary embodiment.

First Exemplary Embodiment

Hereinafter, an example of a communication system of Long Term Evolution (LTE) will be described as a communication system according to the present exemplary embodiment. However, the communication system to which the present invention is applied is not limited to LTE. For example, the present invention can also be applied to General Packet Radio Service (GPRS), Universal Mobile Telecommunication System (UMTS), Worldwide Interoperability for Microwave Access (WiMAX), and the like.

A first exemplary embodiment of the present invention will be described with reference to the drawings. The reference numerals attached to the drawings attached to this summary have been added to each element for convenience as an example to aid understanding, and the description of this summary is not intended to be limited in any way.

FIG. 1 illustrates a configuration example of a communication system according to the first exemplary embodiment. In FIG. 1, examples of a communication system according to the first exemplary embodiment includes a terminal 1 such as a mobile phone, Personal Computer (PC), a mobile router, a smart device (such as a smart meter to monitor home power consumption, a smart television, or a wearable terminal), Machine to Machine (M2M) device or the like. Examples of the M2M device include, in addition to the above devices, industrial equipment, a car, healthcare equipment, home appliances. The direction of the arrow in the drawing is an example and does not limit the direction of a signal between blocks.

The communication system of the first exemplary embodiment comprises a terminal 1 and a plurality of network nodes (base station (eNB) 2, Serving Gateway (SGW) 3, PDN Gateway (PGW) 4, Mobility Management Entity (MME) 5) for providing a communication service to the terminal 1. Each network node is, for example, a communication device having a predetermined communication function.

The terminal 1, for example, is connected to a base station 2, and accesses a network such as the Internet via an SGW 3 and a PGW 4.

Each network node illustrated in FIG. 1 executes predetermined signal processing. Each network node includes, for example, the following functions relating to signal processing.

PGW 4:
Function to process packets (User-Plane Function)
Function to manage accounting status according to communication (PCEF: Policy and Charging Enforcement Function)
Function to control policies such as QoS (PCRF: Policy and Charging Rule Function)

SGW 3:
Function to process packets (User-Plane Function)
Function to process control signaling (C-Plane Function)

Lawful interception (LI) function for intercepting communications

MME 5:

Function to process control signaling (C-Plane Function)

Function to manage information about a subscriber of a communication system in cooperation with a Home Subscriber Server (HSS)

The communication system of the first exemplary embodiment can, based on a terminal attribute of a terminal 1, select a base station 2 to be connected to the terminal 1. The terminal attribute of the terminal 1 indicate, for example, whether or not the terminal 1 is a Machine Type Communication (MTC) device. The terminal attribute may indicate the type of the terminal 1, whether or not the terminal 1 belongs to a predetermined MTC device group, or the like.

An MTC device is, for example, a smart device (for example, a smart meter that monitors power consumption at home, a smart television, or a wearable terminal), an industrial device, a car, a healthcare device, or a household appliance. An MTC means a mode of data communication which does not necessarily need human intervention such as a smart meter. In other words, an MTC device can autonomously communicate with a communication partner's device. Standardization of MTC is being standardized in a technical standard specification (3rd Generation Partnership Project (3 GPP) TS 22.368 or the like). It is assumed that an MTC device communicates at a specified time (for example, "Daily at 12:00 p.m.", "Every Friday at 3:00 a.m.", or the like). In this case, it is assumed that many similar MTC devices (such as smart meters) start communication at the same time and a large amount of communication traffic occurs at a certain time. It is assumed that such a large amount of communication traffic, for example, causes a delay in wireless communication between the terminal 1 and the base station 2.

Therefore, in the communication system of the first exemplary embodiment, a base station 2(B) for an MTC device (a terminal 1B) is provided, and communication traffic from the terminal 1B which is the MTC device is offloaded to the base station 2(B). Therefore, the communication traffic from the terminal 1 is distributed to a plurality of base stations 2, and a delay of wireless communication between the terminal 1 and the base station 2 can be reduced. If the wireless systems of a base station 2(A) and the base station 2(B) are the same, communication traffic is offloaded even if the terminal 1 does not support a plurality of wireless systems. Therefore, the communication system of the first exemplary embodiment can offload communication traffic without depending on a communication system supported by the terminal 1.

In the communication system of the first embodiment, for example, the base station 2(B) is a base station tuned for an MTC device. For example, the base station 2(B) is a base station for which parameters such as "Inactivity Timer" are set for the MTC device. The base station 2 disconnects a connection with the terminal 1 after a lapse of a certain period of time since the data communication of the terminal 1 has ended and the state is changed to a non-communication state. "Inactivity Timer" is a timer until the base station 2 disconnects a connection with the terminal 1. For example, "Inactivity Timer" of the base station 2(B) is set according to communication characteristics and movement characteristics of the MTC device (the terminal 1B). For example, "Inactivity Timer" of the base station 2(B) is set longer than "Inactivity Timer" of the other base station 2 for the MTC device (the terminal 1B) with a small moving amount (or no movement).

Since "Inactivity Timer" is set for an MTC device, the number of times the base station 2 executes disconnection processing and connection processing of communication with the terminal 1 is suppressed. Therefore, control signaling that occurs when the terminal 1 connects to the base station 2 is suppressed, and load on a communication system is reduced.

The base station 2 (the base station 2(B)) for an MTC device may be, for example, a Femto-Cell base station. A Femto-Cell base station is a base station that covers an area of a radius of about several meters to several tens of meters which is narrower than the cell size of a normal base station (a Macro-Cell). Femto-Cell base stations are installed, for example, in buildings, in houses, underground malls, or the like for the purpose of improving communication quality and communication speed.

For example, it is assumed that a smart device such as a smart meter is installed in a range in which the device can communicate with a Femto-Cell base station installed in a house. In this case, for example, offloading communication traffic of a smart device (for example, the terminal 1B) to the Femto-Cell base station reduces the delay of the wireless communication of a normal base station (a Macro-Cell).

As illustrated in FIG. 1, the communication system of the first exemplary embodiment may comprise a control server 6. A control server 6 is, for example, a Self Organizing Network (SON) server. The control server 6 controls a connection between the terminal 1 and the base station 2, for example, by using Mobility Load Balancing (MLB). The MLB is a technique of distributing load of wireless communication by causing a terminal to hand over between base stations.

Figure 2:
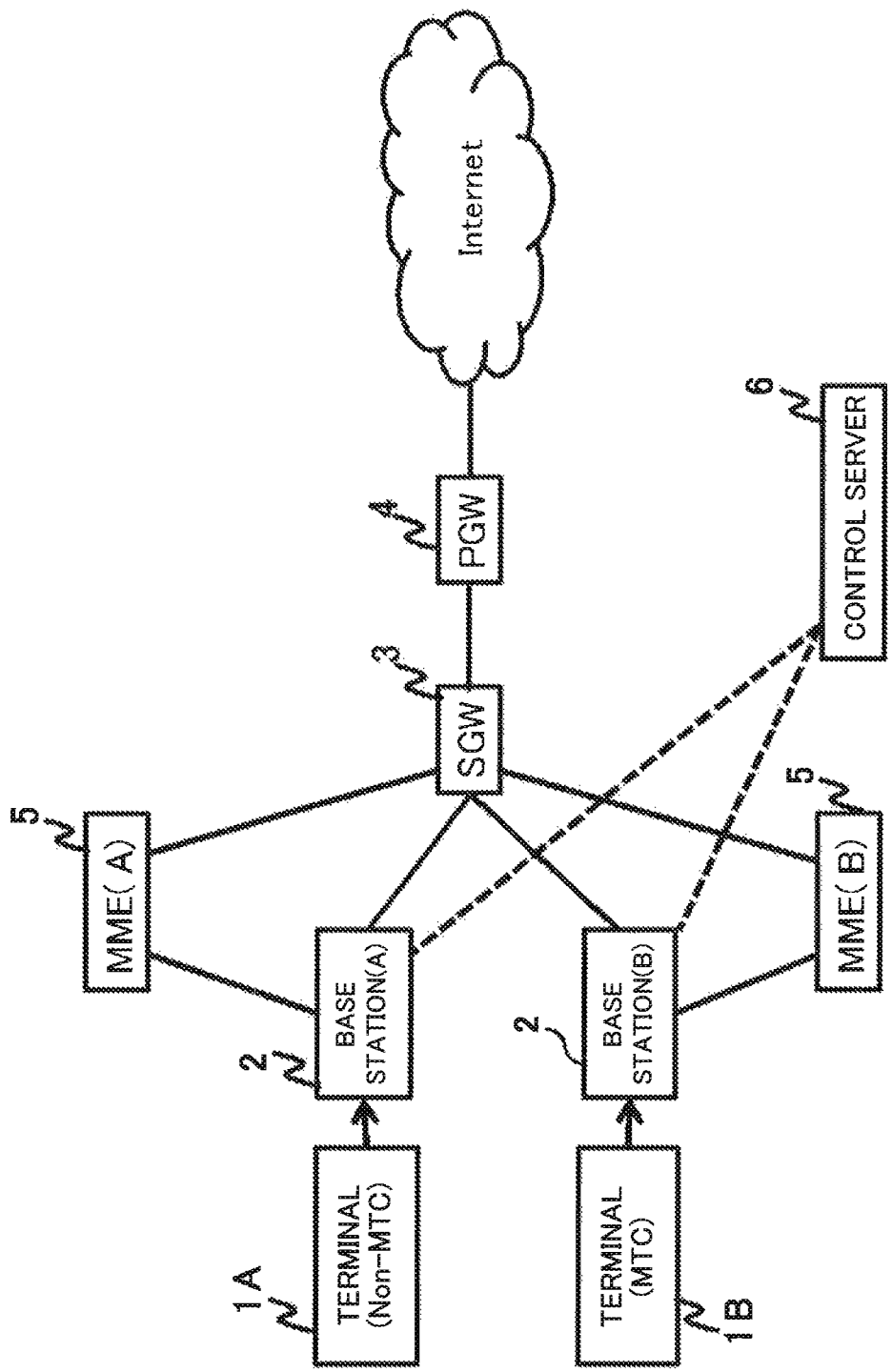
FIG. 2 is a diagram illustrating another configuration example of a communication system according to the first exemplary embodiment.

FIG. 2 illustrates another configuration example of the communication system of the first exemplary embodiment. In FIG. 2, the communication system of the first exemplary embodiment comprises a plurality of MMEs (an MME 5(A) and an MME 5(B)). In the example of FIG. 2, the MME 5(A) processes control signaling related to the base station 2(A) and the terminal 1 connected to the base station 2(A). On the other hand, in the example of FIG. 2, the MME 5 (B) processes control signaling relating to the terminal 1 (for example, an MTC device) connected to the base station 2(B) and the base station 2(B). The direction of the arrow in the drawing is an example and does not limit the direction of a signal between blocks.

In the example of FIG. 2, control signaling transmitted from the base station 2 is distributed to a plurality of MMEs 5. Therefore, load of the MME 5 needed for control signaling processing is reduced.

Figure 3:
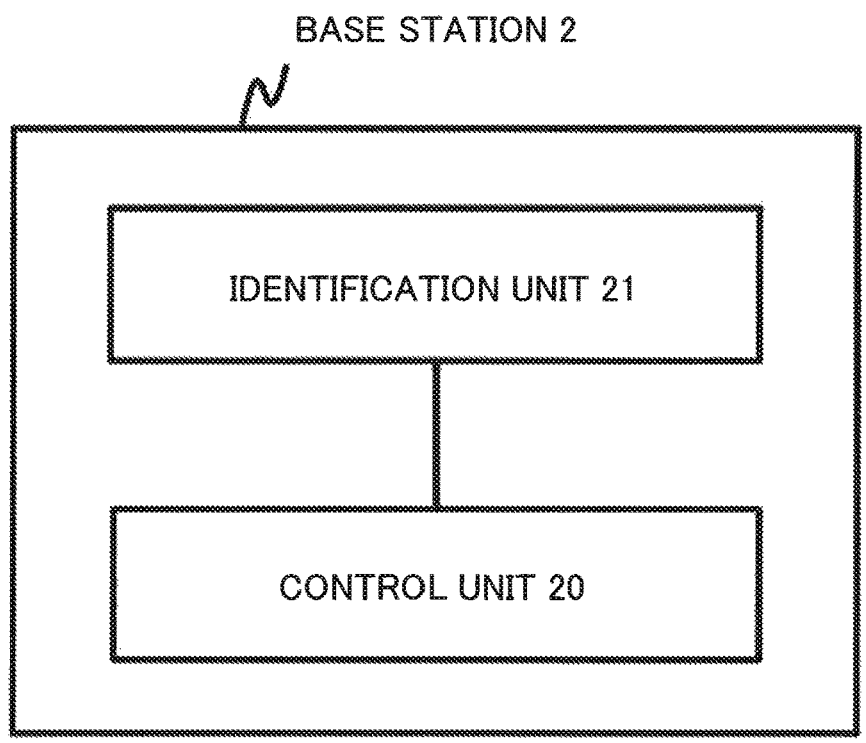
FIG. 3 is a diagram illustrating a configuration example of a base station 2 according to the first exemplary embodiment.

FIG. 3 illustrates a configuration example of the base station 2 in the first exemplary embodiment. As illustrated in FIG. 3, the base station 2 includes a control unit 20 and an identification unit 21.

The identification unit 21 identifies the type of communication traffic and the attribute/type of the terminal 1. For example, the identification unit 21 can identify the type of communication traffic and the type of the terminal 1 based on a predetermined identification policy. For example, an identification policy of the identification unit 20 is changed dynamically. For example, a network operator can dynamically change the identification policy.

The control unit 20 can control a connection between the terminal 1 and the base station 2 based on the type of communication traffic identified by the identification unit 21 and the attribute/type of the terminal 1. For example, the control unit 20 can control a connection between the terminal 1 and the base station 2 based on a predetermined control policy. For example, when the terminal 1 is an MTC device, a control policy indicating that the terminal 1 is connected to another base station 2 is set to the base station 2(A) for a non-MTC device. For example, when the terminal 1 is a non-MTC device, a control policy indicating that the terminal 1 is permitted to connect to the base station 2(A) is set to the base station 2(A) for the non-MTC device.

For example, when the terminal 1 is an MTC device, a control policy indicating connecting to the terminal 1 and establishing a session between the terminal 1 and a network is set to the base station 2(B) for an MTC device. For example, when the terminal 1 is a non-MTC device, a control policy indicating that the terminal 1 is connected to another base station 2 is set to the base station 2(B) for an MTC device.

For example, the control unit 20 can connect the terminal 1 to another base station 2 based on the type of communication traffic identified by the identification unit 21 and the attribute/type of the terminal 1. The control unit 20 can also connect the terminal 1 to a network based on the type of communication traffic identified by the identification unit 21 and the attribute/type of the terminal 1.

For example, the identification unit 21 identifies whether or not the terminal 1 is an MTC device. The identification unit 21 determines whether or not the terminal 1 is an MTC device, for example, based on information on the attribute of the terminal 1 included in a connection request received from the terminal 1. The connection request is, for example, a control signal "RRC Connection Request" defined in the 3GPP technical specification. The "RRC Connection Request" includes information on the priority of the terminal 1. For example, when the terminal 1 has low priority, the identification unit 21 determines that the terminal 1 is an MTC device. When the terminal 1 has low priority, for example, "RRC Connection Request" includes "LAPI: Low Access Priority Indicator". For example, when "LAPI" is included in "RRC Connection Request", the identification unit 21 determines that the terminal 1 is an MTC device.

The control unit 20 controls a connection between the terminal 1 and the base station 2, for example, based on a control policy set in the base station 2. For example, when the terminal 1 is an MTC device, the control unit 20 executes control according to a control policy. For example, when the terminal 1 is an MTC device, the control unit 20 rejects the connection request and can instruct the terminal 1 to connect to another base station 2 (for example, the base station 2 for an MTC device). When rejecting the connection request, the control unit 20 can notify the terminal 1 of the information on the base station 2 for an MTC device. The information on the base station 2 for an MTC device may be, for example, a list (a cell list) in which a plurality of base stations 2 for an MTC device are described.

For example, when the terminal 1 is an MTC device, the control unit 20 establishes a wireless connection with the terminal 1, and the terminal 1 can start processing for establishing a communication session with a network node. The control unit 20 can transmit a Non-Access Stratum (NAS) message to the MME 5 in order to establish a communication session.

For example, the identification unit 21 can identify whether or not communication traffic corresponds to an MTC-related application. For example, when communication traffic corresponds to an MTC-related application, the control unit 20 can instruct the terminal 1 to reconnect to another base station 2. When rejecting the connection request, the control unit 20 can notify the terminal 1 of the information on the base station 2 for an MTC device. For example, when communication traffic corresponds to an MTC-related application, the control unit 20 can transfer the communication traffic via the communication session established for the terminal 1.

Figure 4:
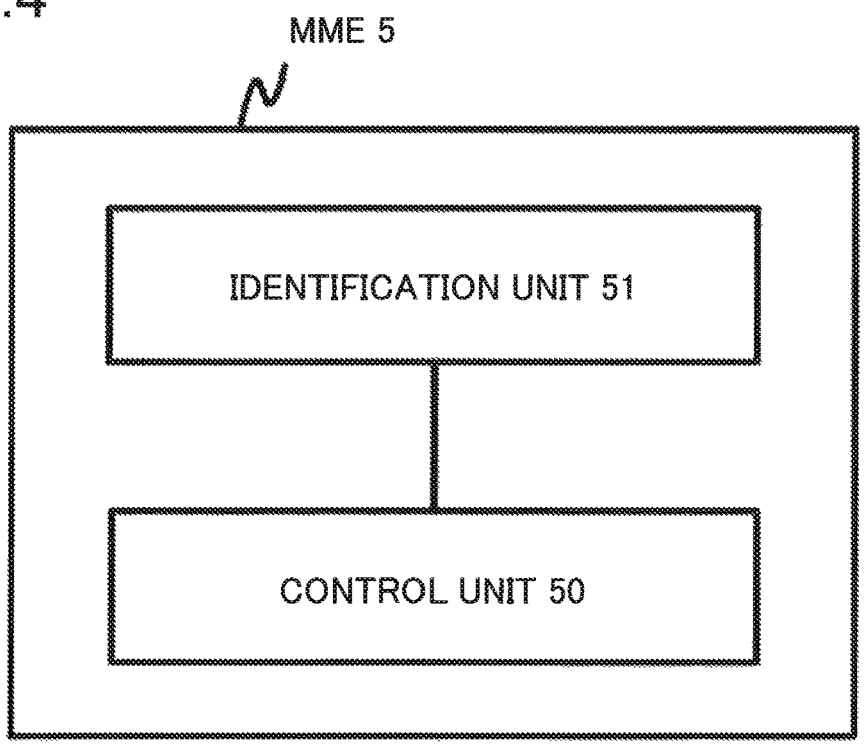
FIG. 4 is a diagram illustrating a configuration example a Mobility Management Entity (MME) 5 according to the first exemplary embodiment.

FIG. 4 illustrates a configuration example of the MME 5 in the first embodiment. The MME 5 includes a control unit 50 and an identification unit 51.

The identification unit 51 can identify the type of communication traffic and the attribute/type of the terminal 1 based on a NAS message received from the base station 2. Since the function of the identification unit 51 is similar to that of the identification unit 21, a detailed description thereof will be omitted.

The control unit 50 can control a connection between the terminal 1 and the base station 2 based on the type of communication traffic identified by the identification unit 51 and the attribute/type of the terminal 1. For example, the control unit 50 can control a connection between the terminal 1 and the base station 2 based on a predetermined control policy. For example, when the terminal 1 is an MTC device, a control policy indicating that the terminal 1 is connected to the base station 2 for an MTC device is set in the MME 5. For example, when the terminal 1 is an MTC device, a control policy indicating establishment of a session between the terminal 1 and the network is set in the MME 5.

For example, when the terminal 1 is an MTC device, the control unit 50 can notify the base station 2 of an instruction to reconnect the terminal 1 to another base station 2.

Figure 5:
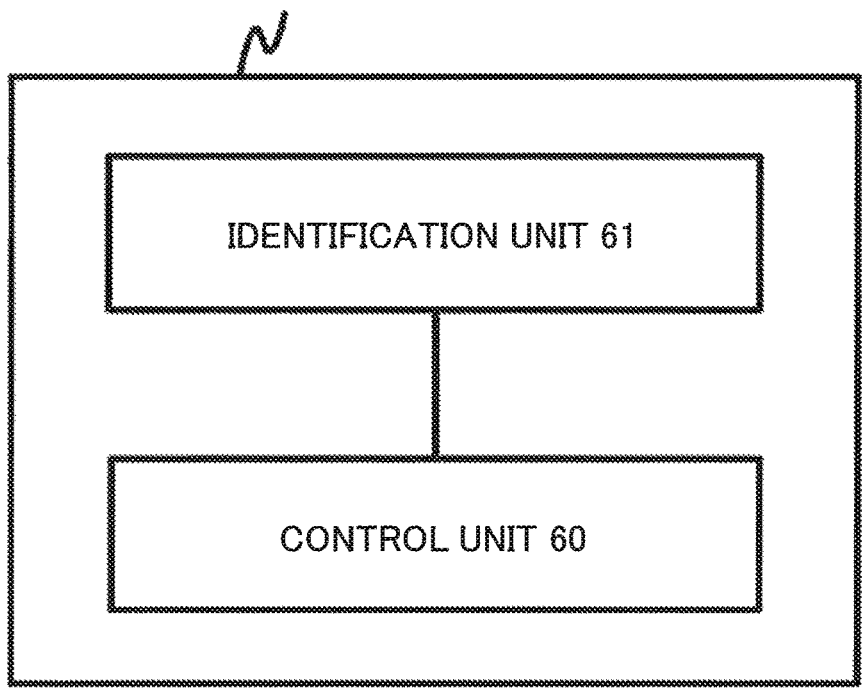
FIG. 5 is a diagram illustrating a configuration example a control server 6 according to the first exemplary embodiment.

FIG. 5 illustrates a configuration example of a control server 6 in the first exemplary embodiment. The control server 6 includes a control unit 60 and an identification unit 61.

The identification unit 61 identifies the type of communication traffic and the attribute/type of the terminal 1 based on the terminal information of the terminal 1 received from the base station 2. Since a function of the identification unit 61 is similar to a function of the identification unit 21 or the identification unit 51, a detailed description thereof will be omitted.

The control unit 60 can control a connection between the terminal 1 and the base station 2 based on the type of communication traffic identified by the identification unit 61 and the attribute/type of the terminal 1. For example, the control unit 60 can control a connection between the terminal 1 and the base station 2 based on a predetermined control policy. For example, when the terminal 1 is an MTC device, a control policy indicating that the terminal 1 is connected to the base station 2 for an MTC device is set in the control server 6. For example, when the terminal 1 is an MTC device, a control policy indicating establishment of a session between the terminal 1 and a network is set in the control server 6.

For example, when the terminal 1 is an MTC device, the control unit 60 can notify the base station 2 of an instruction to reconnect the terminal 1 to another base station 2.

Figure 6:
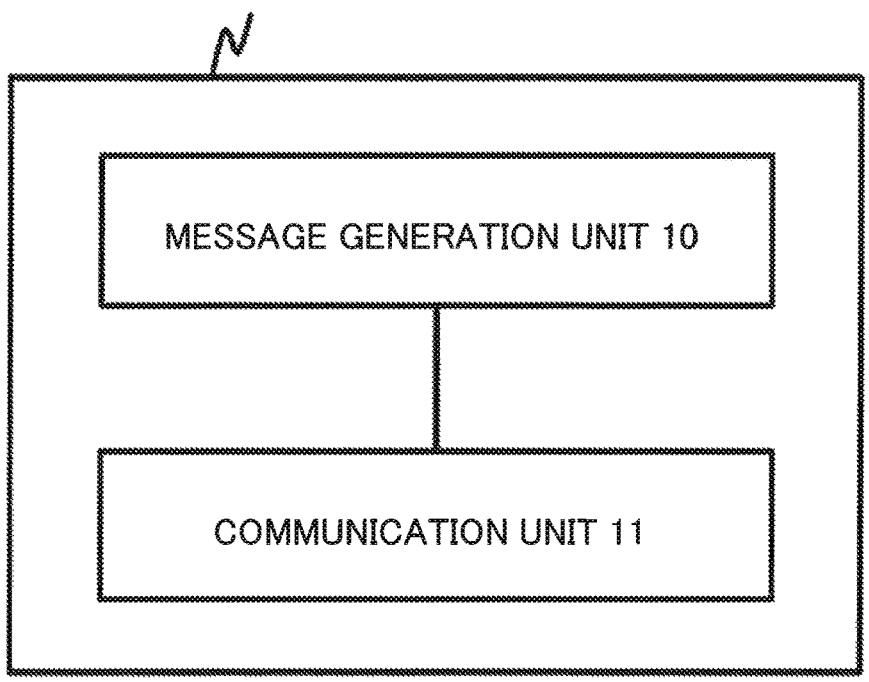
FIG. 6 illustrates a configuration example of a terminal 1 according to the first exemplary embodiment.

FIG. 6 illustrates a configuration example of the terminal 1 according to the first exemplary embodiment. As illustrated in FIG. 6, the terminal 1 includes a message generation unit 10 and a communication unit 11.

The message generation unit 10 generates a message to be notified to the base station 2 by the terminal 1.

For example, the message generation unit 10 can generate, for example, an "RRC Connection Request" message. For example, the message generation unit 10 can include information indicating the priority of the terminal 1 in the "RRC Connection Request" message according to the attribute of the terminal 1. For example, the message generation unit 10 can include "LAPI" in "RRC Connection Request". For example, the message generation unit 10 generates a message including information indicating an application corresponding to communication traffic.

The communication unit 11 transmits a generated message to the base station 2. The communication unit 11 can select the base station 2 that transmits the message. For example, when a connection request transmitted to the base station 2 is rejected, the communication unit 11 can reselect another base station 2. For example, the communication unit 11 can reselect the base station 2 based on information (for example, information of the base station 2 or a cell list) included in a rejection notification of the connection request.

Figure 7:
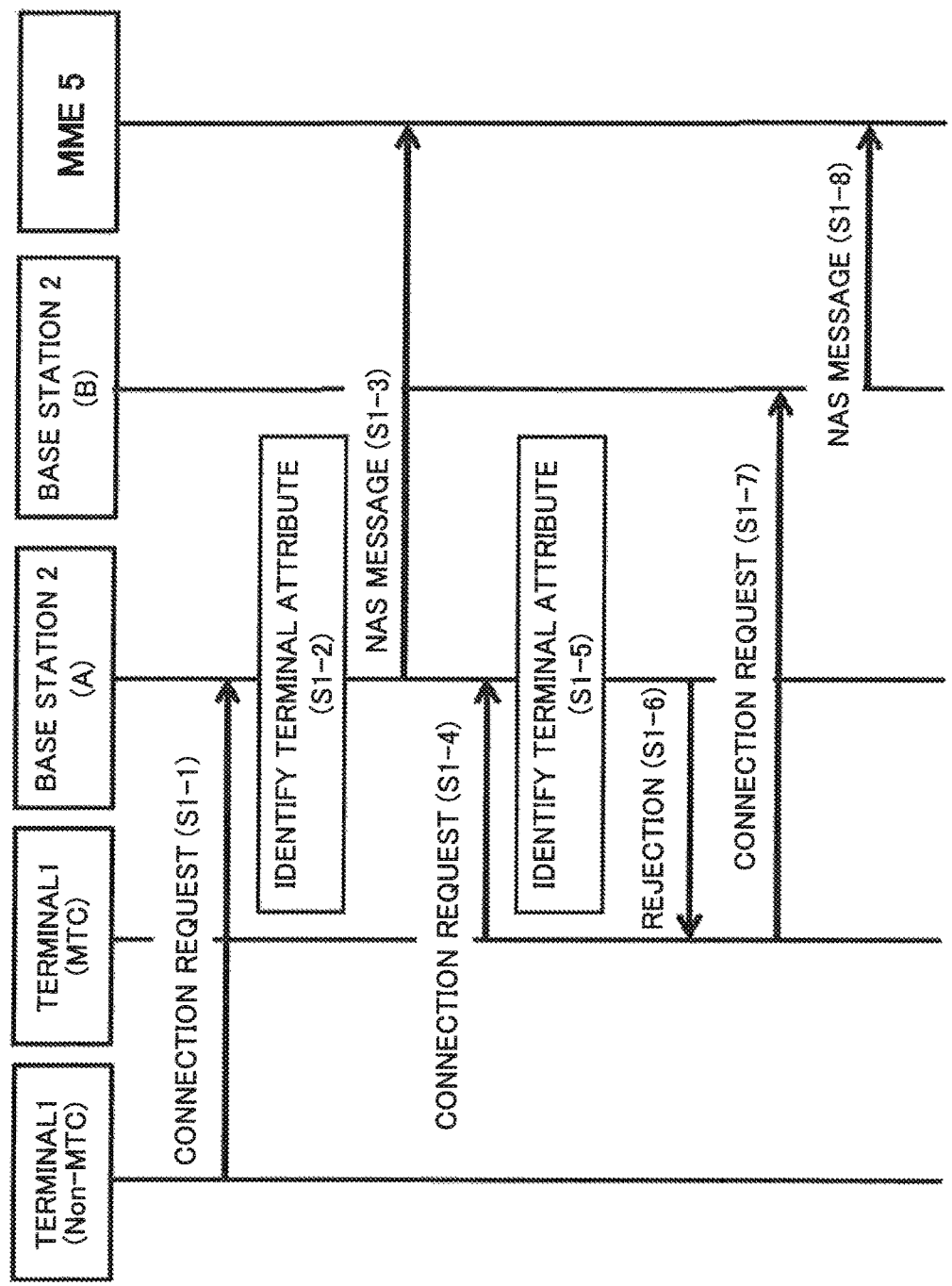
FIG. 7 is a sequence diagram illustrating an operation example of the first exemplary embodiment.

FIG. 7 is a sequence diagram illustrating an operation example of the first exemplary embodiment. FIG. 7 illustrates an example of an operation in which the base station 2 identifies the attribute/type (a terminal attribute) of the terminal 1, and the base station 2 may identify the type of communication traffic.

A terminal 1A (a non-MTC device 1A) which is a non-MTC device transmits a connection request (S1-1) in order to establish a wireless connection with the base station 2(A). The connection request is, for example, a message that the terminal 1 transmits to connect to a wireless network. For example, the non-MTC device 1A transmits "RRC Connection Request" as a connection request to the base station 2(A).

In response to reception of a connection request, the identification unit 21 of the base station 2(A) identifies a terminal attribute (S1-2). For example, the base station 2(A) identifies the terminal attribute based on whether "LAPI" is included in "RRC Connection Request" received from a non-MTC device 1A. In the example of FIG. 7, the "RRC Connection Request" transmitted from a non-MTC device 1A does not include "LAPI". Therefore, in S1-2, the identification unit 21 identifies that the terminal 1A is a non-MTC device.

The control unit 20 of the base station 2(A) transmits a NAS message to the MME 5 in response to the identification unit 21 identifying the terminal 1A as a non-MTC device (S1-3).

The terminal 1B (MTC device 1B) which is an MTC device transmits a connection request (for example, "RRC Connection Request") to the base station 2(A) (S1-4).

In response to reception of a connection request, the identification unit 21 of the base station 2(A) identifies a terminal attribute (S1-5). In the example of FIG. 7, "RRC Connection Request" transmitted from the MTC device 1B includes "LAPI". Therefore, the identification unit 21 of the base station 2(A) identifies that the terminal 1B is an MTC device based on "LAPI" included in "RRC Connection Request".

In response to the identification unit 21 identifying the terminal 1B as an MTC device, the control unit 20 of the base station 2(A) transmits a rejection notification indicating that the connection request has been rejected to the MTC device 1B (S1-6). The rejection notification may be, for example, a notification indicating rejection of a connection between the base station 2(A) that received a connection request from the terminal 1B and the terminal 1B. For example, the control unit 20 may include information indicating the base station 2(B) for an MTC device (terminal 1B) in the rejection notification.

The MTC device 1B retransmits a connection request (for example, "RRC Connection Request") to another base station 2 (base station 2(B) for an MTC device in the example of FIG. 7) (S1-7).

The control unit 20 of the base station 2 (B) transmits the NAS message to the MME 5 (S1-8). In the example of FIG. 7, when the terminal 1 is the MTC device, the base station 2 (B) is set with a control policy indicating establishing a wireless connection with the terminal 1 and starting a communication session between the terminal 1 and a network node. Therefore, the control unit 20 of the base station 2(B) establishes a wireless connection with the terminal 1B which is an MTC device, and transmits a NAS message to the MME 5. The control unit 20 of the base station 2(B) may transmit the NAS message to an MME (for example, the MME 5(B) in FIG. 2) for an MTC device.

Figure 8:
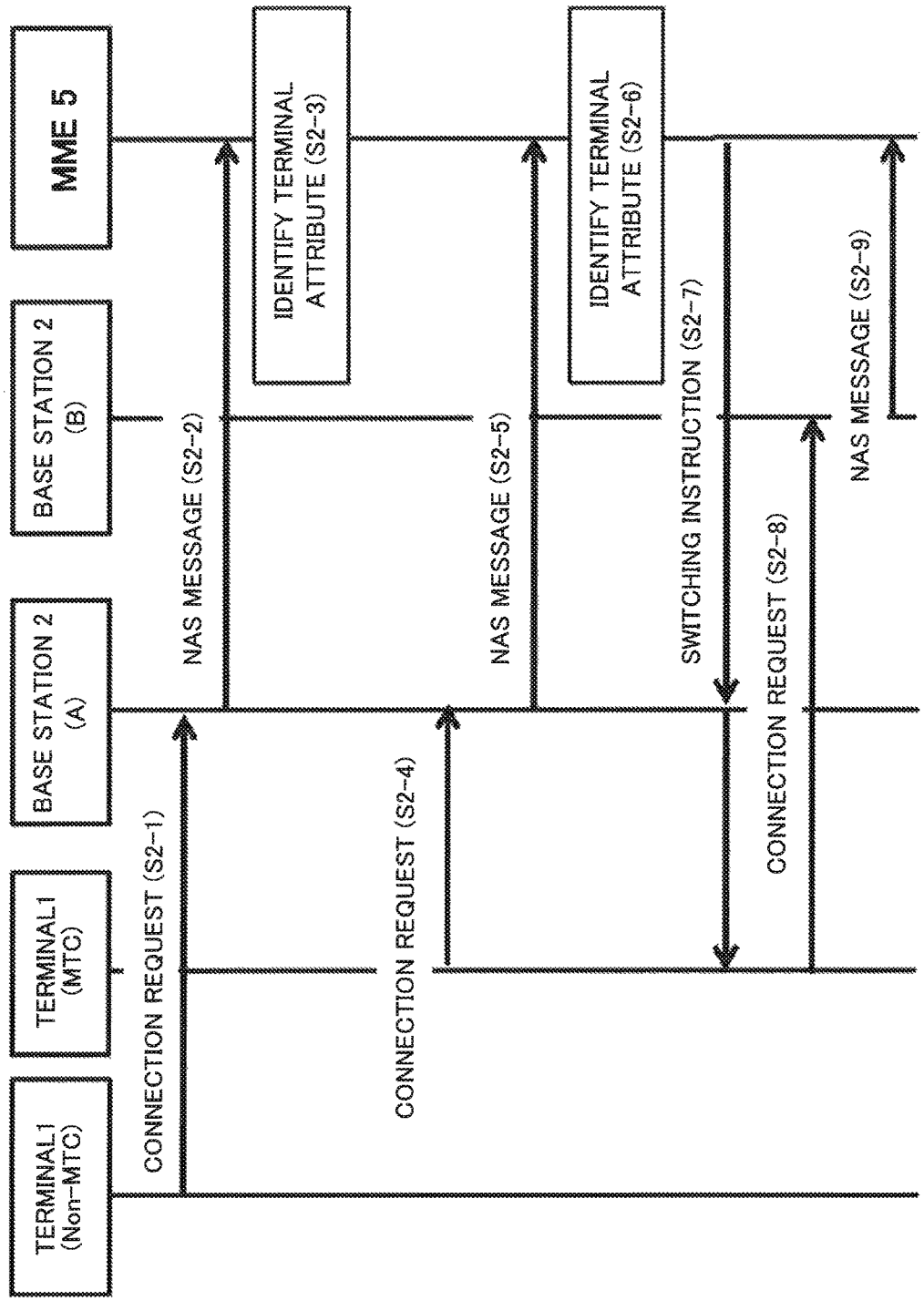
FIG. 8 is a sequence diagram illustrating another operation example of the first exemplary embodiment.

FIG. 8 is a sequence diagram illustrating another operation example of the first exemplary embodiment. FIG. 8 is an operation example in cases in which the MME 5 identifies the attribute/type (a terminal attribute) of the terminal 1.

The non-MTC device 1A transmits a connection request to the base station 2(A) (S2-1). For example, the non-MTC device 1A transmits "RRC Connection Request". Upon receiving the connection request, the base station 2(A) transmits a NAS message to the MME 5 (S2-2).

The identification unit 51 of the MME 5 identifies a terminal attribute based on reception of a NAS message (S2-3). The identification unit 51 of the MME 5, for example, identifies the terminal attribute based on whether or not "LAPI" is included in the received NAS message. In the example of FIG. 8, "LAPI" is not included in a NAS message transmitted by the base station 2(A) in response to a connection request from the non-MTC device 1A. Therefore, in S2-3, the identification unit 51 identifies that the terminal 1A is a non-MTC device. Since the terminal 1A is recognized as a non-MTC device, the MME 5 starts processing (for example "Attach Procedure" specified in 3GPP TS23.401v12.3.0, chapter 5.3.2) for establishing a communication session between the terminal 1A and a network node.

The terminal 1B which is an MTC device transmits a connection request (for example, "RRC Connection Request") to the base station 2(A) (S2-4). Upon receiving the connection request, the base station 2(A) transmits a NAS message to the MME 5 (S2-5).

The identification unit 51 of the MME 5 identifies a terminal attribute based on reception of the NAS message (S2-6). In the example of FIG. 8, a NAS message transmitted by the base station 2(A) in response to a connection request from the MTC device 1B includes "LAPI". Therefore, the identification unit 51 identifies that the terminal 1B is an MTC device.

The control unit 50 of the MME 5 transmits a message (a switching instruction) instructing switching of the base station 2 to the terminal 1 (S2-7), for example, when the identification unit 51 identifies the terminal 1B as an MTC device.

The MTC device 1B transmits a connection request (for example, "RRC Connection Request") to another base station 2 (the base station 2(B) for an MTC device in the example of FIG. 8) (S2-8). Upon receiving the connection request, the base station 2(B) transmits a NAS message to the MME 5 (S2-9). The base station 2(B) may transmit a NAS message to an MME (for example, the MME 5(B) in FIG. 2) for an MTC device.

Figure 9:
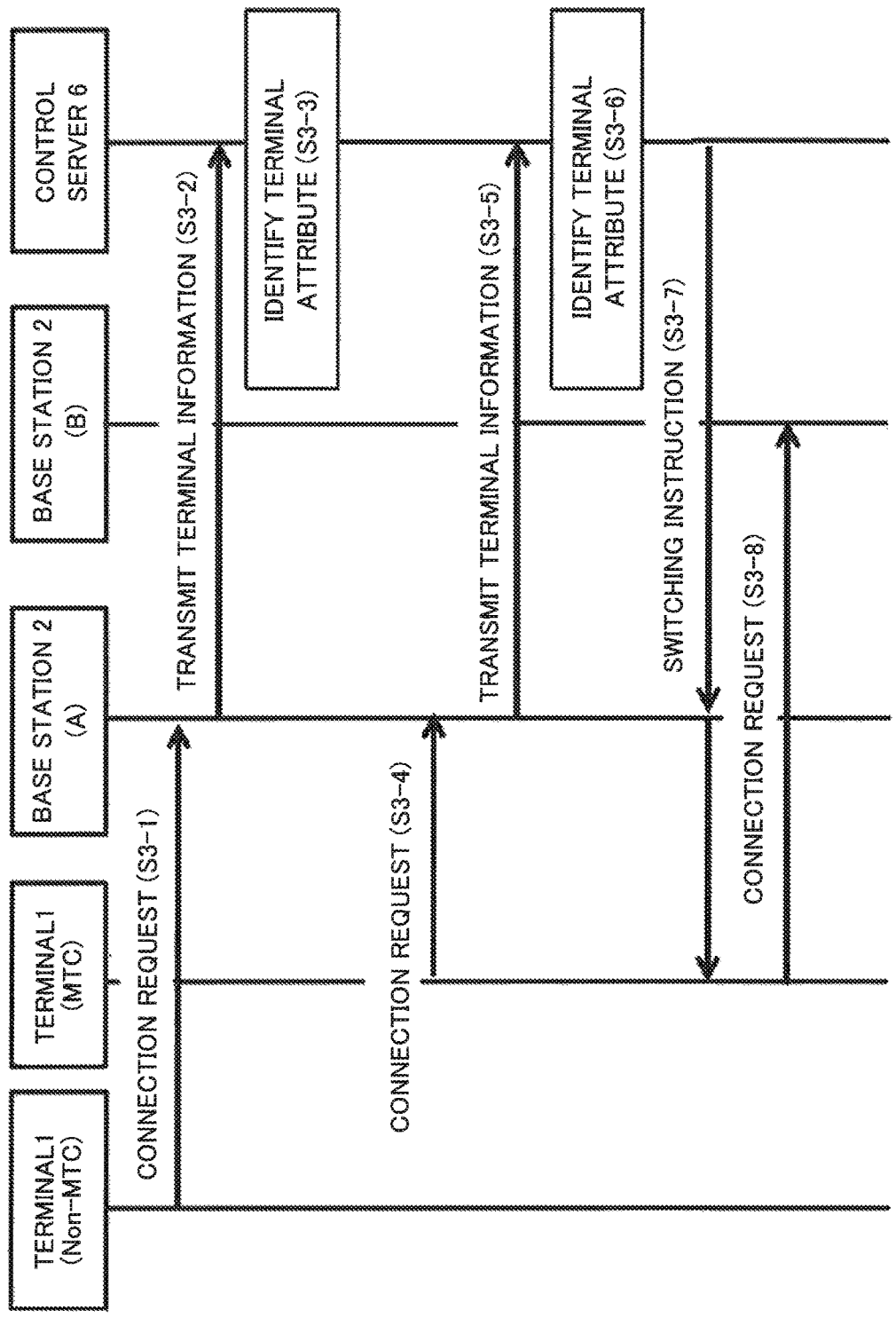
FIG. 9 is a sequence diagram illustrating another operation example of the first exemplary embodiment.

FIG. 9 is a sequence diagram illustrating another operation example of the first exemplary embodiment. FIG. 9 illustrates an example of operation when the control server 6 identifies the attribute/type (a terminal attribute) of the terminal 1.

The non-MTC device 1A transmits a connection request to the base station 2(A) (S3-1). For example, the non-MTC device 1A transmits "RRC Connection Request". Upon receiving the connection request, the base station 2(A) transmits terminal information to the control server 6 (S3-2).

The identification unit 61 of the control server 6 identifies a terminal attribute based on reception of terminal information (S3-3). The identification unit 61 of the control server 6, for example, identifies the terminal attribute based on whether or not "LAPI" is included in the received terminal information. In the example of FIG. 9, "LAPI" is not included in terminal information transmitted by the base station 2(A) in response to a connection request from the non-MTC device 1A. Therefore, in S3-3, the identification unit 61 identifies that the terminal 1A is a non-MTC device. Since the terminal 1A is recognized as a non-MTC device, the control server 6 starts processing (for example "Attach Procedure" specified in 3GPP TS23.401 v12.3.0, chapter 5.3.2) for establishing a communication session between the terminal 1A and a network node.

The terminal 1B which is an MTC device transmits a connection request (for example, "RRC Connection Request") to the base station 2 (S3-4). Upon receiving the connection request, the base station 2(A) transmits terminal information to the control server 6 (S3-5).

The identification unit 61 of the control server 6 identifies a terminal attribute based on reception of the terminal information (S3-6). In the example of FIG. 9, terminal information transmitted by the base station 2(A) in response to a connection request from the MTC device 1B includes "LAPI". Therefore, the identification unit 61 identifies that the terminal 1B is an MTC device.

The control unit 60 of the control server 6 transmits a message (a switching instruction) instructing switching of the base station 2 to the terminal 1 (S3-7), for example, when the identification unit 61 identifies the terminal 1B as an MTC device.

The MTC device 1B transmits a connection request (for example, "RRC Connection Request") to another base station 2 (the base station 2(B) for an MTC device in the example of FIG. 9) (S3-8).

As described above, the communication system of the first exemplary embodiment can select the base station 2 to be connected to the terminal 1 based on the terminal attribute of the terminal 1. Therefore, communication traffic from the terminal 1 is distributed to a plurality of base stations 2, and a delay of wireless communication between the terminal 1 and the base station 2 can be reduced.

When wireless systems of the base stations 2 (A) and (B) are the same, communication traffic is offloaded even if the terminal 1 does not support a plurality of wireless systems. Therefore, the communication system of the first exemplary embodiment can offload communication traffic without depending on a communication method supported by the terminal 1.

Second Exemplary Embodiment

In the second exemplary embodiment of the present invention, at least a portion of a function of a network node is virtually operated by software or the like. A technique of the second exemplary embodiment can be applied to any of the first embodiment and exemplary embodiments below.

In a communication system of the second exemplary embodiment, a network node virtually operated by software or the like can process traffic offloaded according to a terminal attribute. Therefore, in the communication system of the second exemplary embodiment, it is possible to construct a network node for processing offloaded traffic with software with ease and at low cost.

Figure 10:
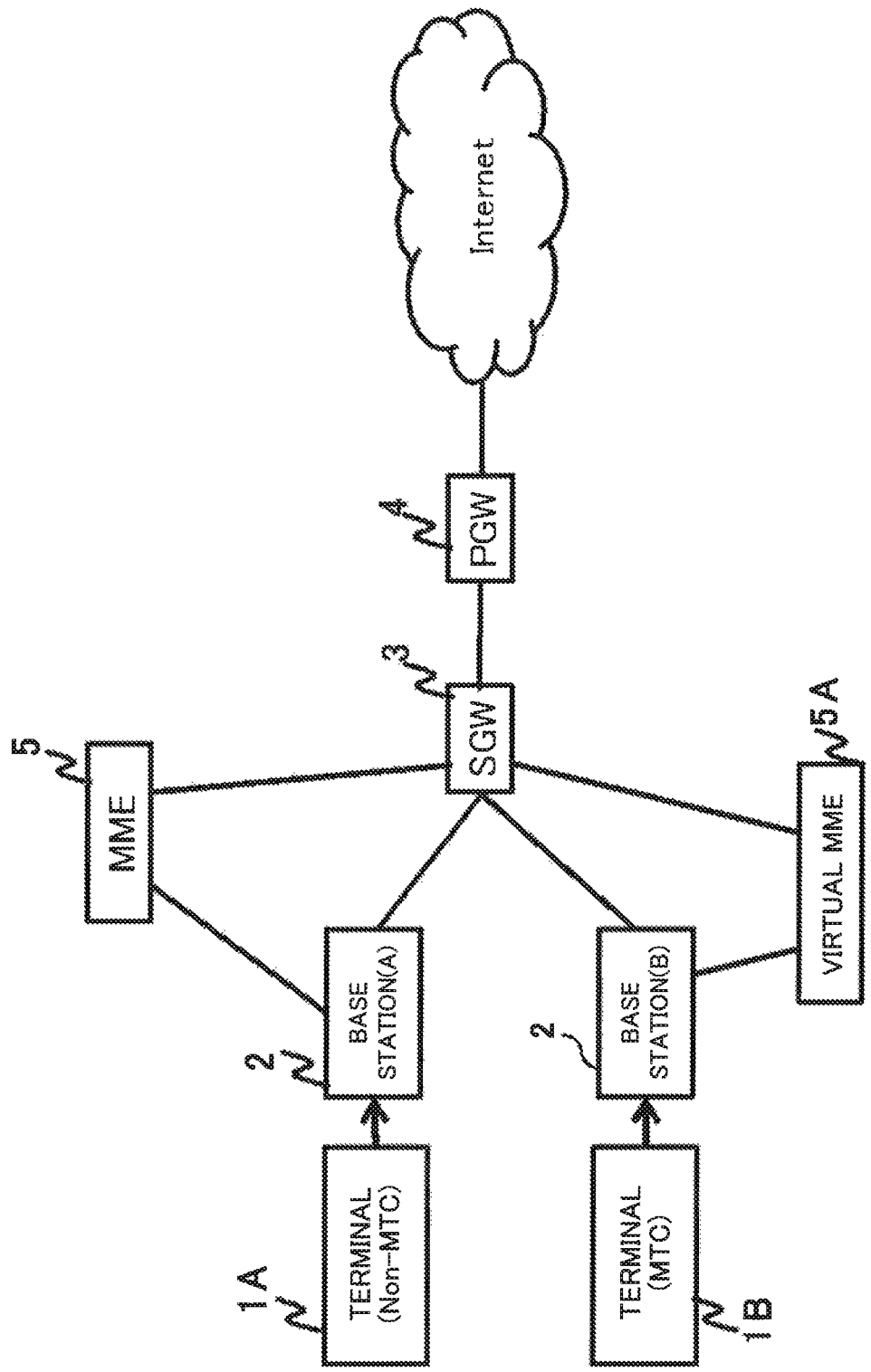
FIG. 10 is a diagram illustrating a configuration example of a communication system according to the first exemplary embodiment.

FIG. 10 illustrates a configuration example of the communication system according to the second exemplary embodiment. In the example of FIG. 10, an MTC terminal (terminal 1B) is connected to the base station 2(B), and traffic of the MTC terminal is offloaded. As illustrated in FIG. 10, in the communication system of the second embodiment, a virtual MME 5A processes control signaling related to the terminal 1 (for example, an MTC device) connected to the base station 2(B) and the base station 2(B). The virtual MME 5A operates a function of the MME 5 with software such as a virtual machine. The direction of an arrow in the drawing is an example and does not limit the direction of a signal between blocks.

In the example of FIG. 10, the MME 5(A) processes control signaling relating to the terminal 1 (for example, a non-MTC terminal) connected to the base station 2(A) and the base station 2(A).

The virtual MME 5A can dynamically scale out and scale in. A network operator can dynamically scale out and scale in the virtual MME 5A, for example, according to a state of communication traffic of the terminal 1. For example, a network operator can dynamically activate the virtual MME 5A in accordance with the time when the terminal 1 starts communication. For example, a network operator can activate the virtual MME 5A corresponding to communication traffic from the terminal 1. For example, a network operator can activate the virtual MME 5A in such a manner as to satisfy the requirement (for example, SLA: Service Level Agreement) for the processing of communication traffic from the terminal 1.

In the example of FIG. 10, control signaling transmitted from the base station 2 is distributed to a plurality of MMEs 5 (the MME 5 and the virtual MME 5A). Therefore, load of the MME 5 needed for processing of control signaling is reduced. In the example of FIG. 10, the virtual MME 5A can be dynamically scaled out and scaled in according to communication traffic from the terminal 1. Therefore, for example, when the terminal 1 is an MTC device, the communication system can start a virtual machine in a time zone when communication traffic from the MTC device 1B is large and stop the virtual machine in a time period in which the communication traffic is small. Therefore, the communication system can suppress the power consumption of a server or the like that realizes the virtual machine.

The configurations of the terminal 1 (Non-MTC device 1A, MTC device 1B), the base stations 2 (base station (A), base station (B)) and MME 5 illustrated in FIG. 10 are the same as those in the first exemplary embodiment, and therefore, a detailed description thereof is omitted. Functions of network nodes (SGW 3, PGW 4) illustrated in FIG. 10 are the same as the functions described in the first exemplary embodiment, and a detailed description thereof is omitted.

Figure 11:
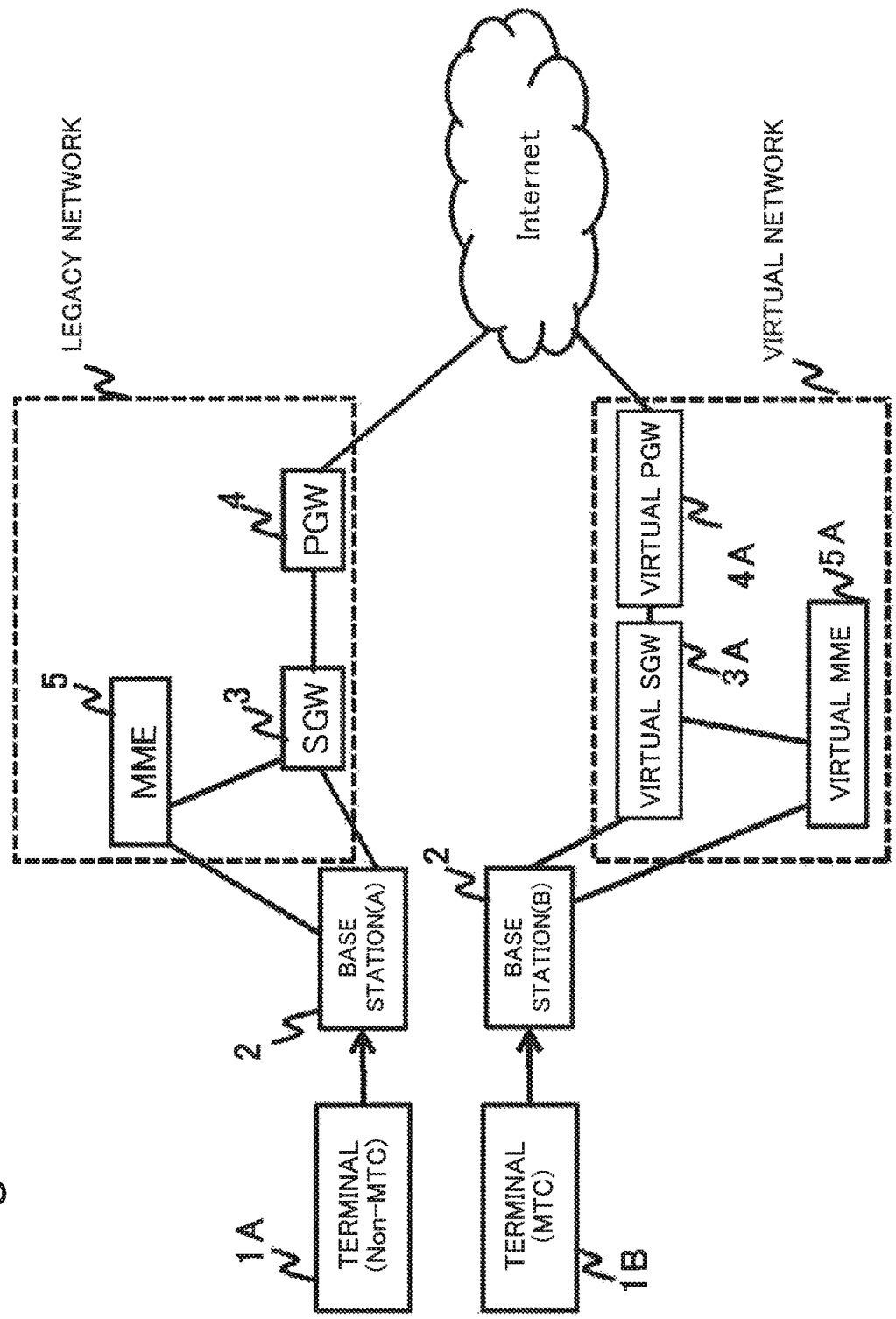
FIG. 11 is a diagram illustrating another configuration example of a communication system according to the first exemplary embodiment.

FIG. 11 illustrates another configuration example of the communication system of the second exemplary embodiment. As illustrated in FIG. 11, the communication system of the second exemplary embodiment is configured with a legacy network and a virtual network. The legacy network and the virtual network are backbone networks such as Evolved Packet Core (EPC). The legacy network and the virtual network are backbone networks through which the terminal 1 communicates with an external network such as the Internet via the base station 2. The direction of the arrow in the drawing is an example and does not limit the direction of a signal between blocks.

In the example of FIG. 11, communication traffic from the terminal 1 (for example, an MTC device) having a predetermined attribute is offloaded to a virtual network. Therefore, for example, the communication system can reduce load on a legacy network due to communication traffic of an MTC device. For example, by transmitting a control signal for connecting an MTC device and a network to a virtual network, load on which a legacy network processes the control signal from the MTC device can be reduced.

A legacy network comprises a plurality of network nodes (SGW 3, PGW 4, MME 5) for providing a communication service to the terminal 1. Each network node is, for example, a communication device having a predetermined communication function.

In a virtual network, at least a portion of a function of a network node of a legacy network is virtually operated by software. For example, a function of a network node is operated by an application on a virtual machine. A virtual network is constructed in a data center composed of, for example, a server and communication devices (switches, routers, or the like).

A virtual network is constructed, for example, by dynamic scale out/scale in of a virtual machine. For example, a network operator can construct a virtual network by dynamically activating a virtual machine according to a state of communication traffic in the network. For example, a network operator can construct a virtual network by dynamically activating a virtual machine in a predetermined time period. A network operator can activate a virtual machine corresponding to predetermined communication traffic or predetermined communication traffic of the terminal 1 and dynamically construct a virtual network. A network operator can activate a virtual machine in such a way as to satisfy requirements (for example, SLA) for processing of communication traffic and dynamically construct a virtual network.

For example, a network operator can suppress resources allocated to a virtual network by suppressing a virtual machine in a predetermined time period in which communication traffic is small, thereby suppressing the power consumption of a data center.

A communication system exemplified in FIG. 11 may include other networks other than the legacy network and the virtual network. Each of the legacy network and the virtual network may include a plurality of types of networks. For example, the legacy network and the virtual network may include a plurality of types of networks such as LTE network, GPRS network, UMTS network, respectively.

As illustrated in FIG. 11, the terminal 1 can connect to the legacy network via the base station 2(A). On the other hand, the terminal 1 can connect to the virtual network via the base station 2(B).

For example, when the base station 2 (B) is the base station 2 for an MTC device, communication traffic from the MTC device 1B is offloaded to the virtual network via the base station 2(B). For example, a control signal for connecting the MTC device and the network is transmitted to the virtual network via the base station 2(B). Therefore, load on the legacy network due to the communication traffic of the MTC device is reduced. It is assumed that a huge number of MTC devices will be connected to a communication system in the future, but by offloading a control signal to a virtual network, load on which a legacy network processes the control signal can be reduced. In the example of FIG. 11, when wireless systems of the base station 2(A) the base station 2 (B) are the same, even if the terminal 1 does not correspond to a plurality of wireless systems, the communication traffic is offloaded to a virtual network. Therefore, the communication system of the second exemplary embodiment can offload communication traffic to a virtual network without depending on the communication method supported by the terminal 1.

The configurations of the terminal 1 (non-MTC device 1A, MTC device 1B), the base stations 2 (the base station (A), the base station (B)) and the MME 5 exemplified in FIG. 11 are the same as those in the first exemplary embodiment, and therefore, a detailed description is omitted. Functions of network nodes (SGW 3, PGW 4) illustrated in FIG. 11 are the same as those described in the first exemplary embodiment, and a detailed description thereof is omitted.

Figure 12:
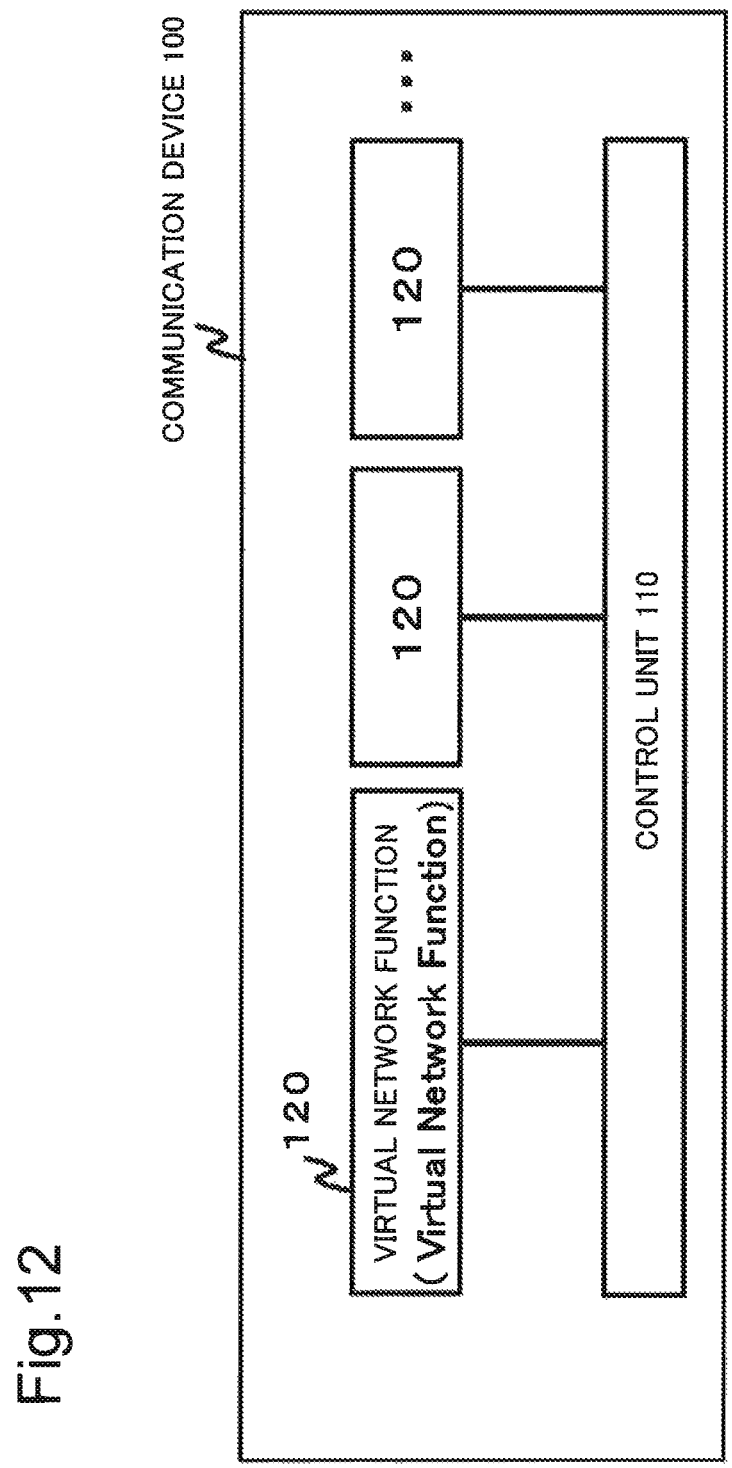
FIG. 12 is a diagram illustrating a configuration example of a communication device 100 of a second exemplary embodiment.

FIG. 12 illustrates a configuration example of a communication device 100 according to the second exemplary embodiment. The communication device 100 is, for example, a server, a switch, or a router. The communication device 100 operates a virtual machine that provides a function of a virtual network node (such as a virtual SGW 3A, a virtual PGW 4A, or a virtual MME 5A) in a virtual network.

The communication device 100 includes a control unit 110 and a virtual network function (VNF) 120.

The control unit 110 can operate the VNF 120 that provides a function of a virtual network node on a virtual machine. The control unit 110 may be constituted by control software capable of executing computer virtualization, such as Hypervisor.

The control unit 110 can execute at least one of startup, stop, and migration (migrating a virtual machine to another communication device 100) of a virtual machine operating the VNF 120.

Each of virtual network nodes has, for example, the following functions.

Virtual PGW 4A:
Function to process packets (User-Plane Function)
Function to manage accounting status according to communication (PCEF: Policy and Charging Enforcement Function)
Function to control policies such as QoS (PCRF: Policy and Charging Rule Function)

Virtual SGW 3A:
Function to process packets (User-Plane Function)
Function to process control signaling (C-Plane Function)
Lawful interception (LI) function for intercepting communications Virtual MME 5A:
Function to process control signaling (C-Plane Function)
Function to manage information about a subscriber of a communication system in cooperation with a Home Subscriber Server (HSS)

The VNF 120 operates on a virtual machine as the above-described virtual network node. In the above-described exemplary embodiment, the VNF 120 is constructed for each virtual network node, and the VNF 120 may be constructed for each function of each virtual network node. For example, the VNF 120 may operate as a U-Plane function of the virtual PGW 4A on a virtual machine.

Figure 13:
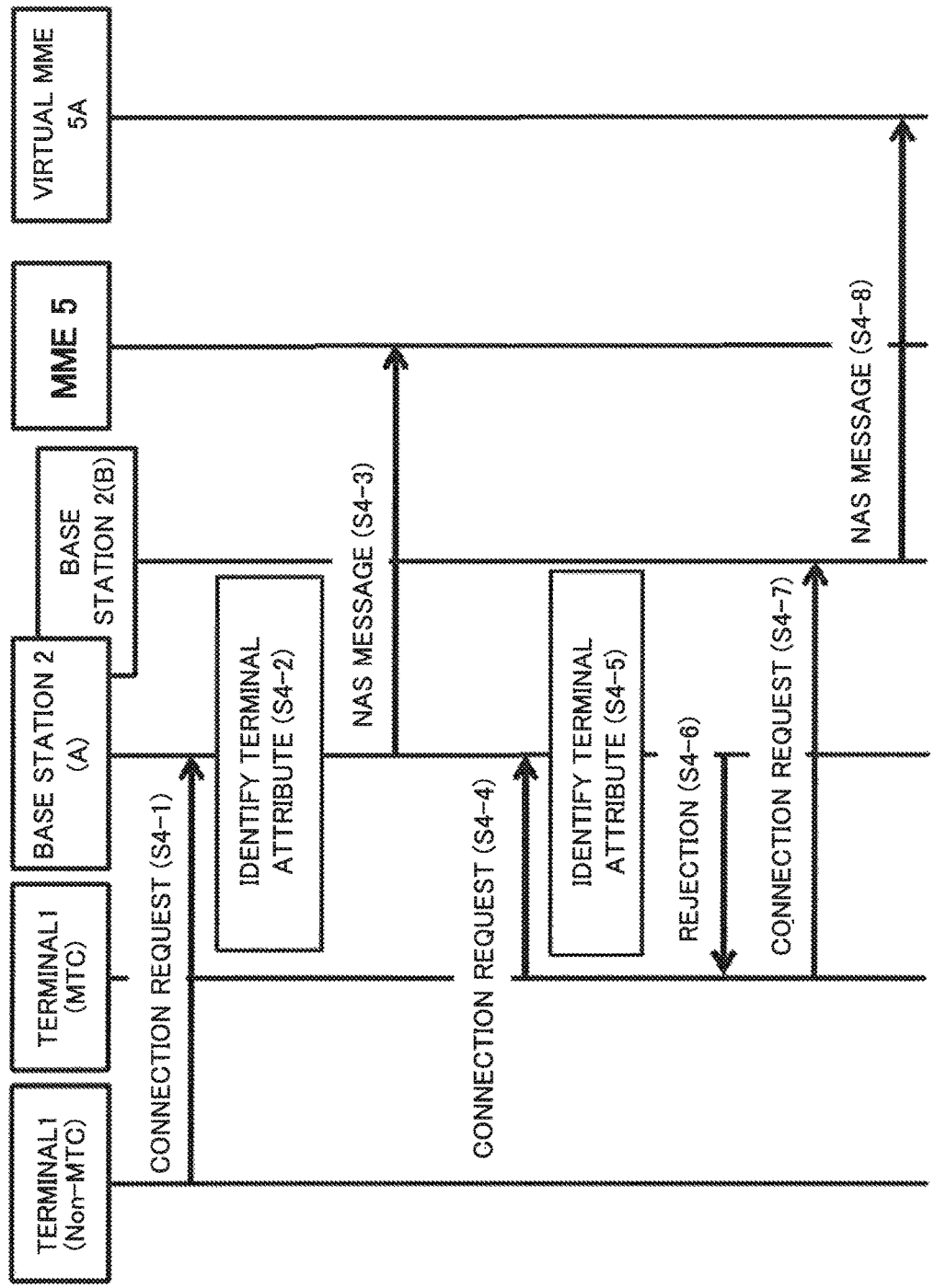
FIG. 13 is a sequence diagram illustrating an operation example of the second exemplary embodiment.

FIG. 13 is a sequence diagram illustrating an operation example of the second exemplary embodiment. FIG. 13 illustrates an example of an operation in which the base station 2 identifies the attribute/type (a terminal attribute) of the terminal 1, and the base station 2 may identify the type of communication traffic.

A terminal 1A (a non-MTC device 1A) which is a non-MTC device transmits a connection request (S4-1) in order to establish a wireless connection with the base station 2(A). For example, the non-MTC device 1A transmits "RRC Connection Request" as a connection request to the base station 2(A).

In response to reception of a connection request, the identification unit 21 of the base station 2(A) identifies a terminal attribute (S4-2). For example, the base station 2(A) identifies the terminal attribute based on whether "LAPI" is included in "RRC Connection Request" received from a non-MTC device 1A. In the example of FIG. 13, the "RRC Connection Request" transmitted from a non-MTC device 1A does not include "LAPI". Therefore, in S4-2, the identification unit 21 identifies that the terminal 1A is a non-MTC device.

The control unit 20 of the base station 2(A) transmits a NAS message to the MME 5 in response to the identification unit 21 identifying the terminal 1A as a non-MTC device (S4-3).

The terminal 1B (MTC device 1B) which is an MTC device transmits a connection request (for example, "RRC Connection Request") to the base station 2(A) (S4-4).

In response to reception of a connection request, the identification unit 21 of the base station 2(A) identifies a terminal attribute (S4-5). In the example of FIG. 13, "RRC Connection Request" transmitted from the MTC device 1B includes "LAPI". Therefore, the identification unit 21 of the base station 2(A) identifies that the terminal 1B is an MTC device based on "LAPI" included in "RRC Connection Request".

In response to the identification unit 21 identifying the terminal 1B as an MTC device, the control unit 20 of the base station 2(A) transmits a rejection notification indicating that the connection request has been rejected to the MTC device 1B (S4-6). For example, the control unit 20 may include information indicating the base station 2(B) for an MTC device (terminal 1B) in the rejection notification.

The MTC device 1B retransmits a connection request (for example, "RRC Connection Request") to another base station 2 (base station 2(B) for an MTC device in the example of FIG. 13) (S4-7).

The control unit 20 of the base station 2 (B) transmits the NAS message to the virtual MME 5A (S4-8). In the example of FIG. 13, when the terminal 1 is the MTC device, the base station 2 (B) is set with a control policy indicating establishing a wireless connection with the terminal 1 and starting a communication session between the terminal 1 and a network node. Therefore, the control unit 20 of the base station 2(B) establishes a wireless connection with the terminal 1B which is an MTC device, and transmits a NAS message to the virtual MME 5A.

Figure 14:
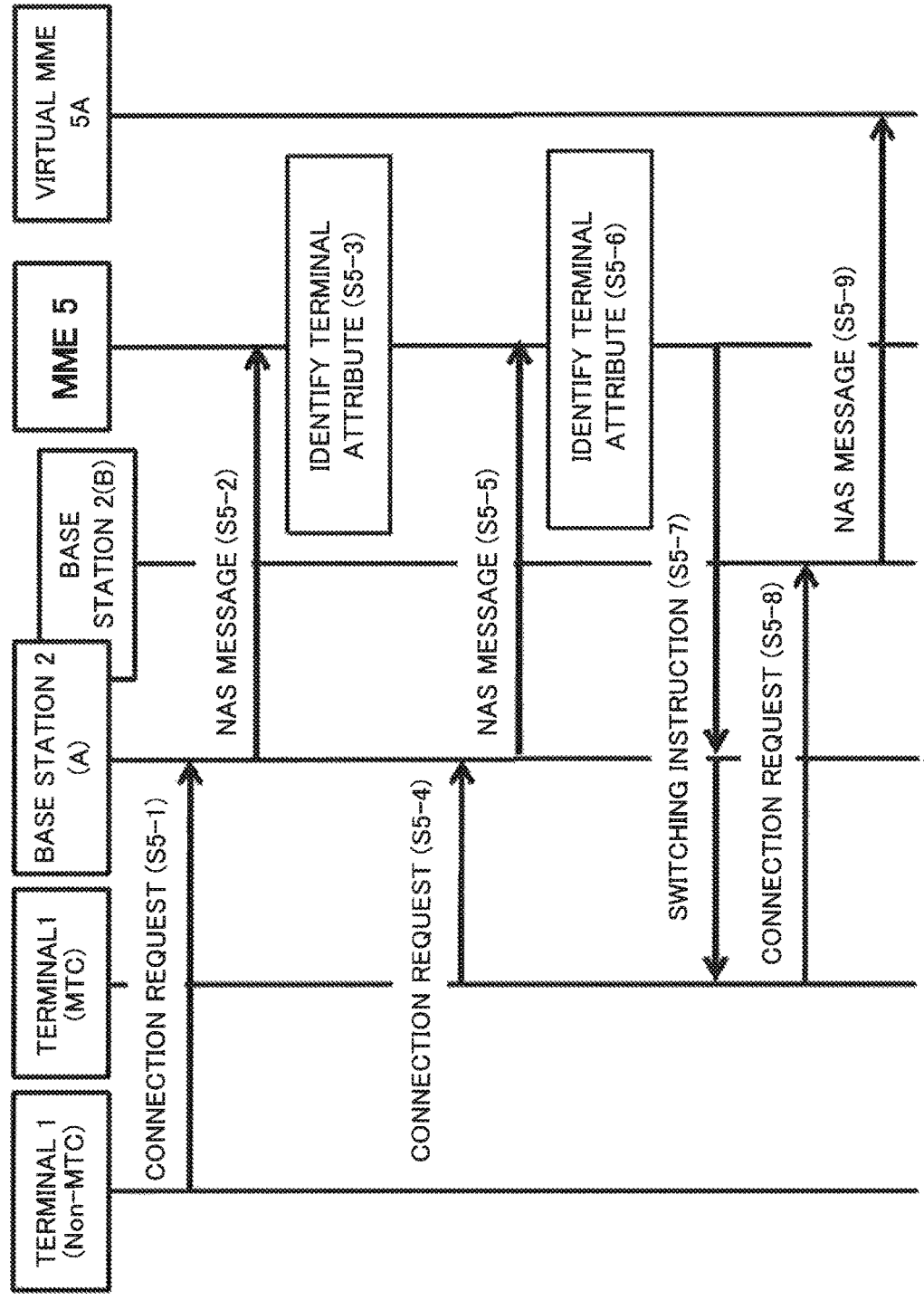
FIG. 14 is a sequence diagram illustrating another operation example of the second exemplary embodiment.

FIG. 14 is a sequence diagram illustrating another operation example of the second exemplary embodiment. FIG. 14 is an operation example in cases in which the MME 5 identifies the attribute/type (a terminal attribute) of the terminal 1.

The non-MTC device 1A transmits a connection request to the base station 2(A) (S5-1). For example, the non-MTC device 1A transmits "RRC Connection Request". Upon receiving the connection request, the base station 2(A) transmits a NAS message to the MME 5 (S2-2).

The identification unit 51 of the MME 5 identifies a terminal attribute based on reception of a NAS message (S5-3). The identification unit 51 of the MME 5, for example, identifies the terminal attribute based on whether or not "LAPI" is included in the received NAS message. In the example of FIG. 14, "LAPI" is not included in a NAS message transmitted by the base station 2(A) in response to a connection request from the non-MTC device 1A. Therefore, in S5-3, the identification unit 51 identifies that the terminal 1A is a non-MTC device. Since the terminal 1A is recognized as a non-MTC device, the MME 5 starts processing (for example "Attach Procedure" specified in 3GPP TS23.401 v12.3.0, chapter 5.3.2) for establishing a communication session between the terminal 1A and a network node.

The terminal 1B which is an MTC device transmits a connection request (for example, "RRC Connection Request") to the base station 2(A) (S5-4). Upon receiving the connection request, the base station 2(A) transmits a NAS message to the MME 5 (S5-5).

The identification unit 51 of the MME 5 identifies a terminal attribute based on reception of the NAS message (S5-6). In the example of FIG. 14, a NAS message transmitted by the base station 2(A) in response to a connection request from the MTC device 1B includes "LAPI". Therefore, the identification unit 51 identifies that the terminal 1B is an MTC device.

The control unit 50 of the MME 5 transmits a message (a switching instruction) instructing switching of the base station 2 to the terminal 1 (S5-7), for example, when the identification unit 51 identifies the terminal 1B as an MTC device.

The MTC device 1B transmits a connection request (for example, "RRC Connection Request") to another base station 2 (the base station 2(B) for an MTC device in the example of FIG. 14) (S5-8). Upon receiving the connection request, the base station 2(B) transmits a NAS message to the virtual MME 5A (S5-9).

Figure 15:
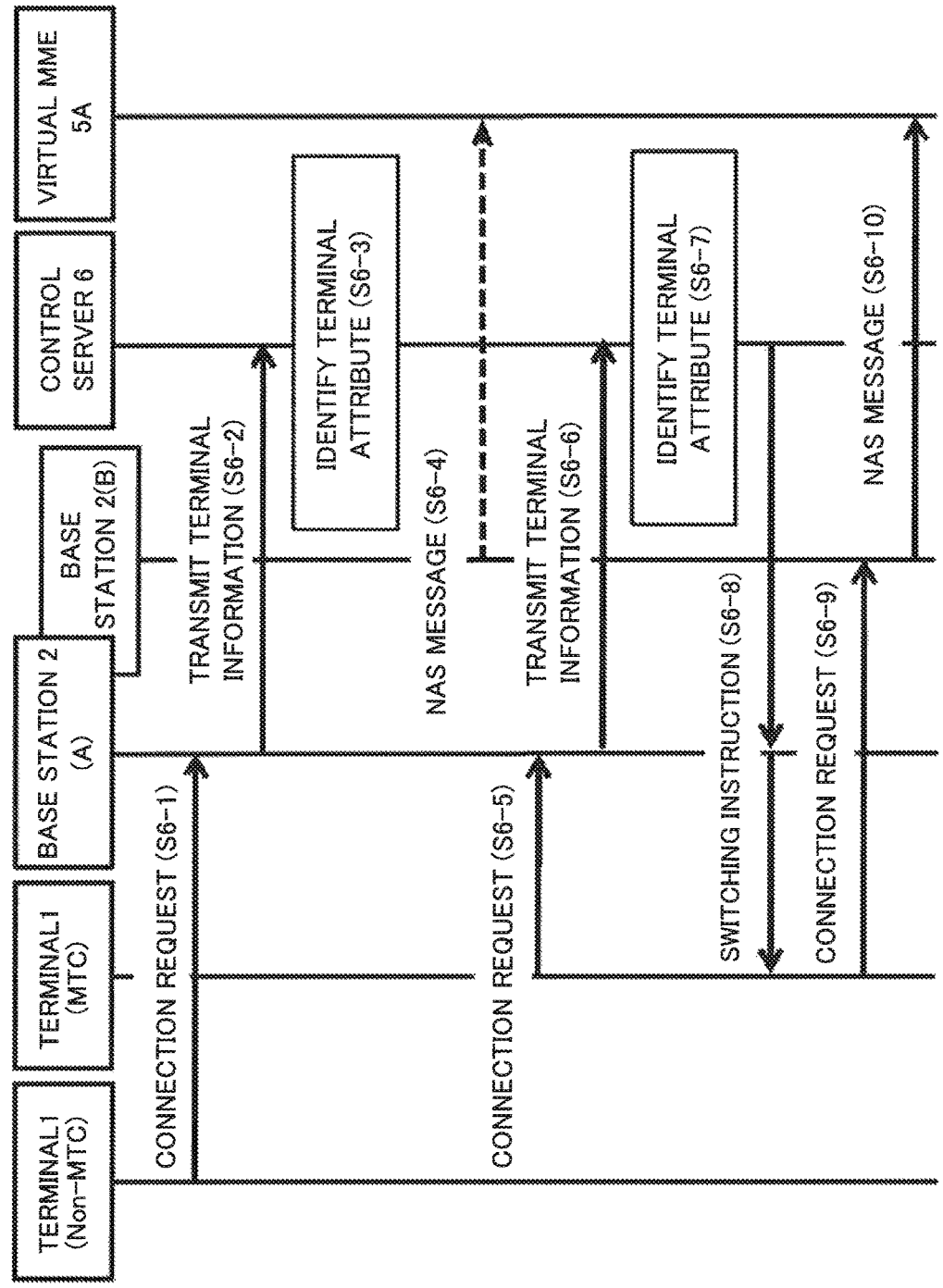
FIG. 15 is a sequence diagram illustrating another operation example of the second exemplary embodiment.

FIG. 15 is a sequence diagram illustrating another operation example of the second exemplary embodiment. FIG. 15 illustrates an example of operation when the control server 6 identifies the attribute/type (terminal attribute) of the terminal 1.

The non-MTC device 1A transmits a connection request to the base station 2(A) (S6-1). For example, the non-MTC device 1A transmits "RRC Connection Request". Upon receiving the connection request, the base station 2(A) transmits terminal information to the control server 6 (S6-2).

The identification unit 61 of the control server 6 identifies a terminal attribute based on reception of terminal information (S6-3). The identification unit 61 of the control server 6, for example, identifies the terminal attribute based on whether or not "LAPI" is included in the received terminal information. In the example of FIG. 15, "LAPI" is not included in terminal information transmitted by the base station 2(A) in response to a connection request from the non-MTC device 1A. Therefore, in S6-3, the identification unit 61 identifies that the terminal 1A is a non-MTC device. Since the terminal 1A is recognized as a non-MTC device, the control server 6 starts processing (for example "Attach Procedure" specified in 3GPP TS23.401 v12.3.0, chapter 5.3.2) for establishing a communication session between the terminal 1A and a network node. For example, when the control server 6 recognizes the terminal 1A as a non-MTC device, the base station 2(A) transmits a NAS message to the MME 5 (S6-4).

The terminal 1B which is an MTC device transmits a connection request (for example, "RRC Connection Request") to the base station 2 (S6-5). Upon receiving the connection request, the base station 2(A) transmits terminal information to the control server 6 (S6-6).

The identification unit 61 of the control server 6 identifies a terminal attribute based on reception of the terminal information (S6-7). In the example of FIG. 15, terminal information transmitted by the base station 2(A) in response to a connection request from the MTC device 1B includes "LAPI". Therefore, the identification unit 61 identifies that the terminal 1B is an MTC device.

The control unit 60 of the control server 6 transmits a message (a switching instruction) instructing switching of the base station 2 to the terminal 1 (S6-8), for example, when the identification unit 61 identifies the terminal 1B as an MTC device.

The MTC device 1B transmits a connection request (for example, "RRC Connection Request") to another base station 2 (the base station 2(B) for an MTC device in the example of FIG. 15) (S6-9). Upon receiving the connection request, the base station 2 (B) transmits a NAS message to the virtual MME 5A (S6-10).

As described above, in the second exemplary embodiment, the virtual MME 5A can be dynamically scaled out and scaled in according to communication traffic from the terminal 1. Therefore, for example, when the terminal 1 is an MTC device, the communication system start a virtual machine in a time zone when communication traffic from the MTC device 1B is large and stop the virtual machine in a time period in which the communication traffic is small, by which the communication system can suppress the power consumption of a server or the like that realizes the virtual machine.

In the second exemplary embodiment, communication traffic from a predetermined terminal 1 (for example, an MTC device) is offloaded to a virtual network. Therefore, for example, the communication system can reduce load on a legacy network due to communication traffic of an MTC device. For example, by transmitting a control signal for connecting an MTC device and a network to a virtual network, load on which a legacy network processes the control signal from the MTC device can be reduced.

Third Exemplary Embodiment

A third exemplary embodiment of the present invention will be described with reference to the drawings. The third exemplary embodiment explains an operation example when a case in which the base station 2 identifies the terminal attribute of the terminal 1 is applied to the 3GPP standard specification (for example, 3GPP TS23.401). A technique of the third exemplary embodiment can be applied to any of the first and second exemplary embodiments and the below-described embodiments.

Figure 16:
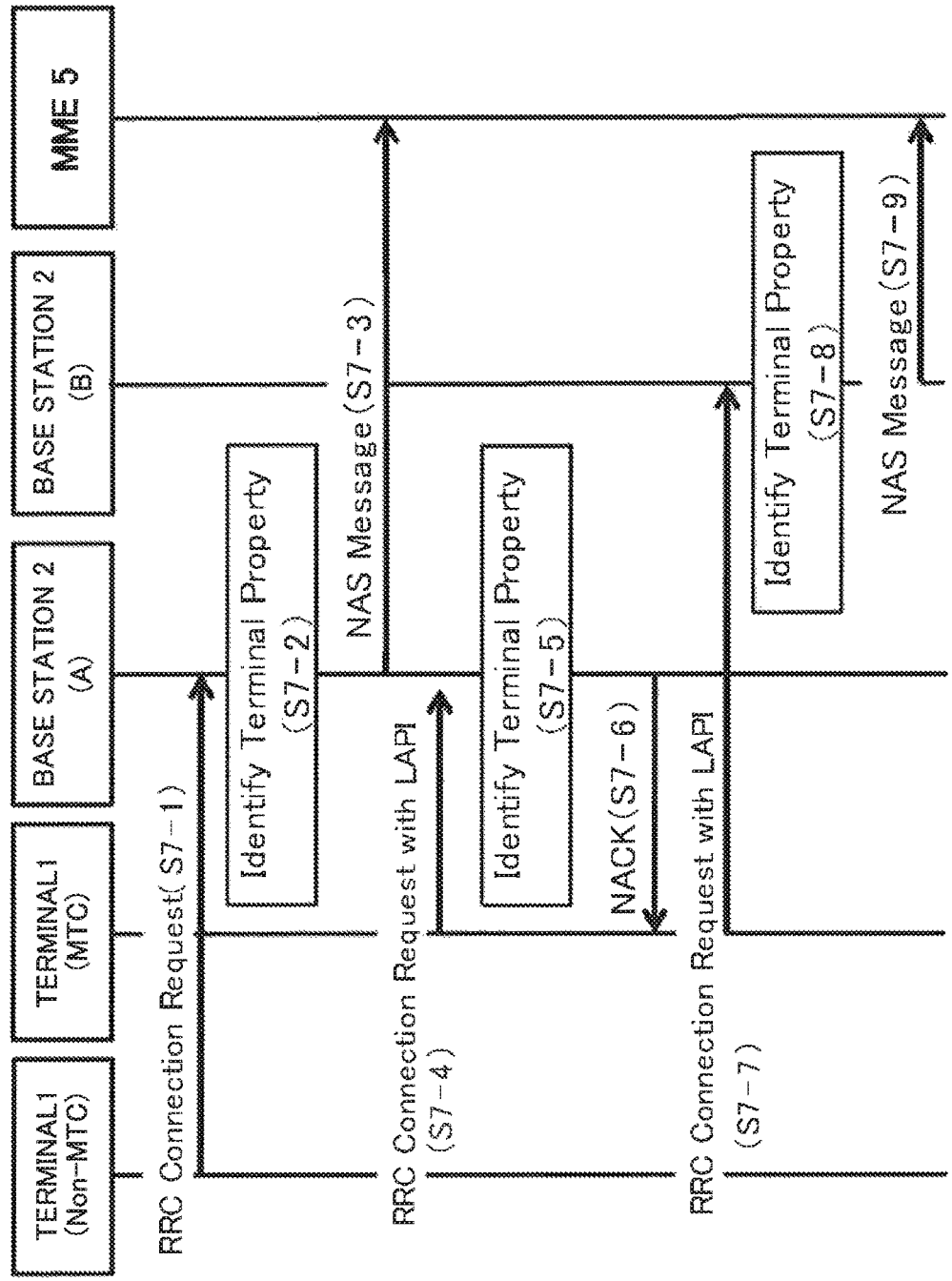
FIG. 16 is a sequence diagram illustrating an operation example of a third exemplary embodiment.

FIG. 16 is a sequence diagram showing an operation example of the third embodiment. FIG. 16 shows an example of operation in which the technique of the present invention is applied to "Attach Procedure" described in section 5.3.2 of the specification 3rd Generation Partnership Project (3GPP) (TS23.401 v 12.3.0).

The non-MTC device 1A transmits "RRC Connection Request" to the base station 2(A) in order to establish a wireless connection with the base station 2(A) (S7-1).

In response to reception of "RRC Connection Request", the identification unit 21 of the base station 2(A) identifies the terminal attribute ("Identify Terminal Property" of S7-2). For example, the base station 2(A) identifies the terminal attribute based on whether "LAPI" is included in "RRC Connection Request" received from the non-MTC device 1A. In the example of FIG. 16, "RRC Connection Request" transmitted from the non-MTC device 1A does not include "LAPI". Therefore, in S7-2, the identification unit 21 identifies that the terminal 1A is a non-MTC device.

The control unit 20 of the base station 2(A) transmits a NAS message to the MME 5 in response to the identification unit 21 identifying the terminal 1 as a non-MTC device (S7-3).

The terminal 1B (MTC device 1B) which is an MTC device transmits "RRC Connection Request" to the base station 2(A) (S7-4).

In response to reception of "RRC Connection Request", the identification unit 21 of the base station 2(A) identifies a terminal attribute ("Identify Terminal Property" of S7-5). In the example of FIG. 16, "RRC Connection Request" transmitted from the MTC device 1B includes "LAPI". Therefore, the identification unit 21 of the base station 2(A) identifies that the terminal 1B is an MTC device based on "LAPI" included in "RRC Connection Request".

In response to the identification unit 21 identifying the terminal 1B as an MTC device, the control unit 20 of the base station 2(A) transmits a rejection notification to the MTC device 1B indicating that "RRC Connection Request" is rejected ("NACK (Negative ACKnowledgment)" in S7-6)). For example, when the identification unit 21 identifies the terminal 1B as an MTC device, the control unit 20 of the base station 2(A) may transmit a rejection notification to the MTC device 1B in response to that the neighbor base station of the base station 2(A) is the base station 2 (for example, the base station 2(B)) for an MTC device. For example, the control unit 20 of the base station 2(A) may transmit a rejection notification to the MTC device 1B according to a neighbor cell of the base station 2(A) is a cell covered by the base station 2 (for example, the base station 2(B)) for an MTC device when the identification unit 21 identifies the terminal 1B as an MTC device.

The MTC device 1B retransmits "RRC Connection Request" to another base station 2 (the base station 2 (B) for an MTC device in the example of FIG. 16) (S7-7). The base station 2(B) for an MTC device is, for example, a base station associated with the MME 5 (for example, the MME 5 (B) in FIG. 2) provided for an MTC device and the virtual MME 5A. For example, when the terminal 1 is an MTC device, the base station 2(B) for an MTC device establishes a wireless connection with the terminal 1 and sets a control policy indicating that a communication session between the terminal 1 and a network node starts.

In response to reception of "RRC Connection Request", the identification unit 21 of the base station 2(B) identifies the terminal attribute ("Identify Terminal Property" in S7-8). In the example of FIG. 16, "RRC Connection Request" transmitted from the MTC device 1B includes "LAPI". Therefore, the identification unit 21 of the base station 2(B) identifies that the terminal 1B is an MTC device based on "LAPI" included in "RRC Connection Request".

The control unit 20 of the base station 2 (B) transmits the NAS message to an MME 5 (S7-9). In the example of FIG. 16, when the terminal 1 is the MTC device, the base station 2 (B) is set with a control policy indicating establishing a wireless connection with the terminal 1 and starting a communication session between the terminal 1 and a network node. Therefore, the control unit 20 of the base station 2(B) establishes a wireless connection with the terminal 1B which is an MTC device, and transmits a NAS message to the MME 5. The control unit 20 of the base station 2(B) may transmit the NAS message to an MMES (for example, the MME 5(B) in FIG. 2, the virtual MME 5A in FIG. 10) for an MTC device.

Figure 17:
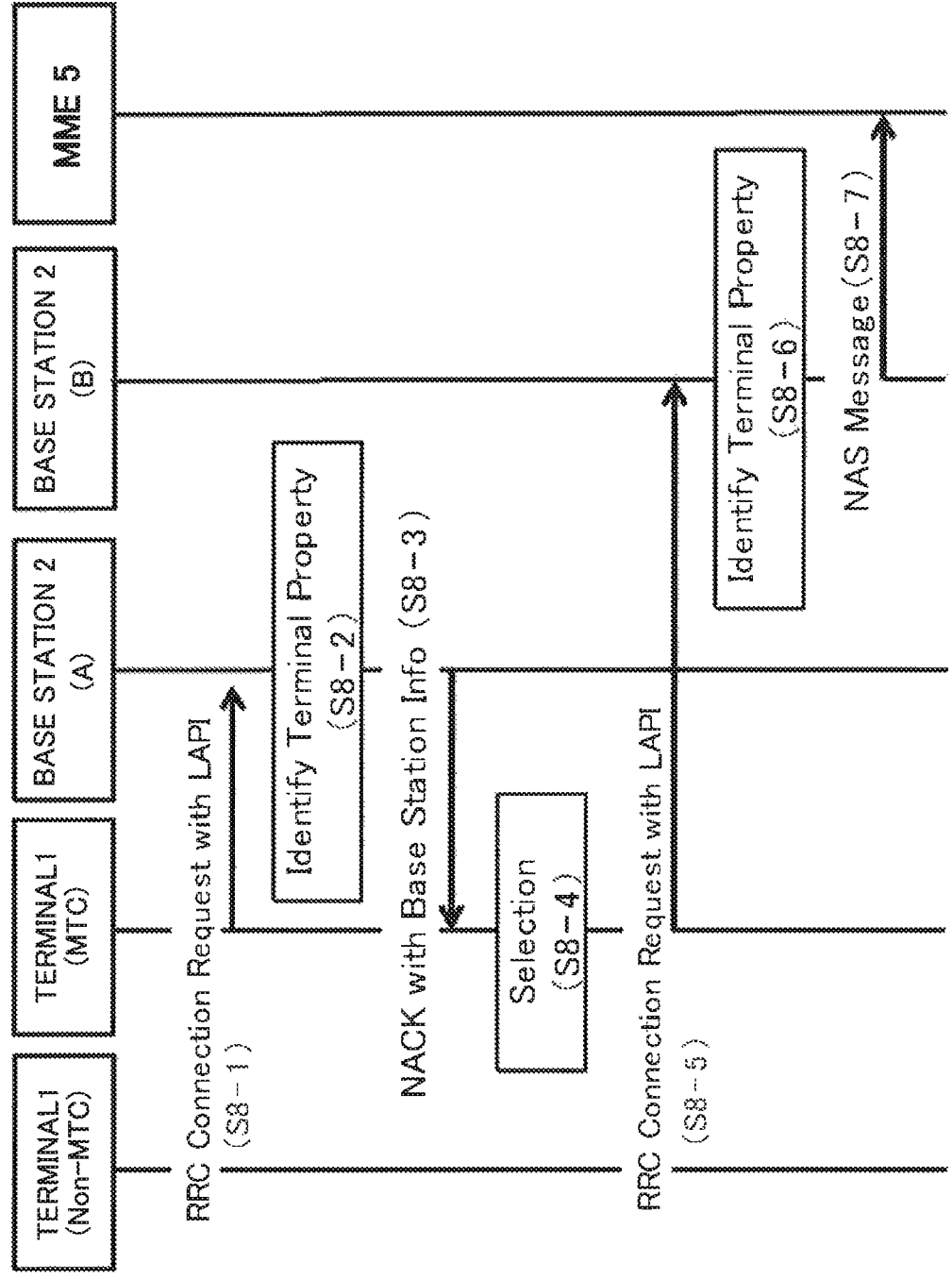
FIG. 17 is a sequence diagram illustrating another operation example of the third exemplary embodiment.

FIG. 17 is a sequence diagram illustrating another operation example of the third exemplary embodiment. FIG. 17 illustrates an operation example in cases in which information indicating the base station 2(B) for an MTC device (terminal 1B) is included in a rejection notification transmitted by the control unit 20 of the base station 2(A).

The terminal 1B (MTC device 1B) which is an MTC device transmits "RRC Connection Request" to the base station 2(A) (S8-1).

In response to reception of "RRC Connection Request", the identification unit 21 of the base station 2(A) identifies a terminal attribute (S8-2). In the example of FIG. 17, "RRC Connection Request" transmitted from the MTC device 1B includes "LAPI". Therefore, the identification unit 21 of the base station 2(A) identifies that the terminal 1B is an MTC device based on "LAPI" included in "RRC Connection Request".

In response to the identification unit 21 identifying the terminal 1B as the MTC device, the control unit 20 of the base station 2(A) transmits to the MTC device 1B a rejection notification indicating that "RRC Connection Request" has been rejected, including information indicating the base station 2(B) for the MTC device (terminal 1B) ("NACK with Base Station Info" in S8-3). The information on the base station 2 for an MTC device may be, for example, a list (a cell list) in which the base stations 2 for a plurality of MTC devices are described.

For example, the communication unit 11 of the terminal 1 reselects the base station 2(B) for an MTC device based on information (for example, information of the base station 2 and the cell list) included in a rejection notification ("Selection" in S8-4).

The communication unit 11 of the terminal 1 transmits "RRC Connection Request" to the base station 2(B) for an MTC device selected in S8-4 (S8-5).

In response to reception of "RRC Connection Request", the identification unit 21 of the base station 2(B) identifies the terminal attribute (S8-6). In the example of FIG. 17, "RRC Connection Request" transmitted from the MTC device 1B includes "LAPI". Therefore, the identification unit 21 of the base station 2(B) identifies that the terminal 1B is an MTC device based on "LAPI" included in "RRC Connection Request".

The control unit 20 of the base station 2 (B) transmits the NAS message to the MME 5 (S8-7). In the example of FIG. 17, when the terminal 1 is the MTC device, the base station 2 (B) is set with a control policy indicating establishing a wireless connection with the terminal 1 and starting a communication session between the terminal 1 and a network node. Therefore, the control unit 20 of the base station 2(B) establishes a wireless connection with the terminal 1B which is an MTC device, and transmits a NAS message to the MME 5. The control unit 20 of the base station 2(B) may transmit the NAS message to an MMES (for example, the MME 5(B) in FIG. 2, the virtual MME 5A in FIG. 10) for an MTC device.

Figure 18:
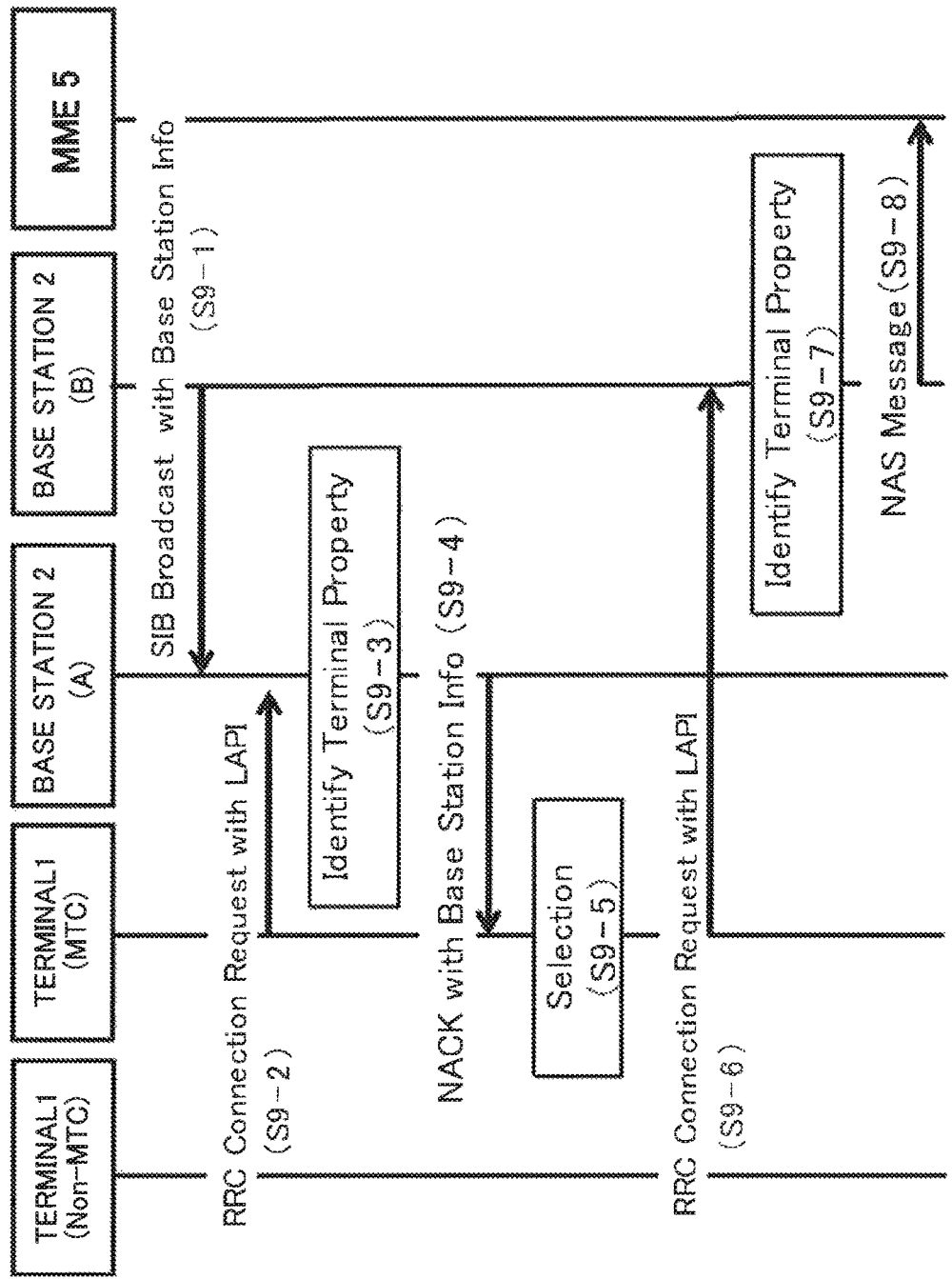
FIG. 18 is a sequence diagram illustrating another operation example of the third exemplary embodiment.

FIG. 18 is a sequence diagram illustrating another operation example of the third exemplary embodiment. FIG. 18 is an operation example when the base station 2(B) for an MTC device informs the other base stations 2 system information on the base station 2(B) in advance.

The base station 2(B) for an MTC device broadcasts System Information Block (SIB) including information on its own device (base station 2(B)) to other base stations 2 ("SIB Broadcast with Base Station Info" in S9-1). The system information block includes, for example, information on a variety of parameters of the base station 2(B) and information on a cell covered by the base station 2(B). A system information block transmitted from the base station 2(B) for an MTC device includes, for example, information indicating a base station for an MTC device. The identification unit 21 of the base station 2(A) identifies the base station 2(B) as a base station for an MTC device based, for example, on that information indicating a base station for an MTC device is included in the received system information block.

The terminal 1B (MTC device 1B) as the MTC device transmits "RRC Connection Request" to the base station 2(A) (S9-2).

In response to reception of "RRC Connection Request", the identification unit 21 of the base station 2(A) identifies a terminal attribute (S9-3). In the example of FIG. 18, "RRC Connection Request" transmitted from the MTC device 1B includes "LAPI". Therefore, the identification unit 21 of the base station 2(A) identifies that the terminal 1B is an MTC device based on "LAPI" included in "RRC Connection Request".

In response to the identification unit 21 identifying the terminal 1B as the MTC device, the control unit 20 of the base station 2(A) transmits to the MTC device 1B a rejection notification indicating that "RRC Connection Request" has been rejected, including information indicating the base station 2 for the MTC device ("NACK with Base Station Info" in S9-4). Information indicating the base station 2 for an MTC device may be, for example, a list (a cell list) in which the base stations 2 for a plurality of MTC devices are described.

For example, the communication unit 11 of the terminal 1 reselects the base station 2(B) for an MTC device based on information (for example, information of the base station 2 and the cell list) included in a rejection notification ("Selection" in S9-5).

The communication unit 11 of the terminal 1 transmits "RRC Connection Request" to the base station 2(B) for an MTC device selected in S9-5 (S9-6).

In response to reception of "RRC Connection Request", the identification unit 21 of the base station 2(B) identifies the terminal attribute (S9-7). In the example of FIG. 18, "RRC Connection Request" transmitted from the MTC device 1B includes "LAPI". Therefore, the identification unit 21 of the base station 2(B) identifies that the terminal 1B is an MTC device based on "LAPI" included in "RRC Connection Request".

The control unit 20 of the base station 2 (B) transmits the NAS message to an MME 5 (S9-8). In the example of FIG. 18, when the terminal 1 is the MTC device, the base station 2 (B) is set with a control policy indicating establishing a wireless connection with the terminal 1 and starting a communication session between the terminal 1 and a network node. Therefore, the control unit 20 of the base station 2(B) establishes a wireless connection with the terminal 1 which is an MTC device, and transmits a NAS message to the MME 5. The control unit 20 of the base station 2(B) may transmit the NAS message to an MMES (for example, the MME 5(B) in FIG. 2, the virtual MME 5A in FIG. 10) for an MTC device.

Fourth Exemplary Embodiment

A fourth exemplary embodiment of the present invention will be described with reference to the drawings. The fourth exemplary embodiment explains an operation example when a case in which the MME 5 identifies the terminal attribute of the terminal 1 is applied to the 3GPP standard specification (for example, 3GPP TS23.401). A technique of the fourth exemplary embodiment can be applied to any of the first to third exemplary embodiments and the below-described embodiments.

Figure 19:
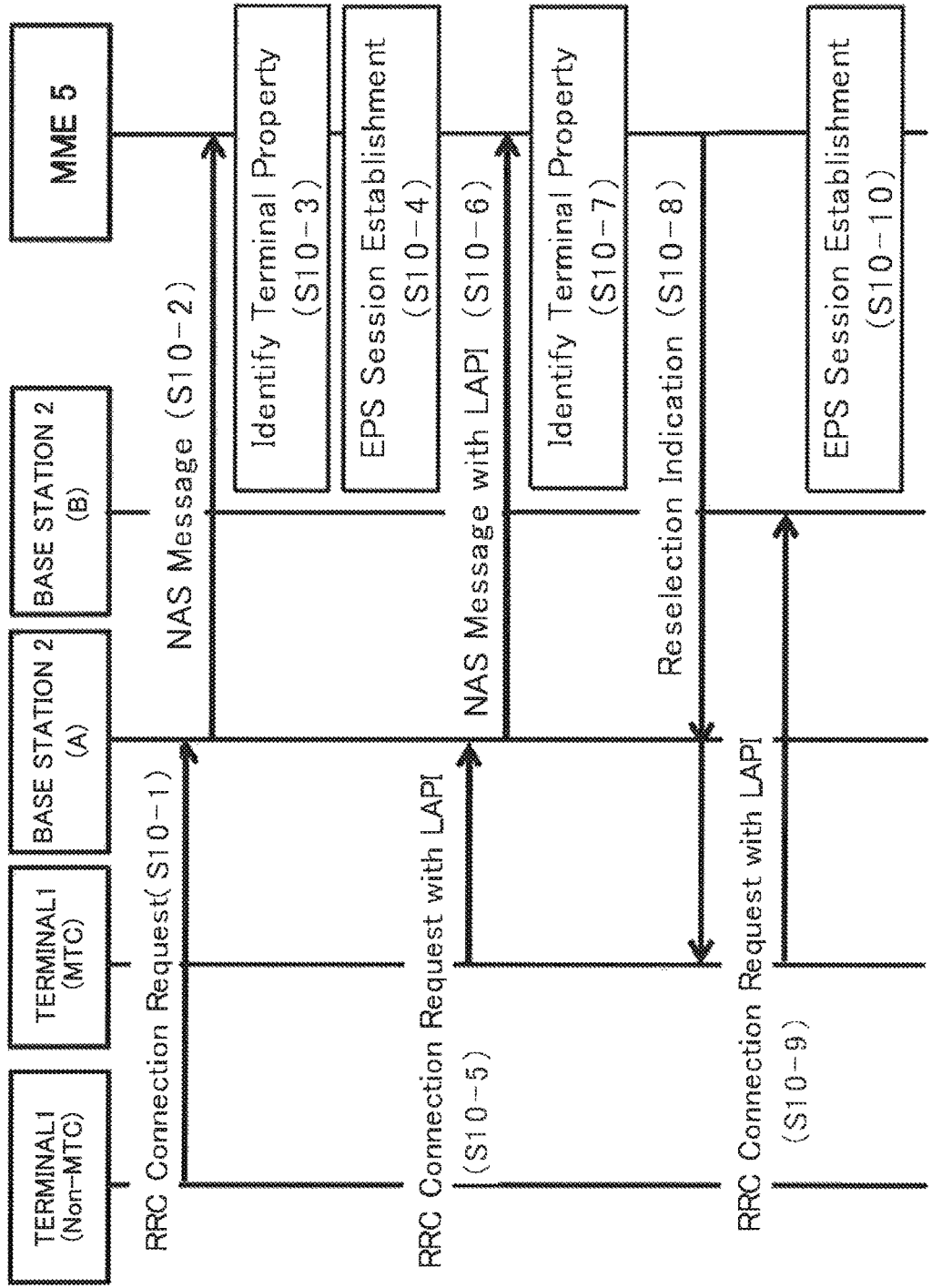
FIG. 19 is a sequence diagram illustrating an operation example of a fourth exemplary embodiment.

FIG. 19 is a sequence diagram showing an operation example of the fourth embodiment. FIG. 19 shows an example of operation in which the technique of the present invention is applied to "Attach Procedure" described in section 5.3.2 of the specification 3rd Generation Partnership Project (3GPP) (TS23.401 v 12.3.0).

The non-MTC device 1A transmits "RRC Connection Request" to the base station 2 in order to establish a wireless connection with the base station 2 (S10-1).

The base station 2(A) which has received "RRC Connection Request" transmits a NAS message to the MME 5 (S10-2).

In response to reception of a NAS message, the identification unit 51 of the MME 5 identifies a terminal attribute ("Identify Terminal Property" in S10-3). For example, the MME 5 identifies the terminal attribute based on whether or not "LAPI" is included in the NAS message received from the base station 2(A). In the example of FIG. 19, "LAPI" is not included in the NAS message transmitted from the base station 2(A). Therefore, in S10-3, the identification unit 51 identifies that the terminal 1A is a non-MTC device.

In response to identifying that the terminal 1A is a non-MTC device, the identification unit 51 of the MME 5 starts an EPS bearer establishment procedure ("EPS Session Establishment" in S10-4). By starting the EPS (Evolved Packet System) bearer establishment procedure by the MME 5, control signals are exchanged between a SGW 3, a PGW 4, the MME 5 and the base station 2(A). An EPS bearer is established by exchanging control signals between nodes. The non-MTC device 1A communicates via the established EPS bearer. The base station 2(A) transmits and receives communication data related to the non-MTC device 1A via the EPS bearer.

The terminal 1B (MTC device 1B) which is an MTC device transmits "RRC Connection Request" to the base station 2(A) (S10-5).

The base station 2(A) which has received "RRC Connection Request" transmits a NAS message to the MME 5 (S10-6).

In response to reception of a NAS message, the identification unit 51 of the MME 5 identifies a terminal attribute ("Identify Terminal Property" in S10-7). In the example of FIG. 19, "RRC Connection Request" transmitted from the MTC device 1B includes "LAPI". Therefore, in S10-7, the identification unit 51 identifies that the terminal 1B is an MTC device.

In response to identifying that the terminal 1B is an MTC device, the identification unit 51 of the MME 5 notifies the terminal 1B of a control signal instructing reselection of the base station 2 ("Reselection Indication" in S10-8). The control signal instructing reselection of the base station 2 may be, for example, a rejection notification (NACK) indicating that "RRC Connection Request" is rejected. The identification unit 51 of the MME 5 may include information indicating a reason for rejection in the rejection notification (NACK). The information indicating the reason for rejection is, for example, information indicating that the terminal 1B is rejected because it is an MTC device.

The MTC device 1B retransmits "RRC Connection Request" to another base station 2 (for example, the base station 2(B) for an MTC device) (S10-9).

In response to notification of the control signal instructing the terminal 1B to reselect the base station 2, the identification unit 51 of the MME 5 starts an EPS bearer establishment procedure ("EPS Session Establishment" in S10-10). A control signal is exchanged between the SGW 3, the PGW 4, the MME 5 and the base station 2(B) by starting the EPS bearer establishment procedure by the MME 5. An EPS bearer is established by exchanging control signals between nodes. The MTC device 1B communicates via the established EPS bearer. The base station 2(B) transmits and receives communication data on the MTC device 1B via the EPS bearer.

Figure 20:
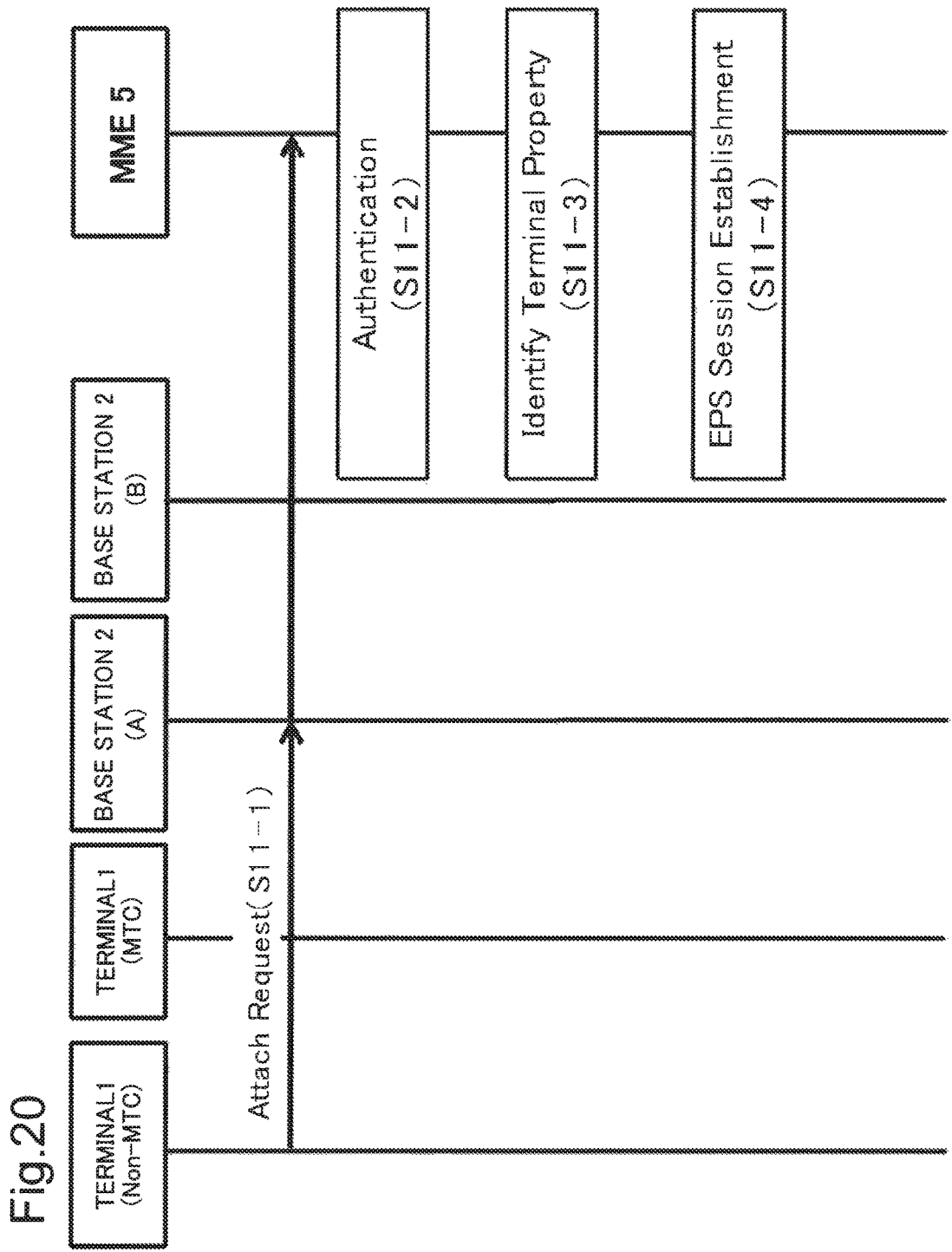
FIG. 20 is a sequence diagram illustrating another operation example of a fourth exemplary embodiment.
Figure 21:
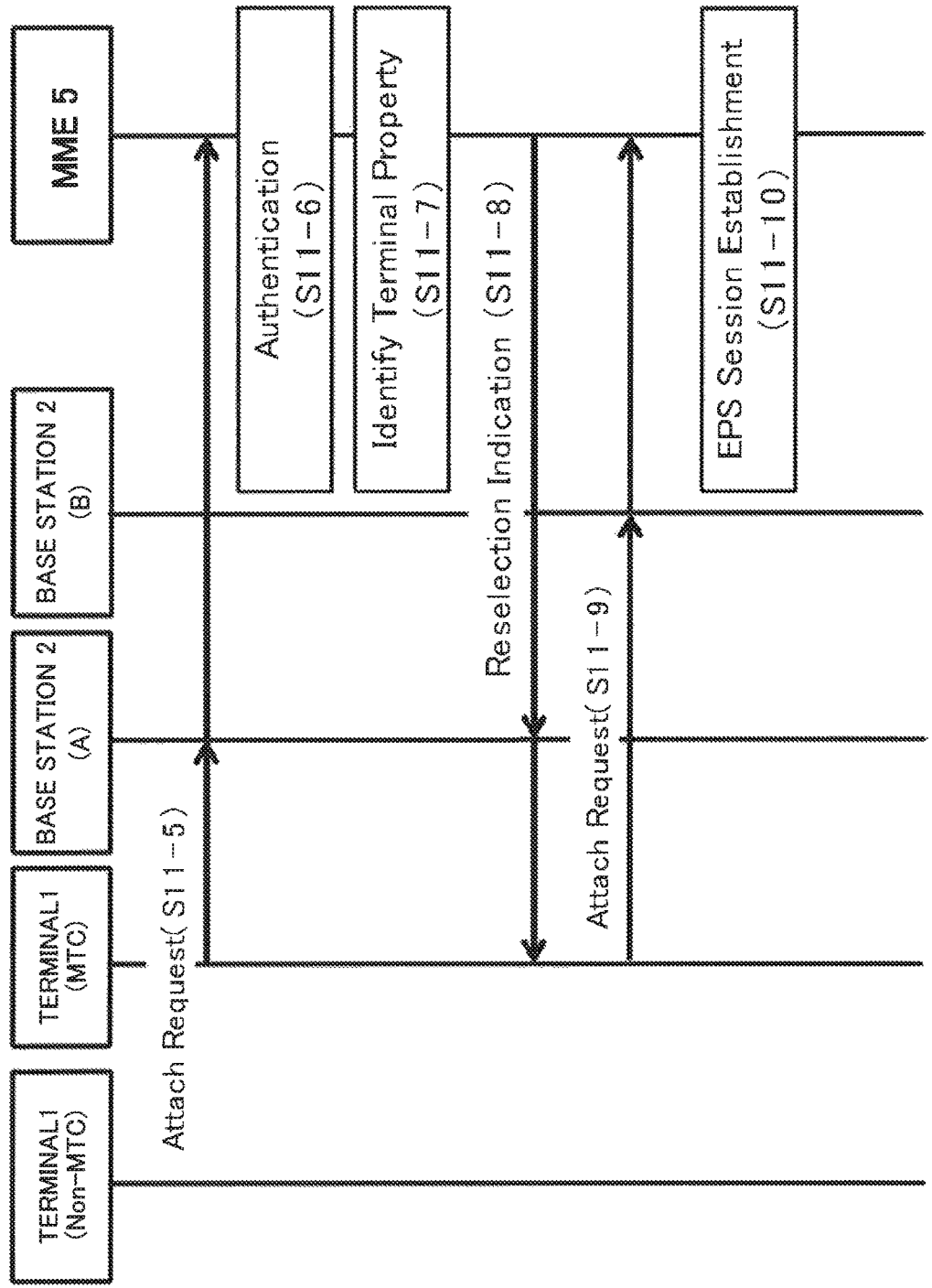
FIG. 21 is a sequence diagram illustrating another operation example of a fourth exemplary embodiment.
Figure 22:
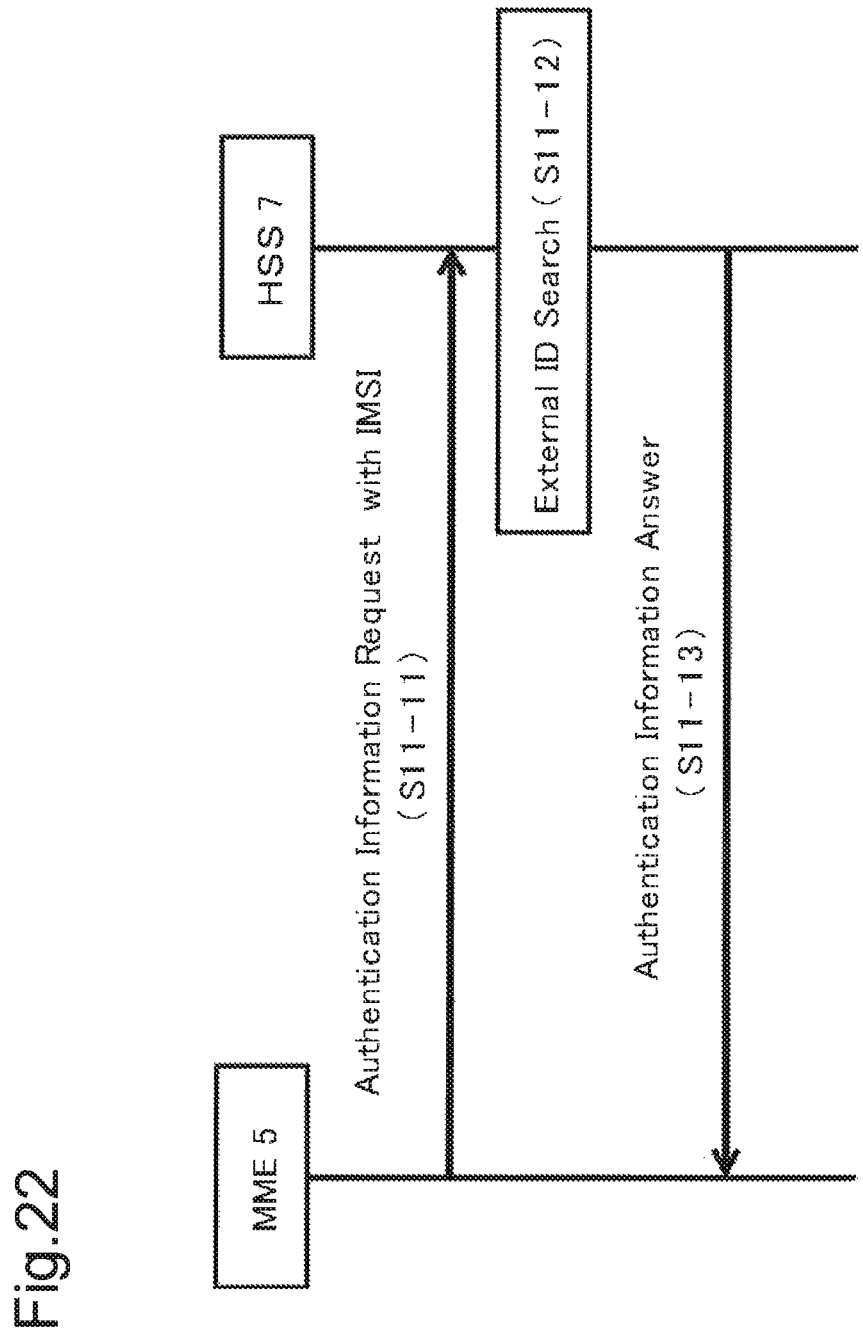
FIG. 22 is a sequence diagram illustrating another operation example of a fourth exemplary embodiment.

FIGS. 20 to 22 are sequence diagrams illustrating another operation example of the fourth exemplary embodiment. FIGS. 20 to 22 illustrate an operation example in which a technique of the present invention is applied to the "Attach Procedure" described in Section 5.3.2 of 3GPP (3rd Generation Partnership Project) specification (TS23.401 v12.3.0).

The non-MTC device 1A transmits "Attach Request" to the base station 2 (S11-1). The base station 2 transmits "Attach Request" to the MME 5.

For example, the MME 5 executes an authentication procedure of the non-MTC device 1A based on an IMSI (International Mobile Subscriber Identity) included in the received "Attach Request" ("Authentication" in S11-2). An IMSI is identification information of the terminal.

In the authentication procedure, the MME 5 identifies a terminal attribute (511-3). The MME 5 identifies terminal an attribute based on an IMSI included in "Attach Request".

FIG. 22 is an operation example in cases in which the MME 5 executes an authentication procedure of the terminal 1.

The MME 5 transmits "Authentication Information Request" to the HSS (Home Subscriber Server) 7 (S11-11). "Authentication Information Request" includes an IMSI.

The HSS 7 can manage "External Identifier" which is identification information for an external AS (Application Server) to identify an MTC device. For example, the external AS calls an MTC device based on "External Identifier" (Call procedure in which the external AS triggers). For example, an M2M service provider uses "External Identifier" to identify an MTC device. For example, the HSS 7 manages an IMSI in association with "External Identifier".

In response to reception of "Authentication Information Request", the HSS 7 searches for "External Identifier" ("External ID Search" in S11-12). For example, the HSS 7 searches for "External Identifier" associated with an IMSI included in "Authentication Information Request".

The HSS 7 includes the search result of "External Identifier" in "Authentication Information Answer" and transmits it to the MME 5 (S11-13). For example, when information indicating that "External Identifier" is searched for in "Authentication Information Answer" is included in the MME 5, the MME 5 determines that the terminal is an MTC device. For example, when information indicating that "External Identifier" is searched for in "Authentication Information Answer" is not included in the MME 5, the MME 5 determines that the terminal is not an MTC device.

The MME 5 may identify a terminal attribute based on whether or not "LAPI" is included in the received "Attach Request".

In FIG. 20, in response to identifying that the terminal 1A is a non-MTC device, the identification unit 51 of the MME 5 starts an EPS bearer establishment procedure (S11-4).

The MTC device 1B transmits "Attach Request" to the base station 2 (S11-5). The base station 2 transmits "Attach Request" to the MME 5.

The MME 5 executes an authentication procedure of the MTC device 1B based on an IMSI included in the received "Attach Request" (S11-6).

In the authentication procedure, the MME 5 identifies a terminal attribute (S11-7). A method by which the MME 5 identifies the terminal attribute is similar to the operation example illustrated in FIG. 22.

In response to identifying the terminal 1B as an MTC device, the identification unit 51 of the MME 5 notifies the terminal 1B of a control signal instructing reselection of the base station 2 (S11-8). The control signal instructing reselection of the base station 2 may be, for example, a rejection notification (NACK) indicating that "RRC Connection Request" is rejected.

The MTC device 1B retransmits "Attach Request" to another base station 2 (for example, the base station 2(B) for an MTC device) (S11-9).

In response to notification of a control signal instructing the terminal 1B to reselect the base station 2, the identification unit 51 of the MME 5 starts an EPS bearer establishment procedure (S11-10).

Figure 23:
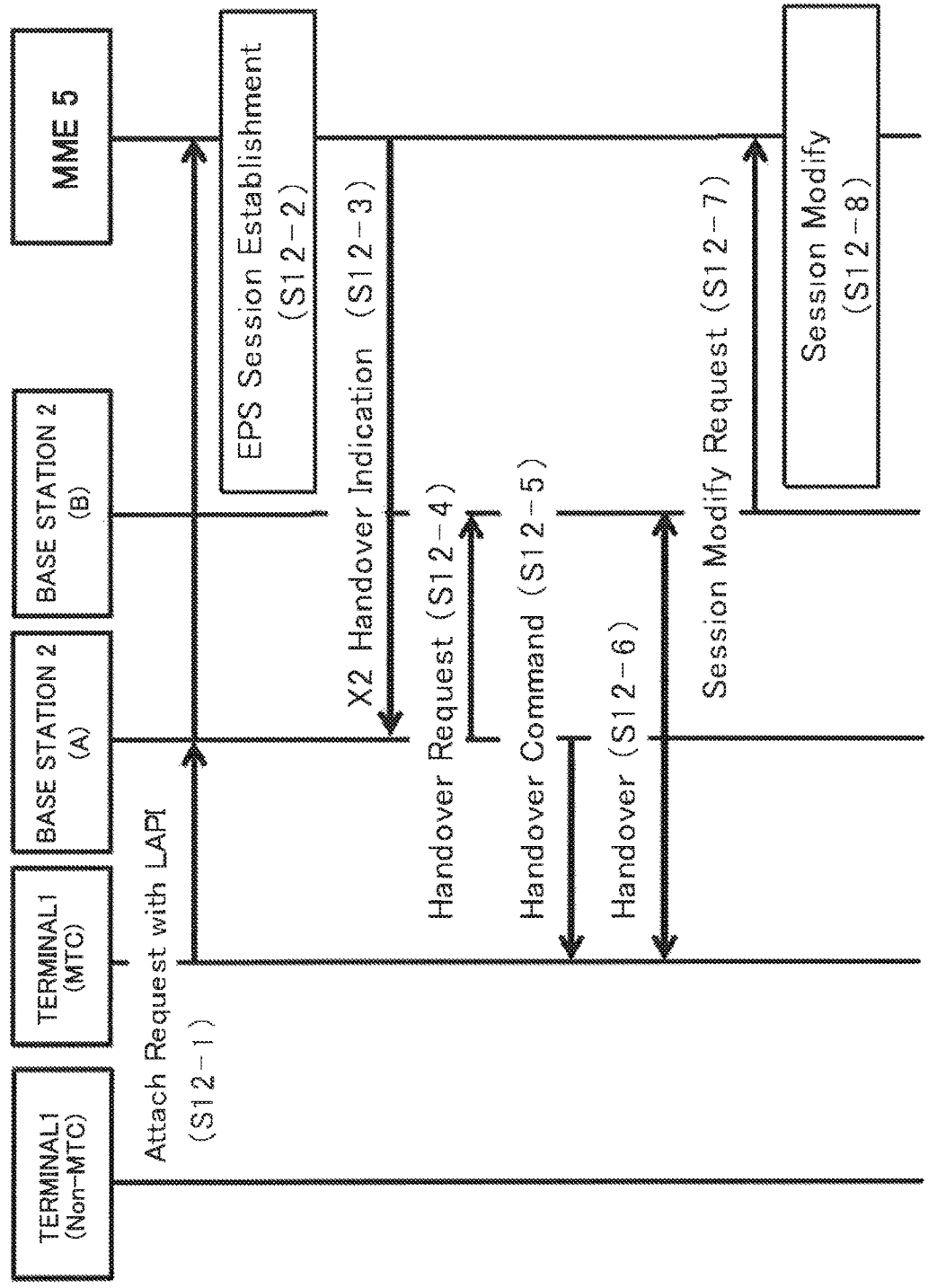
FIG. 23 is a sequence diagram illustrating another operation example of a fourth exemplary embodiment.

FIG. 23 is a sequence diagram illustrating another operation example of the fourth exemplary embodiment. FIG. 23 illustrates an example of operation of the case in which the base station 2(A) executes handover of the MTC device 1B via an X2 interface set up with the base station 2(B) for an MTC device in response to an instruction from the MME 5.

The MTC device 1B transmits "Attach Request" to the base station 2 (S12-1). The base station 2 transmits "Attach Request" to the MME 5.

In response to reception of "Attach Request", the control unit 50 of the MME 5 starts an EPS bearer establishment procedure (S12-2). By starting the EPS bearer establishment procedure by the MME 5, control signals are exchanged between the SGW 3, the PGW 4, the MME 5, and the base station 2 (A). An EPS bearer is established by exchanging control signals between nodes. The MTC device 1B communicates via the established EPS bearer. The base station 2(A) transmits and receives communication data related to the MTC device 1B via the EPS bearer.

The identification unit 51 of the MME 5 identifies a terminal attribute based on "Attach Request". When the terminal 1B is an MTC device, the identification unit 51 instructs the terminal 1B to execute handover ("X2 Handover Indication" in S12-3).

The control unit 20 of the base station 2(A) transmits a handover request (Handover Request) to the base station 2(B) for an MTC device based on an instruction from the MME 5 (S12-4).

The control unit 20 of the base station 2(A) transmits a handover instruction (Handover Command) to the terminal 1B in response to a handover response (ACK) from another base station 2(B) for an MTC device (S12-5).

In response to reception of the handover instruction, the terminal 1B executes connection processing with the base station 2(B) for an MTC device ("Handover" in S12-6).

The control unit 20 of the base station 2(B) requests the MME 5 to switch a session ("Session Modify Request" in S12-7).

In response to a request from the base station 2(B), the control unit 50 of the MME 5 executes session switching processing ("Session Modify" in S12-8). The control unit 50 of the MME 5, for example, notifies the SGW 3 of the address of the base station 2(B) and a TEID (Tunnel Endpoint Identifier) which is an identifier of a session, and requests updating of the session. The control unit 50 of the MME 5 receives, for example, a session update response from the SGW 3.

Fifth Exemplary Embodiment

A fifth exemplary embodiment of the present invention will be described with reference to the drawings. The fifth exemplary embodiment is an embodiment in cases in which the MTC device 1B can select the base station 2 that transmits a connection request based on information on the base station 2 for an MTC device received in advance.

Figure 24:
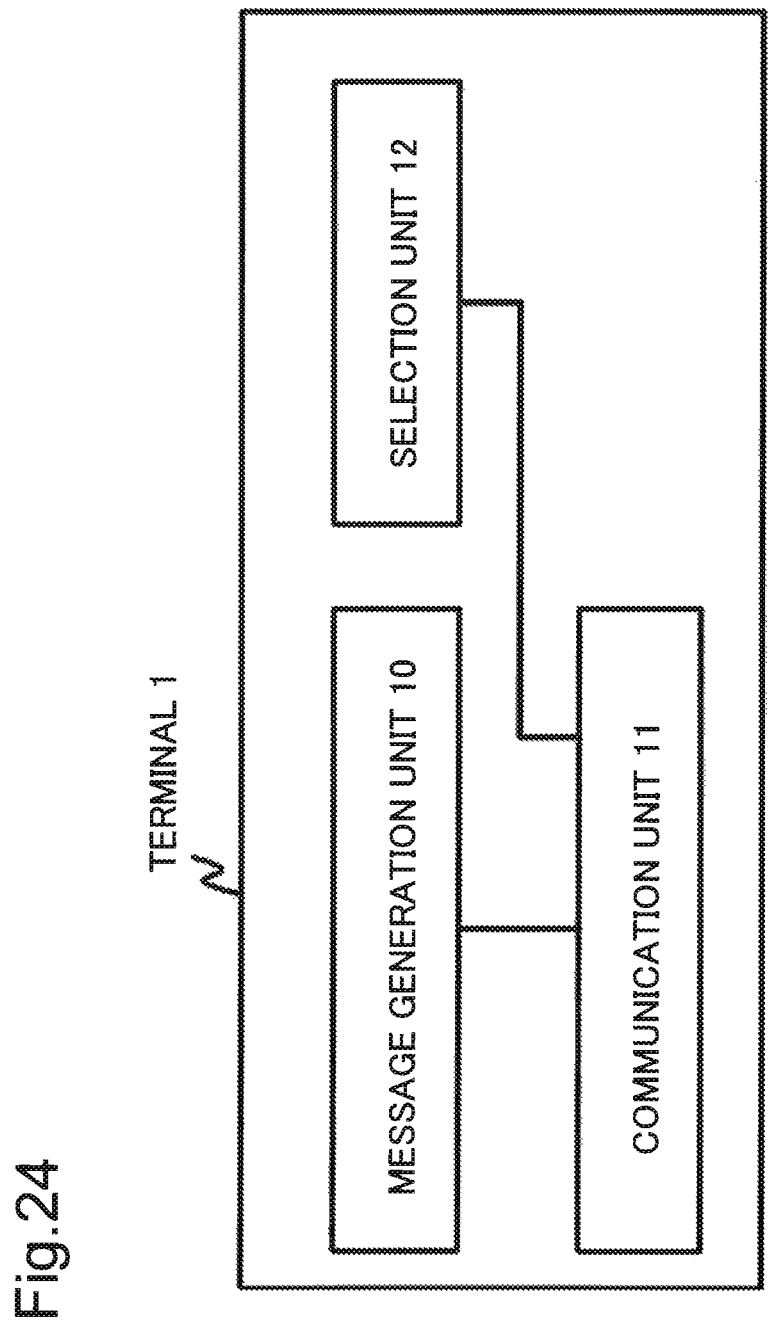
FIG. 24 is a diagram illustrating a configuration example of a terminal 1 of a fifth exemplary embodiment.

FIG. 24 illustrates a configuration example of the terminal 1 according to the fifth exemplary embodiment. As illustrated in FIG. 24, the terminal 1 includes a message generation unit 10, a communication unit 11, and a selection unit 12. The message generation unit 10 is similar to the configuration example of FIG. 6, and therefore, a detailed description thereof will be omitted.

The communication unit 11 receives a system information block (SIB) including information on the base station 2(B) from the base station 2(B) for an MTC device. Information on the base station 2(B) includes, for example, information on a variety of parameters of the base station 2(B) and information on cells covered by the base station 2(B). The information on the base station 2(B) includes, for example, information indicating a base station for an MTC device.

The communication unit 11 transmits a message generated by the message generation unit 10 to the base station 2 selected by the selection unit 12.

The selection unit 12 can identify an attribute of the base station 2 based on the received system information block. The selection unit 12 identifies the base station 2(B) as the base station for the MTC device based on, for example, a system information block (SIB) received from the base station 2(B) contains information indicating a base station for an MTC device.

Based on an attribute of the terminal 1, the selection unit 12 selects the base station 2 that transmits a message. For example, when an attribute of the terminal 1 is an MTC device, the selection unit 12 selects the base station 2 that transmits a message from the base station 2 (for example, the base station 2(B)) for an MTC device.

Figure 25:
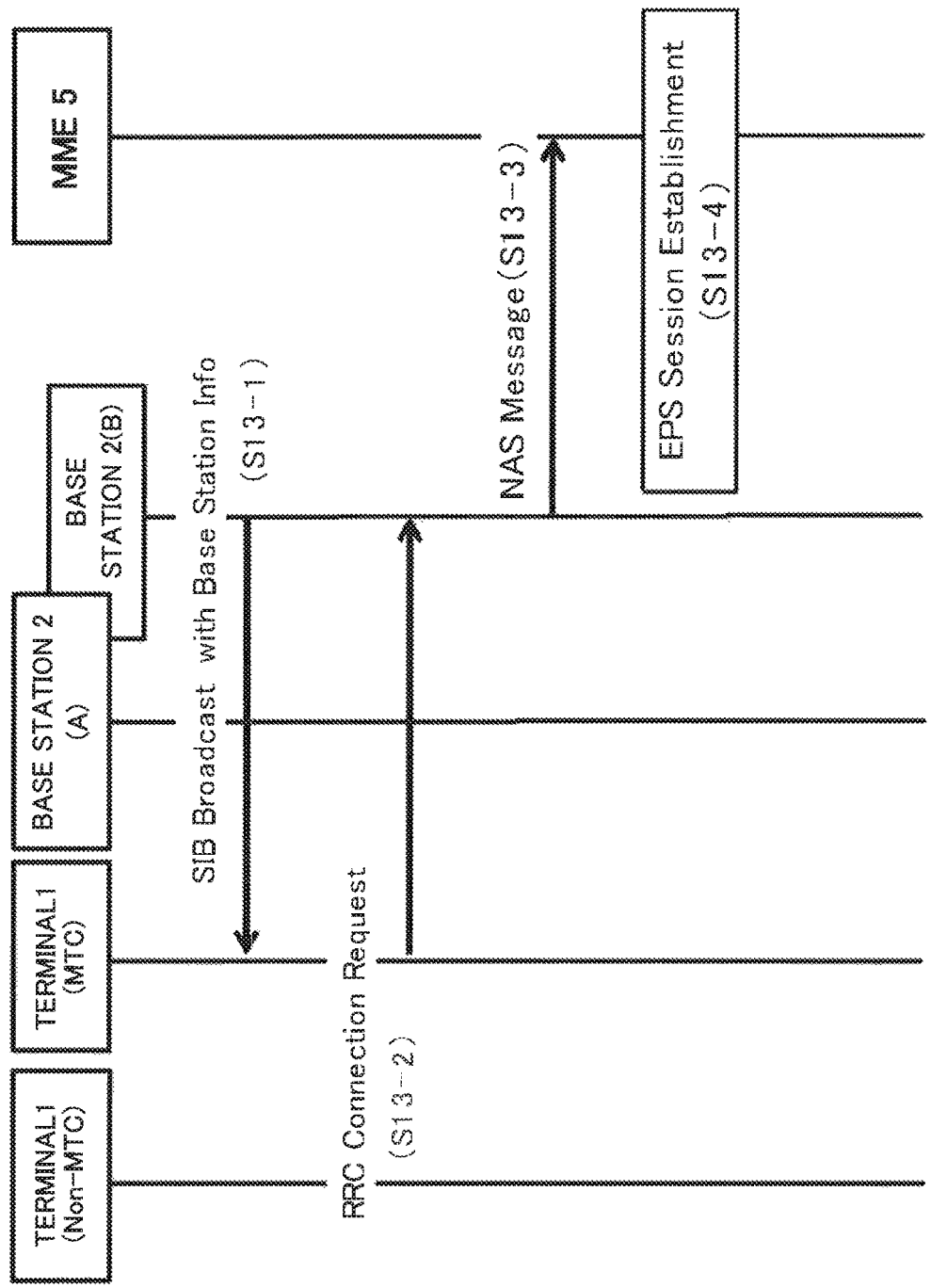
FIG. 25 is a sequence diagram illustrating an operation example of the fifth exemplary embodiment.

FIG. 25 is a sequence diagram illustrating an operation example of the fifth exemplary embodiment.

The base station 2(B) for an MTC device broadcasts in advance a system information block (SIB) including information indicating a base station for an MTC device to the terminal 1 (S13-1). Based on, for example, information indicating a base station for an MTC device is included in the received system information block, the terminal 1 identifies the base station 2(B) which transmitted the system information block as a base station for an MTC device.

The terminal 1B for an MTC device transmits "RRC Connection Request" to the base station 2(B) for an MTC device identified based on the received system information block (S13-2).

In response to reception of "RRC Connection Request", the control unit 20 of the base station 2(B) transmits a NAS message to the MME 5 (S13-3). The base station 2(B) may transmit a NAS message to an MME for an MTC device (for example, the MME(B)5 in FIG. 2, the virtual MME 5A in FIG. 10).

In response to reception of the NAS message, the identification unit 51 of the MME 5 starts an EPS bearer establishment procedure (S13-4).

Figure 26:
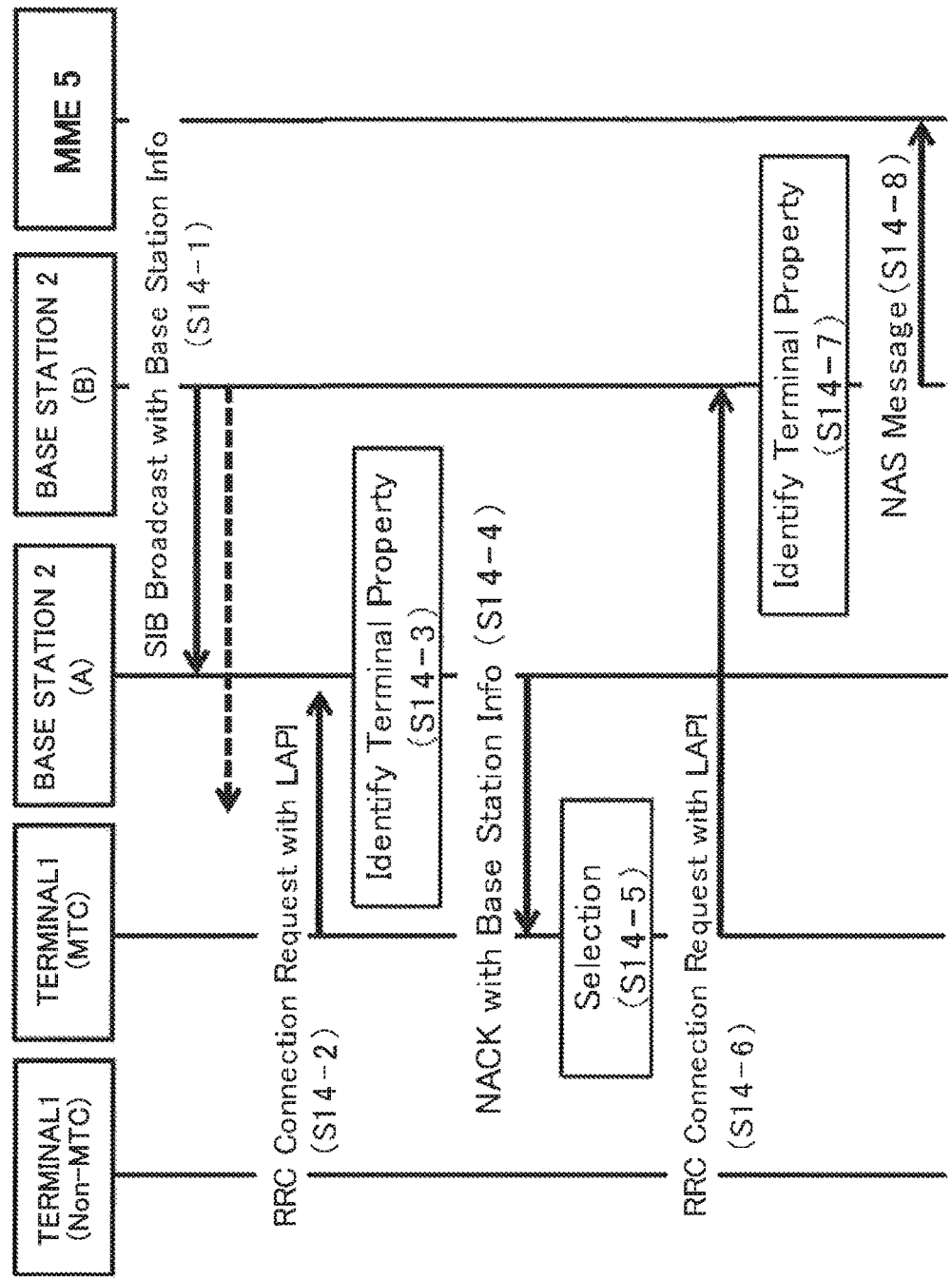
FIG. 26 is a sequence diagram illustrating another operation example of the fifth exemplary embodiment.

FIG. 26 is a sequence diagram illustrating an operation example of the fifth exemplary embodiment.

The base station 2 for an MTC device (for example, the base station 2(B)) broadcasts a system information block (SIB) including information on its own device (for example, the base station 2(B)) to the terminal 1 and another base station 2 (S14-1).

Since operation examples of S14-2 to S14-8 are similar to the operation examples of S9-2 to S9-8 of FIG. 18, the details thereof will be omitted. In S14-5, the selection unit 12 of the terminal 1 may reselect the base station 2(B) for an MTC device based on the information included in the rejection notification from the base station 2(A). Similar to S9-8 in FIG. 18, in S14-8, the control unit 20 of the base station 2(B) may transmit a NAS message to the MME 5 (for example, the MME 5(B) in FIG. 2, the virtual MME 5A in FIG. 10) for an MTC device.

As described above, in the fifth exemplary embodiment, the MTC device 1B can select the base station 2 that transmits a message based on information on the base station 2 for an MTC device received in advance.

Therefore, the MTC device 1B can reduce transmission and reception of control signals necessary for selecting and determining the base station 2 to be connected.

Sixth Exemplary Embodiment

A sixth exemplary embodiment of the present invention will be described with reference to the drawings. In the sixth exemplary embodiment, a controller centrally manages a policy relating to a connection between the terminal 1 and the base station 2. This improves the efficiency of an operation management of the policy relating to a connection between the terminal 1 and the base station 2 is improved. A technique of the sixth exemplary embodiment can be applied to any of the first to fifth exemplary embodiments and the below-described embodiments.

Figure 27:
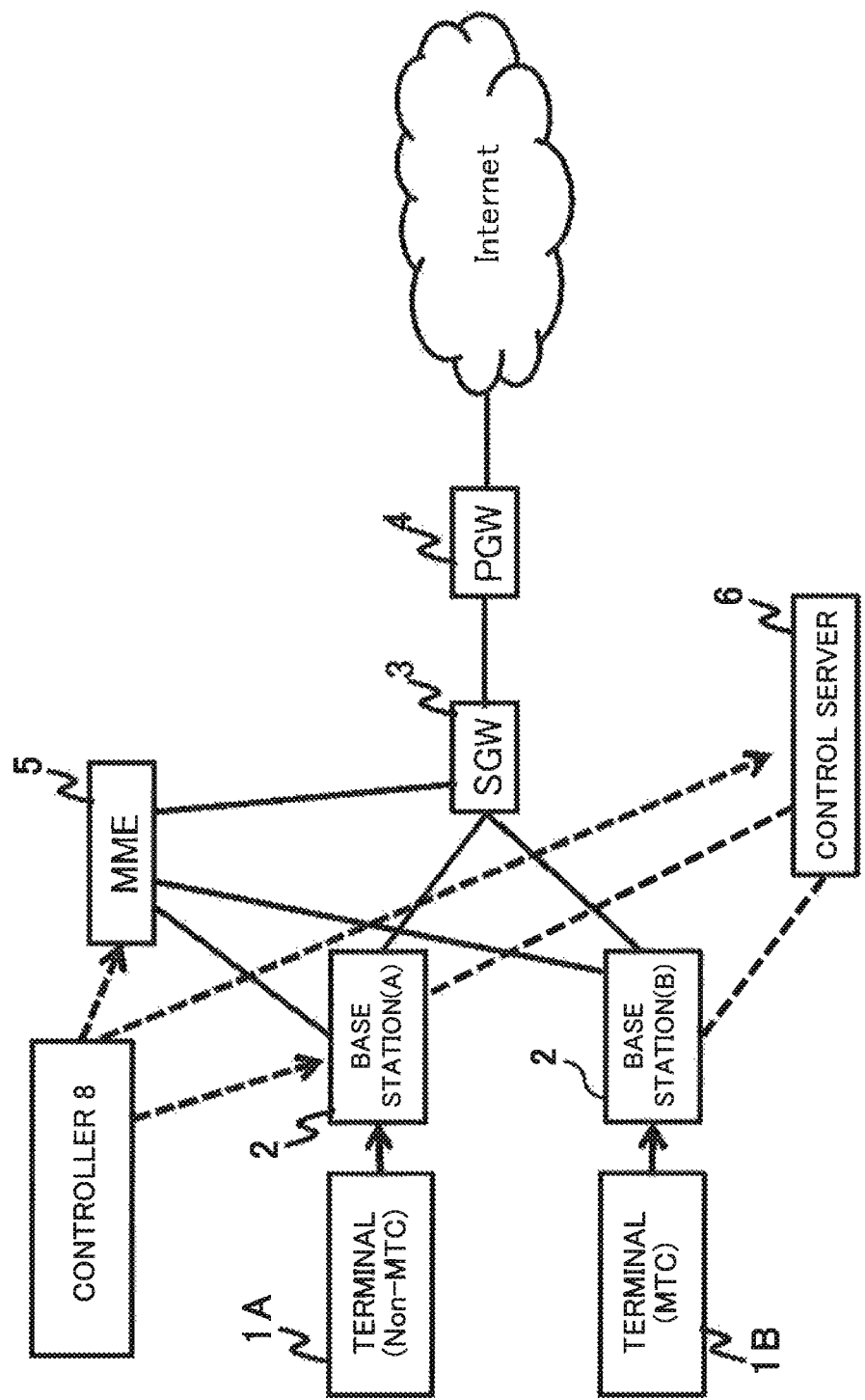
FIG. 27 is a diagram illustrating a configuration example of a communication system of a sixth exemplary embodiment.

FIG. 27 is a diagram illustrating a configuration example of the communication system of the sixth exemplary embodiment.

A controller 8 has a function of notifying the base station 2, the MME 5, and a control server 6 of a policy on a connection between the terminal 1 and the base station 2.

The terminal 1, the base station 2, the SGW 3, the PGW 4, the MME 5, and the control server 6 are the same as the configuration examples of the above-described embodiment, and therefore a detailed description thereof will be omitted. The direction of the arrow in the drawing is an example and does not limit the direction of a signal between blocks.

Figure 28:
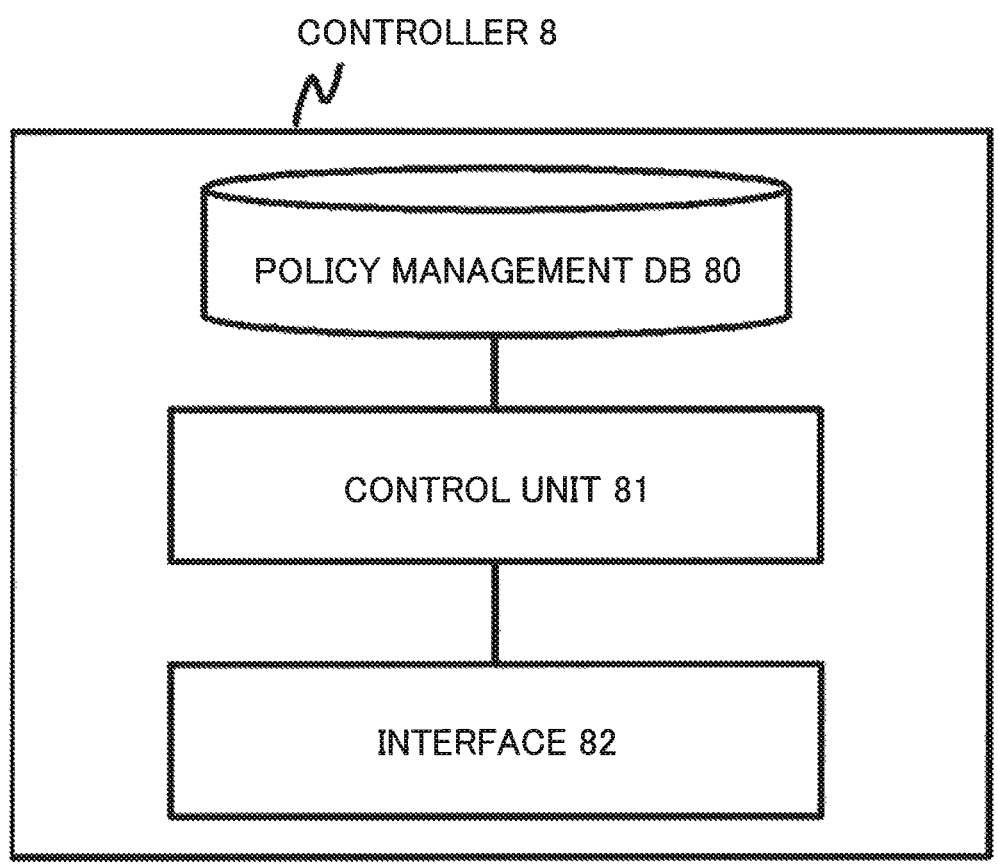
FIG. 28 is a diagram illustrating a configuration example of a controller 8 of the sixth exemplary embodiment.

FIG. 28 is a diagram illustrating a configuration example of the controller 8 according to the sixth exemplary embodiment.

The controller 8 includes a policy management DB (Data Base) 80, a control unit 81, and an interface 82.

The interface 82 is an interface for communicating with the base station 2, the MME 5, or the control server 6. The controller 8 can communicate with the base station 2, the MME 5 and the control server 6, for example, via the interface 82 by a predetermined protocol.

The policy management DB 80 is a database that manages policies relating to a connection between the terminal 1 and the base station 2. For example, a network operator can enter a policy in the policy management DB 80.

The control unit 81 refers to the policy management DB 80 and notifies the base station 2, the MME 5, and the control server 6 of a policy. The control unit 81 notifies the base station 2, the MME 5, and the control server 6 of the policy via the interface 82.

The controller 8 is, for example, an SON server. The controller 8 may be, for example, an operation management apparatus used by a network operator.

For example, the policy management DB 80 manages a policy relating to a connection between the terminal 1 and the base station 2. An example of a policy stored in the policy management DB 80 will be described below.

(Policy Relating to Type of Terminal)

Permitting a connection request from an MTC device, and rejecting a connection request from a non-MTC device Permitting a connection request from a non-MTC device, and rejecting a connection request from an MTC device Permitting a connection request from a predetermined MTC device (for example, a smart meter), and rejecting a connection request from another type of MTC device Permitting a connection request from an MTC device belonging to a predetermined MTC device group, and rejecting a connection request from an MTC device belonging to another MTC device group Permitting a connection request from a terminal corresponding to a predetermined user attribute (for example, a premium user), and rejecting a connection request from a terminal corresponding to another user attribute (for example, a general user)

Permitting a connection request from a terminal corresponding to a predetermined user attribute (for example, a general user), and rejecting a connection request from a terminal corresponding to another user attribute (for example, a premium user)

Rejecting a connection request from a terminal of a user whose communication amount exceeds a predetermined value Making an MTC device connected to a base station for a non-MTC device reselect a base station to be connected Making an MTC device connected to a base station for a non MTC device reconnect to another base station (for example, a base station for an MTC device)

Performing handover (handover) to another base station (for example, a base station for an MTC device) with respect to an MTC device connected to a base station for a non-MTC device Activating a policy only for a predetermined time period (Ex: AM 1:00-AM 4:00) (This policy is used in combination with at least one of the above policies.)

(Policy Relating to Communication Traffic)

Processing communication traffic related to an MTC related application with a base station for an MTC device Processing communication traffic related to a non MTC related application with a base station for a non MTC device Processing communication traffic related to a call with a predetermined base station (for example, a base station for a non-MTC device)

Processing communication traffic related to a predetermined application (for example, Social Networking Service (SNS) application) with a predetermined base station Processing part of communication traffic relating to a predetermined application (for example, SNS application) with a predetermined base station Processing communication traffic corresponding to a predetermined charging characteristic (for example, flat rate charging) with a predetermined base station Processing communication traffic corresponding to a predetermined charging characteristic (for example, metered type charging) with a predetermined base station Processing communication traffic relating to a predetermined QoS characteristic with a predetermined base station Activating a policy only for a predetermined time period (Ex: AM 1:00-AM 4:00) (This policy is used in combination with at least one of the above policies.)

Figure 29:
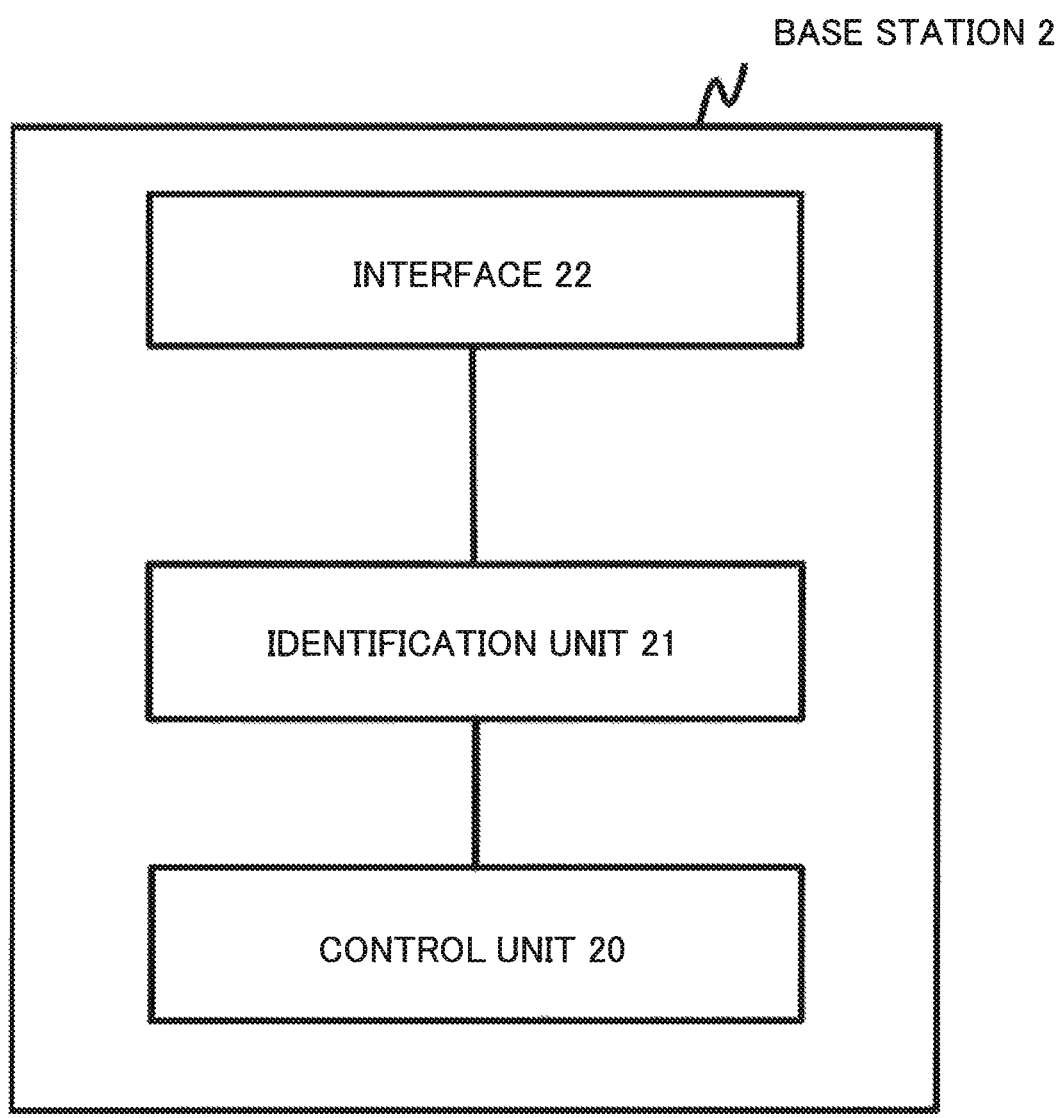
FIG. 29 is a diagram illustrating a configuration example of a base station 2 of the sixth exemplary embodiment.

FIG. 29 is a diagram illustrating a configuration example of the base station 2 according to the sixth exemplary embodiment.

The base station 2 communicates with the controller 8 via the interface 22. The base station 2 receives a policy from the controller 8 via the interface 22. The received policy is stored, for example, in the identification unit 21. For example, the control unit 22 executes processing relating to a connection between the terminal 1 and the base station 2 based on the received policy.

Since the control unit 20 and the identification unit 21 are similar to the configuration example of FIG. 3, a detailed description thereof will be omitted.

Like the base station 2, the MME 5 may have an interface for communicating with the controller 8. The MME 5 receives a policy from the controller 8 via an interface. Based on the received policy, the MME 5 executes processing relating to the connection between the terminal 1 and the base station 2.

Like the base station 2, the control server 6 may have an interface for communicating with the controller 8. The control server 6 receives a policy from the controller 8 via an interface. Based on the received policy, the control server 6 executes processing relating to a connection between the terminal 1 and the base station 2.

As described above, in the sixth exemplary embodiment, the controller 8 centrally manages a policy relating to a connection between the terminal 1 and the base station 2. Therefore, the operation management efficiency of the policy is improved.

Seventh Exemplary Embodiment

A seventh exemplary embodiment of the present invention will be described with reference to the drawings. In the seventh exemplary embodiment, the controller 8 can provision resources of a virtual network. Therefore, the operation management efficiency of the virtual network is improved. A technique of the seventh exemplary embodiment can be applied to any of the first to sixth exemplary embodiments and the below-described embodiments.

Figure 30:
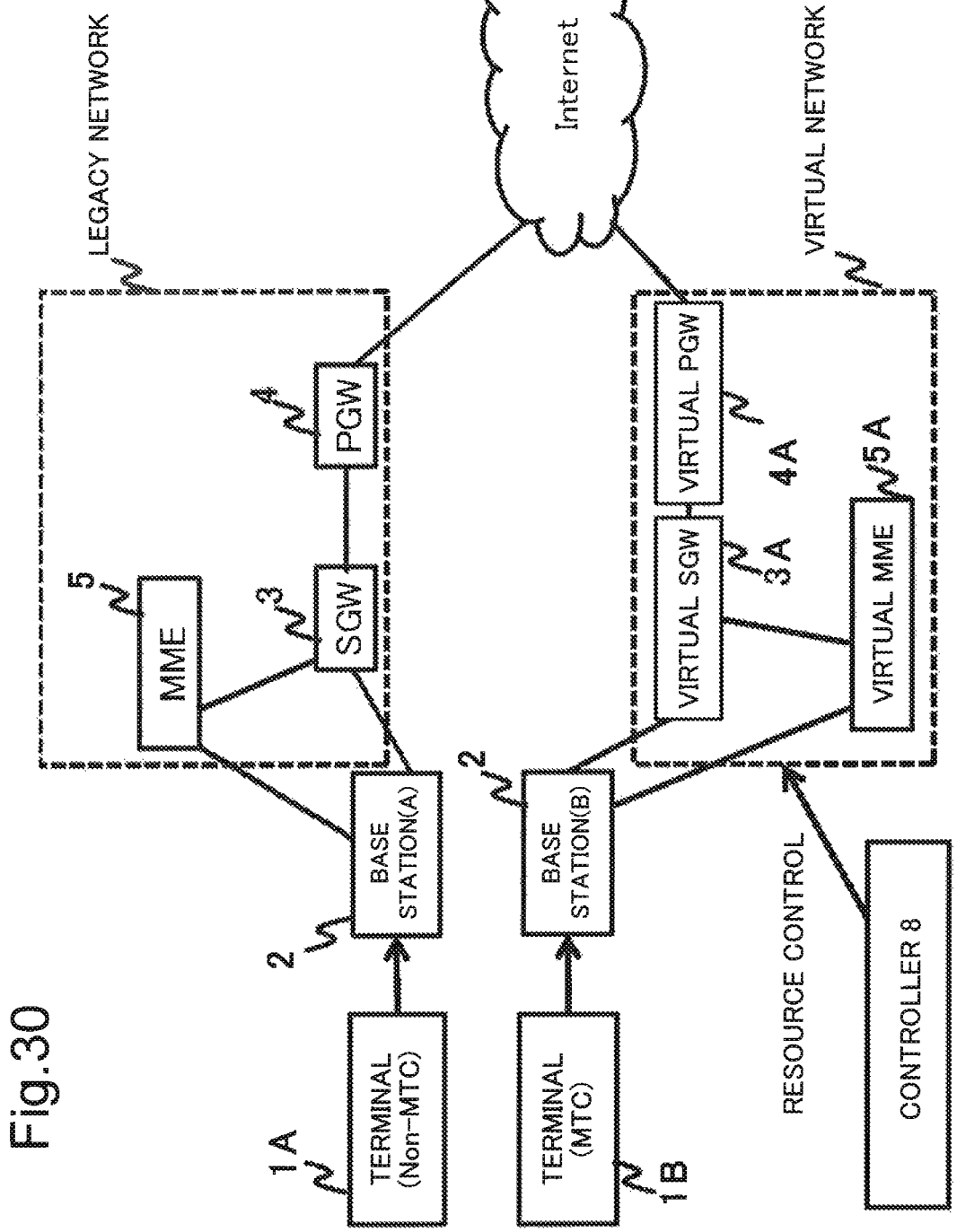
FIG. 30 is a diagram illustrating a configuration example of a communication system of a seventh exemplary embodiment.

FIG. 30 illustrates a configuration example of a communication system of the seventh exemplary embodiment.

The controller 8 provisions resources of a virtual network. For example, in preparation for offloading communication traffic, the controller 8 executes resource allocation for operating a virtual network node (a virtual MME 5A, a virtual SGW 3A, a virtual PGW 4A, or the like). Resources for operating virtual network nodes are, for example, server resources, CPU resources, network resources (switches and routers), and the like. For example, the controller 8 allocates resources to a virtual machine or a server that operates a virtual network node.

For example, the controller 8 can predict a time period during which communication traffic increases and provision resources of a virtual network prior to the time period. The controller 8 can dynamically provision resources of a virtual network in response to an increase in communication traffic.

The terminal 1, the base station 2, the SGW 3, the PGW 4, the MME 5, the virtual SGW 3 A, the virtual PGW 4 A, and the virtual MME 5 A are the same as the configuration examples of the above-described embodiment, and therefore, detailed description thereof will be omitted. The direction of an arrow in the drawing is an example and does not limit the direction of a signal between blocks.

Figure 31:
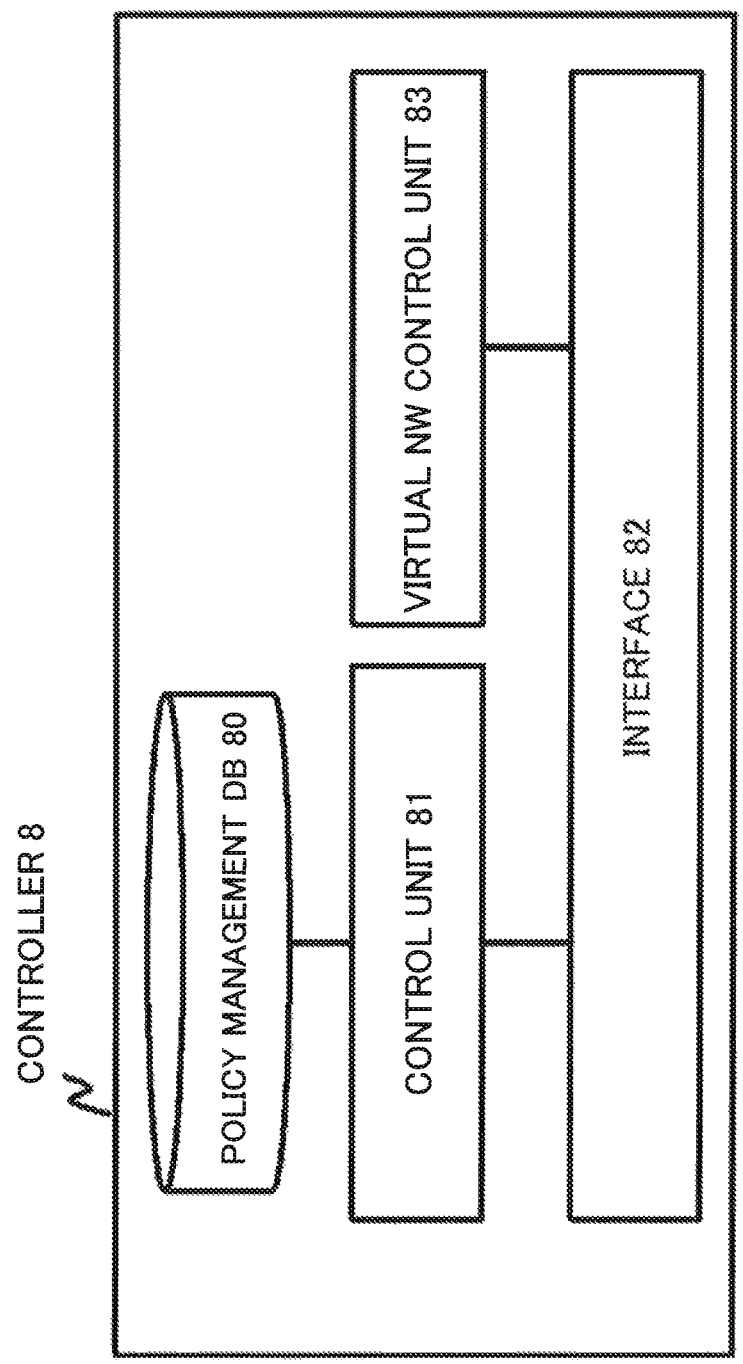
FIG. 31 is a diagram illustrating a configuration example of a controller 8 of the seventh exemplary embodiment.

FIG. 31 illustrates a configuration example of the controller 8 of the seventh exemplary embodiment. In the example of FIG. 31, the controller 8 includes a virtual NW (network) control unit 83 that provisions resources of a virtual network in addition to the configuration illustrated in the sixth exemplary embodiment. The configuration of the controller 8 of the seventh exemplary embodiment is not limited to the example of FIG. 31. For example, the controller 8 of the seventh exemplary embodiment may not have a function (policy management DB 80 or the like) of notifying the base station 2 or the like of a policy on a connection between the terminal 1 and the base station 2. For example, a controller of the sixth exemplary embodiment and a controller of the seventh exemplary embodiment may be mutually different devices.

The virtual NW control unit 83 provisions resources of a virtual network.

The virtual NW control unit 83, for example, allocates resources capable of processing communication traffic by the MTC device to a virtual network prior to the time zone during which communication by the predetermined type of MTC device occurs.

For example, the virtual NW control unit 83 allocates resources for processing a control signal (for example, a control signal relating to a connection request to a network) transmitted by an MTC device to the virtual MME 5A. For example, the virtual NW control unit 83 allocates resources for processing U-Plane (user plane) data transmitted from an MTC device to the virtual SGW 3A and the virtual PGW 4A. The virtual NW control unit 83 may allocate resources for processing communication traffic relating to a predetermined type of an MTC device group to a virtual network. The virtual NW control unit 83 may release resources from a virtual network in a time period during which communication traffic by an MTC device is not generated.

The virtual NW control unit 83, for example, predicts a time period during which communication traffic increases based on an analysis result of communication traffic in a communication system. The virtual NW control unit 83, for example, allocates resources for processing increasing communication traffic to a virtual network based on a prediction result. The virtual NW control unit 83 may analyze communication traffic. The virtual NW control unit 83 may acquire a result of the traffic analysis from a network operator via an OSS/BSS (Operation Support System/Business Support System).

For example, the virtual NW control unit 83 assigns, to the virtual MME 5A, resources for processing a control signal of communication traffic that is expected to increase. For example, the virtual NW control unit 83 allocates resources for processing U-Plane (user plane) data that is expected to increase, to the virtual SGW 3A and the virtual PGW 4A.

The virtual NW control unit 83, for example, allocates resources to a virtual network in response to a disaster such as an earthquake. The virtual NW control unit 83, for example, allocates resources to a virtual network prior to date and time at which an event where a large number of terminal users gather is held.

For example, the virtual NW control unit 83 allocates resources for processing calls and data communication that are expected to increase as a disaster occurs, to the virtual SGW 3A, the virtual PGW 4A, and the virtual MME 5A. For example, the virtual NW control unit 83 allocates resources for processing calls and data communications that are expected to increase due to an event, to the virtual SGW 3A, the virtual PGW 4A, and the virtual MME 5A.

The virtual NW control unit 83, for example, allocates resources to a virtual network based on a performance required for the virtual network. For example, the virtual NW control unit 83 allocates resources to a virtual network in such a way to satisfy an SLA (Service Level Agreement) required for the virtual network.

The virtual NW control unit 83, for example, predicts the amount of communication traffic assumed to flow into a virtual network according to a policy notified to the base station 2 or the like. The virtual NW control unit 83 may predict the amount of communication traffic assumed to flow into a virtual network according to a policy scheduled to be notified to the base station 2 or the like. The virtual NW control unit 83 allocates resources to a virtual network based on a predicted traffic volume. For example, the virtual NW control unit 83 allocates resources required for processing communication traffic assumed to flow into the virtual network to the virtual network. The virtual NW control unit 83 may assign resources necessary for processing communication traffic assumed to flow into a virtual network with a performance satisfying a predetermined SLA to the virtual network.

The control unit 81 of the controller 8 may, for example, notify the base station 2 or the like of a policy on a connection between the terminal 1 and the base station 2 in response to assignment of resources. For example, the control unit 81 may notify the base station 2 or the like of at least one of the policies illustrated in the above-described sixth exemplary embodiment.

Figure 32:
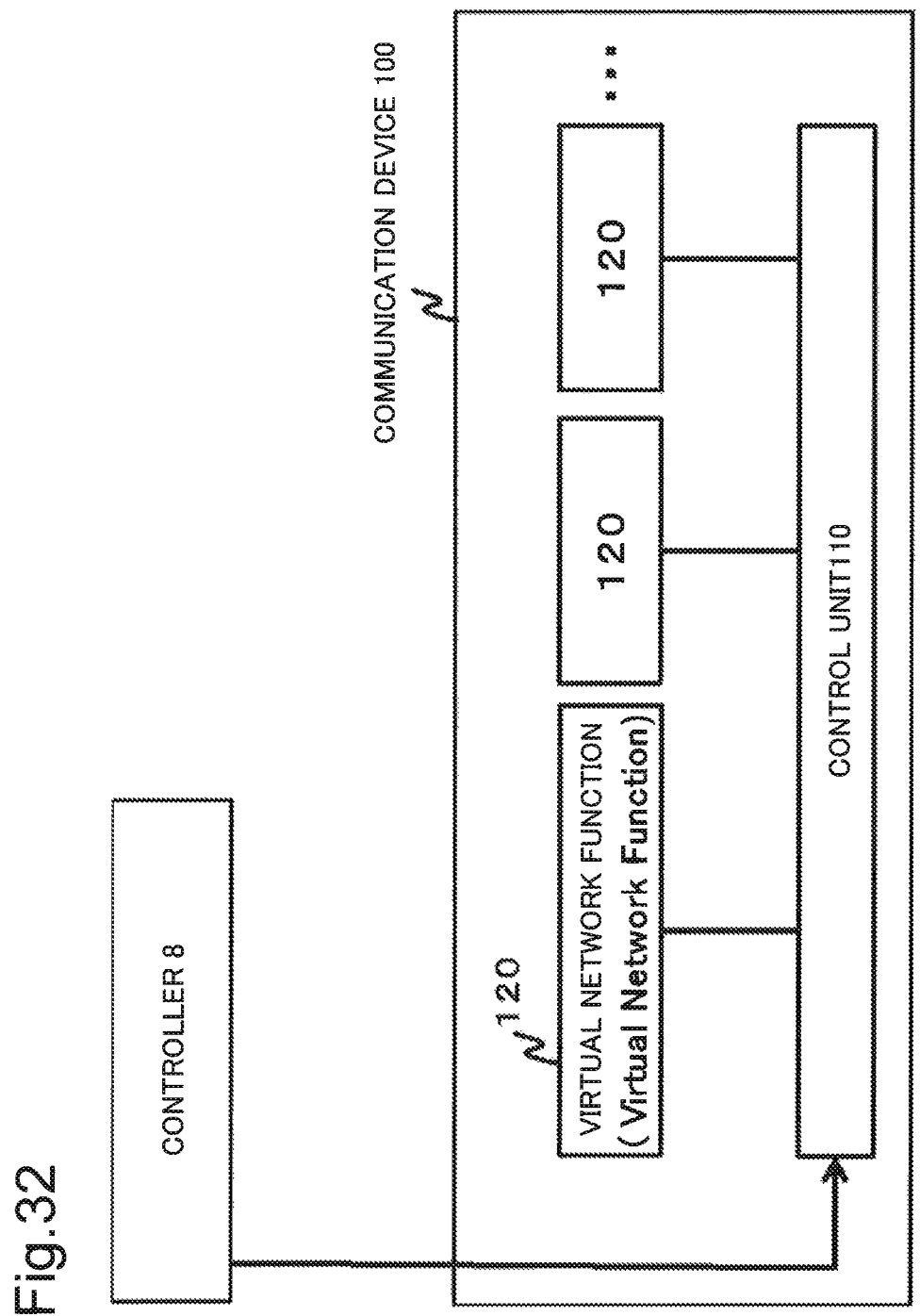
FIG. 32 is a diagram illustrating a configuration example of a communication device 100 of the seventh exemplary embodiment.

FIG. 32 illustrates a configuration example of the communication device 100 according to the seventh exemplary embodiment. The direction of an arrow in the drawing is an example and does not limit the direction of a signal between blocks.

The control unit 110 of the communication device 100 receives at least one instruction of activation, deletion, and migration of a virtual machine for executing the VNF 120 from the virtual NW control unit 83 of the controller 8. The virtual NW control unit 83 can control resources of a virtual network by instructing the control unit 110 to at least one of activation, deletion, and migration of the virtual machine.

Since the control unit 110 and a virtual network function are similar to the configuration example of FIG. 12, a detailed description thereof will be omitted.

As described above, in the seventh exemplary embodiment, the controller 8 can provision resources of a virtual network. Therefore, the operation management efficiency of a virtual network is improved.

Eighth Exemplary Embodiment

An eighth exemplary embodiment of the present invention will be described with reference to the drawings. In the eighth exemplary embodiment of the present invention, an operator of a virtual network can lend the virtual network to an operator of a legacy network. An operator of a virtual network can obtain a usage fee of a virtual network. An operator of a legacy network can virtually enhance the network without investing capital in the legacy network by himself. A technique of the eighth exemplary embodiment can be applied to any of the first to seventh embodiments.

Figure 33:
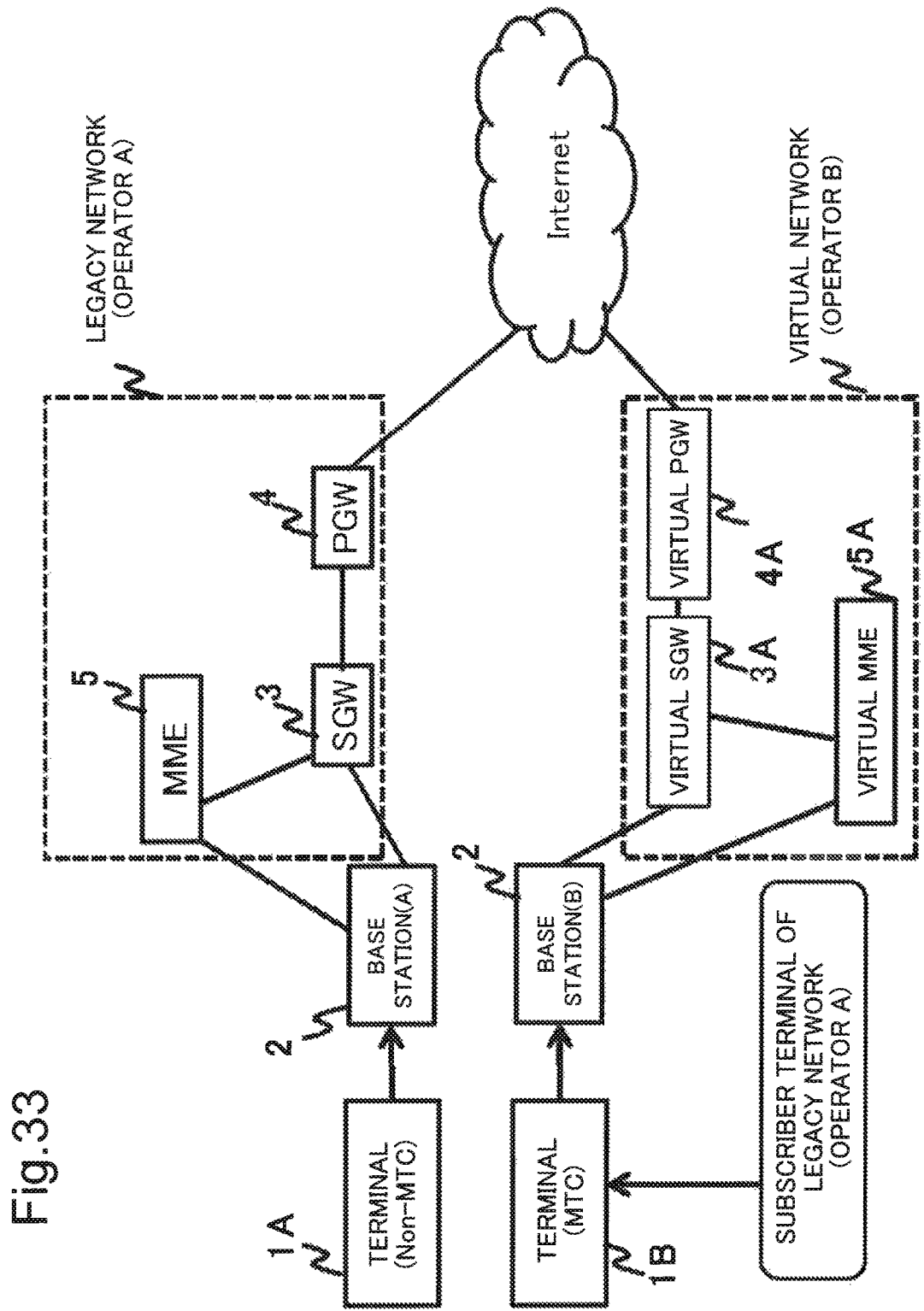
FIG. 33 is a diagram illustrating a configuration example of a communication system of an eighth exemplary embodiment.

FIG. 33 illustrates a configuration example of a communication system of the eighth exemplary embodiment.

In the example of FIG. 33, an operator of a virtual network (an operator: B) lends the virtual network to an operator (an operator: A) of a legacy network. The operator A can reduce a load on a legacy network by offloading communication traffic to a virtual network.

In the example of FIG. 33, the base station 2(B) possessed by the operator B can transmit communication traffic of a subscriber terminal of the operator A to a virtual network. The base station 2(B) can identify communication traffic of a subscriber terminal and transmit identified traffic to a virtual network.

The base station 2 can control a connection between a terminal and a base station according to the attribute of the terminal based on the configuration example illustrated in the above-described exemplary embodiment. In FIG. 33, for example, the base station 2(B) permits a connection request from an MTC device (the terminal 1B) and can refuse a connection request from a non-MTC device (the terminal 1A). For example, the base station 2(A) permits a connection request from a non-MTC device (the terminal 1A) and can refuse a connection request from an MTC device (terminal 1B).

The base station 2(B), for example, processes part of communication traffic of a subscriber terminal of the operator A at the base station 2(B) based on a policy illustrated in the above-described sixth exemplary embodiment. The direction of an arrow in the drawing is an example and does not limit the direction of a signal between blocks.

Figure 34:
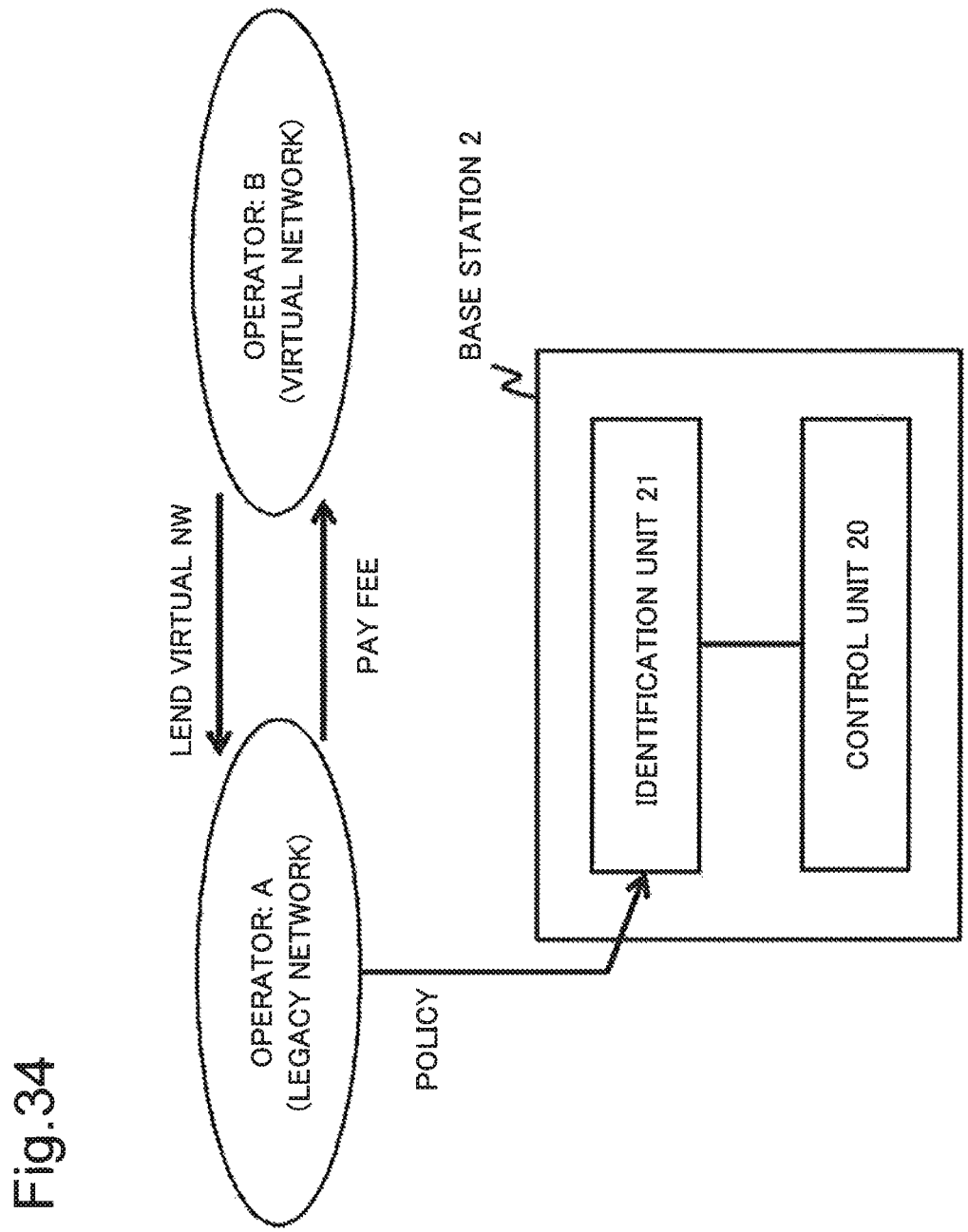
FIG. 34 is a diagram illustrating a configuration example of a communication system of the eighth exemplary embodiment.

FIG. 34 illustrates a configuration example of a communication system according to the eighth exemplary embodiment.

As in the example of FIG. 34, the operator A pays a fee to the operator B for using a virtual network owned by the operator B. The operator A pays a fixed fee to the operator B, for example, on a monthly or yearly basis. For example, the operator A pays a communication fee to the operator B according to the usage amount of a virtual network. For example, the operator A may pay to the operator B a charge corresponding to the resource amount corresponding to a virtual machine assigned to a virtual network for the operator A. The above-described charging method is an example, and the charging method for the operator A is not limited to the above-described example. The direction of an arrow in the drawing is an example and does not limit the direction of a signal between blocks.

The operator A sets a policy relating to a connection between the terminal 1 and the base station 2 to the base station 2. For example, the operator A sets a policy illustrated in the above-described sixth exemplary embodiment in the base station 2. The operator A may set a policy in the MME 5. The base station 2 and the MME 5 select the base station 2 to which the terminal 1 is connected according to the set policy. The operator B of a virtual network may set a policy to the base station 2 or the like in place of the operator A.

Figure 35:
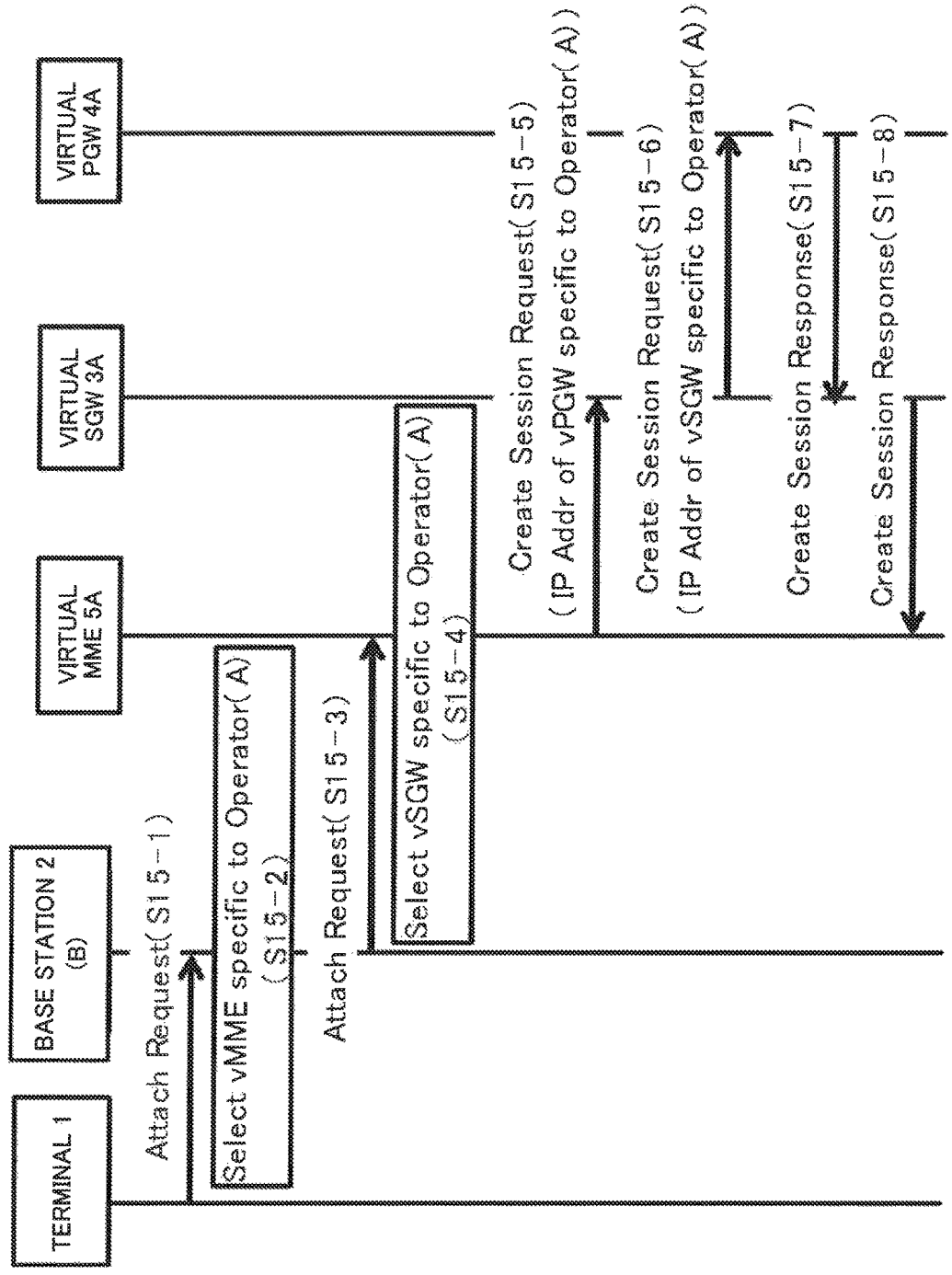
FIG. 35 is a sequence diagram illustrating an operation example of the eighth exemplary embodiment.

FIG. 35 is a sequence diagram illustrating an operation example of the eighth exemplary embodiment.

In order to establish a wireless connection with the base station 2(A), the terminal 1 transmits "Attach Request" to the base station 2(A) (S15-1). In the example of FIG. 35, the terminal 1 is an MTC device. In the example of FIG. 35, it is assumed that a policy permitting a connection request from an MTC device is set to the base station 2(B).

The base station 2(B) can select the dedicated virtual MME 5A for the operator A who has borrowed a virtual network from the operator B ("Select vMME specific to Operator (A)" in S15-2). For example, the base station 2(B) manages the virtual MME 5A for each operator who uses a virtual network. For example, the identification unit 21 of the base station 2 can select the dedicated virtual MME 5A for the operator A.

The base station 2(B) transmits "Attach Request" transmitted from the terminal 1 to the selected virtual MME 5A (S15-3).

Prior to reception of "Attach Request", the virtual MME 5A executes authentication processing of the terminal 1. The virtual MME 5A authenticates the terminal 1 using, for example, the HSS 7 arranged in a virtual network. The virtual MME 5A may authenticate the terminal 1 using the HSS 7 arranged in a legacy network.

The HSS 7 manages, for example, an IMSI of the terminal 1 and information on an operator to which the terminal 1 subscribes in association with each other. For example, during the above-described authentication process, the virtual MME 5A acquires information on an operator to which the terminal 1 subscribes from the HSS 7 and recognizes the operator corresponding to the terminal 1.

The virtual MME 5A starts constructing an EPS bearer. In the example of FIG. 35, the virtual MME 5A assigns a dedicated gateway (the virtual SGW 3A, the virtual PGW 4A) to the operator A who has borrowed a virtual network from the operator B. Even when another operator (for example, an operator C) borrows a virtual network from the operator B, different gateways are assigned to the operator A and the operator C, respectively. When different gateways are assigned to operators using a virtual network, communication traffic for each operator is virtually separated, by which the security is improved.

In response to reception of "Attach Request", the virtual MME 5A selects the virtual SGW 3 dedicated to the operator A ("Select vSGW specific to Operator (A)" in S15-4).

For example, the identification unit 51 of the virtual MME 5A manages a virtual entity (the virtual SGW 3A, the virtual PGW 4A, or the like) for each operator who uses a virtual network. The control unit 50 of the virtual MME 5A selects the virtual SGW 3A corresponding to the operator A according to the identification unit 51.

For example, the control unit 50 of the virtual MME 5A selects the virtual SGW 3A to be assigned to the operator A from a virtual entity managed by the identification unit 51. The identification unit 51 associates the virtual SGW 3A selected by the control unit 50 with identification information of an operator to which the virtual SGW 3A is assigned. When selecting the virtual SGW 3A, the control unit 50 selects a virtual entity to which identification information of an operator is not associated among virtual entities managed by the identification unit 51.

The virtual MME 5A transmits a "Create Session Request" message to the virtual SGW 3A selected in S15-4 (S15-5). The virtual MME 5A assigns the dedicated virtual PGW 4A to the operator A who has borrowed a virtual network from the operator B. The virtual MME 5A includes an IP address of the virtual PGW 4A assigned to the operator A in a "Create Session Request" message.

For example, the identification unit 51 of the virtual MME 5A manages a virtual entity (the virtual SGW 3A, the virtual PGW 4A, or the like) for each operator who uses a virtual network. The control unit 50 of the virtual MME 5A includes an IP address of the virtual PGW 4A corresponding to the operator A in a "Create Session Request" message according to the identification unit 51.

For example, the control unit 50 of the virtual MME 5A selects the virtual PGW 4A to be allocated to the operator A from a virtual entity managed by the identification unit 51. The identification unit 51 associates the virtual PGW 4A selected by the control unit 50 with identification information of an operator to which the virtual PGW 4A is assigned. When selecting the virtual PGW 4A, the control unit 50 selects a virtual entity to which identification information of an operator is not associated among virtual entities managed by the identification unit 51.

In response to reception of the "Create Session Request" message from the virtual MME 5A, the virtual SGW 3A transmits the "Create Session Request" message to the virtual PGW 4A specified by the received message (S15-6). The virtual SGW 3A includes its own IP address in a message to be transmitted to the virtual PGW 4A.

The virtual PGW 4A returns a "Create Session Response" message to the virtual SGW 3A (S15-7).

The virtual SGW 3A returns a "Create Session Response" message to the virtual MME 5A (S15-8). In response to reception of the "Create Session Response" message, the virtual MME 5A notifies the base station 2 of information for establishing a session between the virtual SGW 3A and the base station 2.

By the operation exemplified in FIG. 35 as described above, an EPS bearer is constructed in the virtual network. A subscriber terminal (the terminal 1 in FIG. 35) of a legacy network of the operator A communicates via the constructed EPS bearer.

Figure 36:
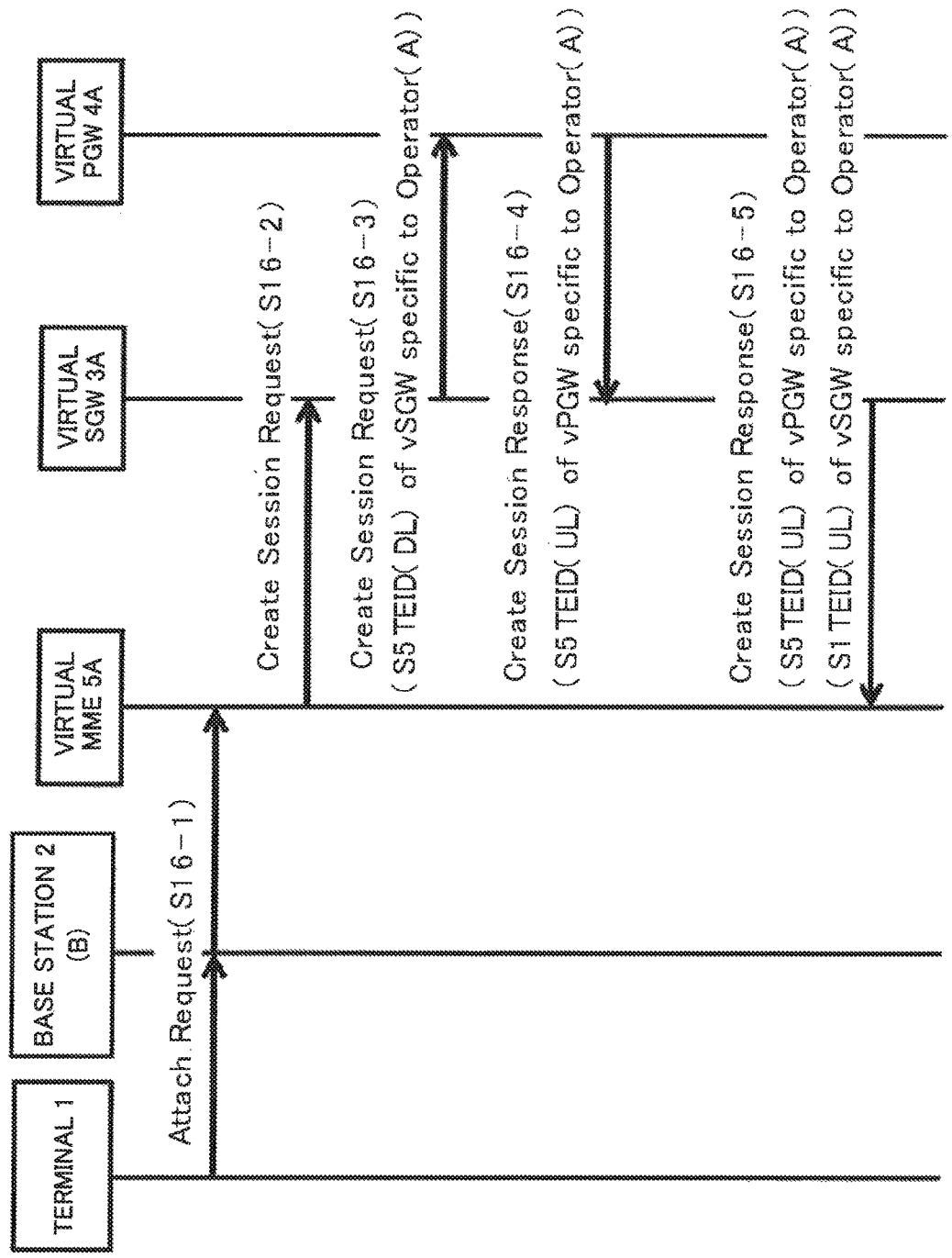
FIG. 36 is a sequence diagram illustrating another operation example of the eighth exemplary embodiment.

FIG. 36 is a sequence diagram illustrating another operation example of the eighth exemplary embodiment.

The base station 2(B) transmits "Attach Request" transmitted from the terminal 1 to the virtual MME 5A (S16-1). In the example of FIG. 36, the terminal 1 is an MTC device. Further, in the example of FIG. 36, it is assumed that a policy permitting a connection request from an MTC device is set to the base station 2(B).

Prior to reception of "Attach Request", the virtual MME 5A executes authentication processing of the terminal 1. The virtual MME 5A authenticates the terminal 1 using, for example, the HSS 7 arranged in a virtual network. The virtual MME 5A may authenticate the terminal 1 using the HSS 7 arranged in a legacy network.

The HSS 7 manages, for example, an IMSI of the terminal 1 and information on an operator to which the terminal 1 subscribes in association with each other. For example, during the above-described authentication process, the virtual MME 5A acquires information on an operator to which the terminal 1 subscribes from the HSS 7 and recognizes the operator corresponding to the terminal 1.

The virtual MME 5A transmits a "Create Session Request" message to the virtual SGW 3A (S16-2). For example, the virtual MME 5A includes information on an operator corresponding to the terminal 1 in "Create Session Request". The virtual MME 5A starts constructing an EPS bearer by sending a "Create Session Request" message.

In the example of FIG. 36, the virtual MME 5A, the virtual SGW 3A, and the virtual PGW 4A assign dedicated TEIDs to bearers relating to the operator A who has borrowed a virtual network from the operator B, respectively. Even when another operator (for example the operator C) borrows a virtual network from the operator B, bearers for the operator A and the operator C are assigned their own operator-specific TEIDs. By assigning a unique TEID to each operator using a virtual network, the security is improved.

The virtual SGW 3A transmits a "Create Session Request" message to the virtual PGW 4A (S16-3). The virtual SGW 3A assigns a TEID for the operator A to the terminal 1 which is a subscriber terminal of the operator A. The virtual SGW 3A includes a selected TEID in the "Create Session Request" message. The virtual SGW 3A may include information on an operator corresponding to the terminal 1 in "Create Session Request".

For example, the virtual SGW 3A manages a candidate TEID group to be assigned to each operator for each operator using a virtual network. For example, the virtual SGW 3A manages a candidate TEID group to be assigned to the operator A and a candidate TEID group to be assigned to the operator C. The virtual SGW 3A selects a TEID based on operator information notified from the virtual MME 5A.

For example, the virtual SGW 3A selects a TEID to be assigned to the operator A from a TEID group. The virtual SGW 3A associates the selected TEID with identification information of an operator to which the TEID is assigned. When selecting a TEID, the virtual SGW 3A selects a TEID to which identification information of an operator is not associated.

The virtual PGW 4A returns a "Create Session Response" message to the virtual SGW 3A (S16-4). The virtual PGW 4A assigns a TEID for the operator A to the terminal 1 which is a subscriber terminal of the operator A. The virtual PGW 4A includes the selected TEID in the "Create Session Response" message. For example, the virtual PGW 4 A selects a TEID in a similar manner to the virtual SGW 3A.

The virtual SGW 3A transmits a "Create Session Response" message to the virtual MME 5A (S16-5). The virtual SGW 3A assigns a TEID for the operator A to the terminal 1 which is a subscriber terminal of the operator A. The virtual SGW 3A includes the selected TEID in the "Create Session Response" message. In response to reception of the "Create Session Response" message, the virtual MME 5A notifies the base station 2(B) of information for establishing a session between the virtual SGW 3A and the base station 2(B).

By the operation illustrated in FIG. 36, an EPS bearer is constructed in a virtual network. A subscriber terminal (the terminal 1 in FIG. 36) of a legacy network of the operator A communicates via the constructed EPS bearer.

Figure 37:
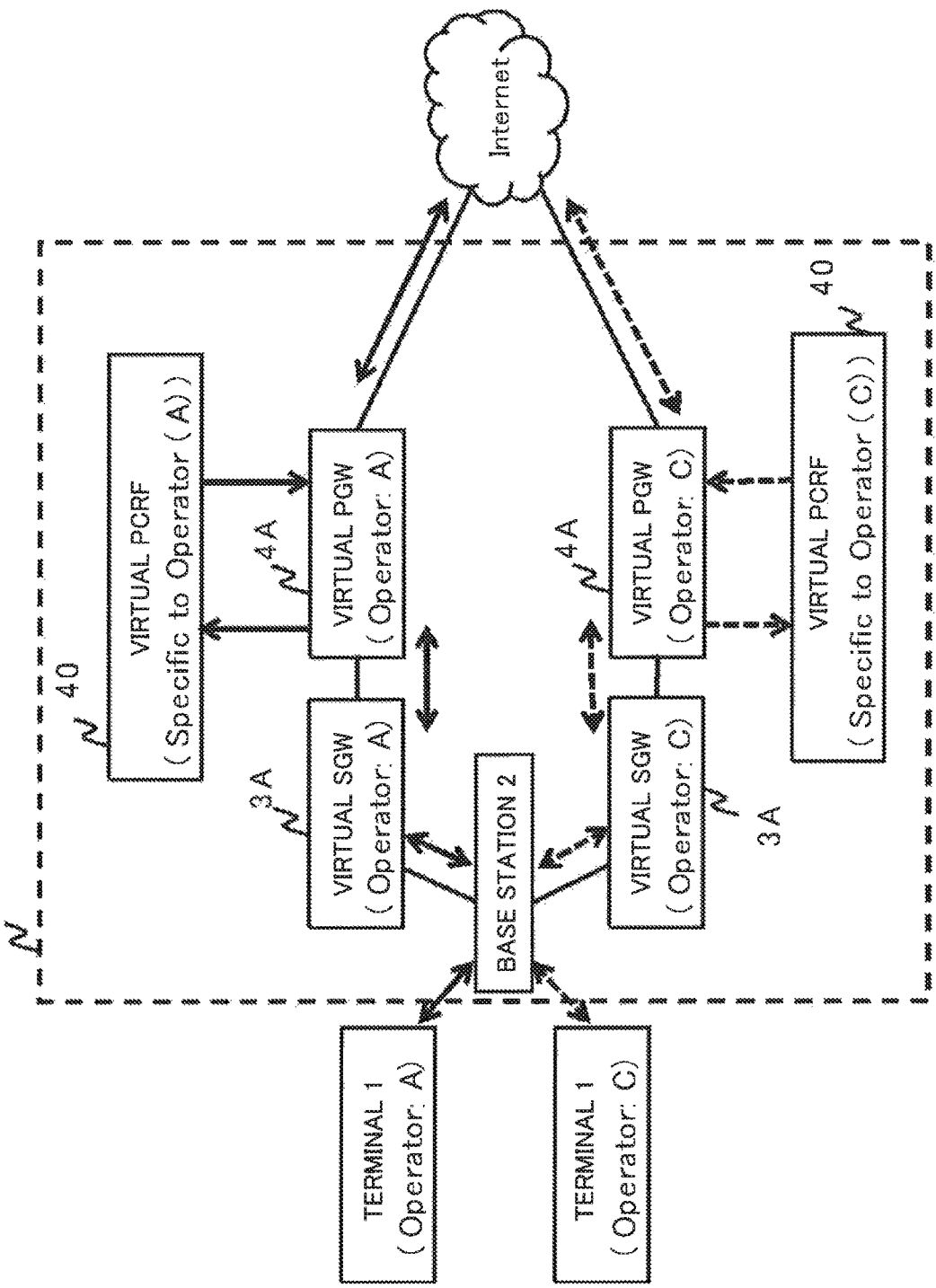
FIG. 37 is a diagram illustrating another configuration example of a communication system of the eighth exemplary embodiment.

FIG. 37 is a diagram illustrating another configuration example of the communication system of the eighth exemplary embodiment.

FIG. 37 illustrates a configuration example in which an operator (the operator B) of a virtual network monitors communication traffic of an operator borrowing a virtual network (in FIG. 37, the operator A and the operator C). In the example of FIG. 37, the virtual SGW 3A and the virtual PGW 4A are arranged for each operator who has borrowed a virtual network. The direction of an arrow in the drawing is an example and does not limit the direction of a signal between blocks.

In the example of FIG. 37, a virtual PCRF (Policy and Charging Rule Function) 40 arranged in a virtual network monitors communication traffic. In the example of FIG. 37, the virtual PCRF 40 is arranged for each operator (the operator A, the operator C) who has borrowed a virtual network from the operator B.

The operator B of a virtual network places the virtual PCRF 40 in the virtual network, for example, by the controller 8 (not illustrated). For example, the virtual NW control unit 83 of the controller 8 places the virtual PCRF 40 for monitoring communication traffic relating to the operator A using a virtual network in a virtual network.

For example, each of the virtual PGWs 4A is connected to the virtual PCRF 40 for the operator associated with each virtual PGW 4A. Each of the virtual PGWs 4A counts the number of packets by the PCEF (Policy and Charging Enforcement Function) function. Each virtual PGW 4A transfers a count result of the number of packets to the virtual PCRF 40 connected to each virtual PGW 4A.

An operator of a virtual network (the operator B) monitors the number of packets counted by each virtual PCRF 40 and acquires the communication amount for each operator using a virtual network. For example, the operator B requests each operator to use a virtual network based on the communication amount of each operator.

As described above, in the eighth exemplary embodiment, an operator of a virtual network can lend the virtual network to an operator of a legacy network. Therefore, the operator of the virtual network can obtain a usage fee of the virtual network. The operator of the legacy network can virtually enhance the network without investing capital in the legacy network by himself.

Figure 38:
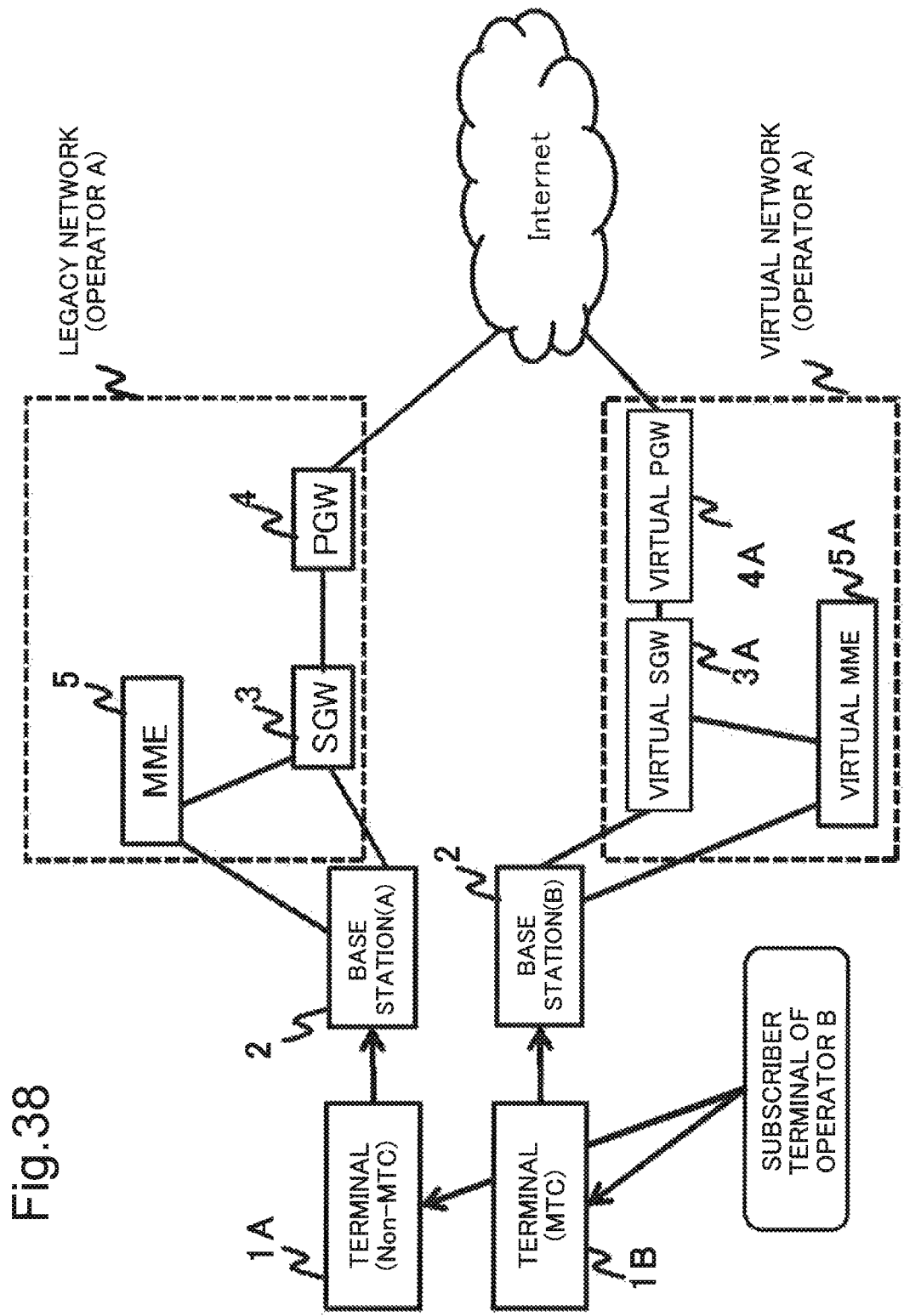
FIG. 38 is a diagram illustrating another configuration example of a communication system of the eighth exemplary embodiment.

FIG. 38 is a diagram illustrating another configuration example of the communication system of the eighth exemplary embodiment.

In FIG. 38, the operator B is a business entity that provides a mobile communication service by borrowing a communication network possessed by the operator A. The operator B is a so-called virtual mobile network operator (MVNO: Mobile Virtual Network Operator). The operator A is a mobile communication operator (MNO: Mobile Network Operator) possessing a communication network, and lends the communication network to the operator B. The operator A requests the operator B for a usage fee of the communication network. The direction of an arrow in the drawing is an example and does not limit the direction of a signal between blocks.

There are two types (in the case of carrying a gateway: Layer 2 connection type, in the case of not carrying a gateway: Layer 3 connection type) of MVNO depending on whether or not to carry a gateway (for example, P-GW) capable of terminating a tunneling protocol (for example, GTP: General Packet Radio Service (GPRS) Tunneling Protocol) used in a mobile network. FIG. 38 illustrates a configuration example in cases in which the operator B is a layer 3 connection type MVNO. When the operator B is a layer 2 connection type, the operator B possesses, for example, a PGW having a function corresponding to the PGW 4 and the virtual PGW 4A in FIG. 38 separately from the operator A.

In FIG. 38, the operator A, for example, lends a legacy network and a virtual network to the operator B.

The base station 2(A) of the operator A transmits communication traffic of a terminal identified as a non-MTC device among subscriber terminals of the operator B to a legacy network. The base station 2(A) of the operator A transmits, for example, a rejection notification indicating that a connection request is rejected to a terminal identified as an MTC device among subscriber terminals of the operator B.

The base station 2(B) of the operator A transmits communication traffic of a terminal identified as an MTC device among subscriber terminals of the operator B to a virtual network. The base station 2(A) and the base station 2(B) of the operator A can also perform the same processing as processing for a subscriber terminal of the operator B, also for a subscriber terminal of the operator A.

For example, the operator A requests the operator B for a usage fee according to the communication amount of a subscriber terminal of the operator B in a legacy network and a virtual network and the number of subscriber terminals.

As described above, in the eighth exemplary embodiment, an operator possessing a communication network can lend the communication network to an operator who does not have the communication network.

Although exemplary embodiments of the present invention have been described above, the present invention is not limited to each of the above-described exemplary embodiments. The present invention can be carried out based on modification, substitution, and adjustment of each embodiment.

The present invention can also be carried out by arbitrarily combining the exemplary embodiments. In other words, the present invention includes various kinds of variations and modifications that can be realized according to the entire disclosure content and technical idea herein.

The present invention is also applicable to the technical field of SDN (Software-Defined Network).

In the present invention, a computer, a CPU (Central Processing Unit), an MPU (Micro-Processing Unit), or the like of the terminal 1 or network nodes (the base station (eNB) 2, the SGW 3, the PGW 4, the MME 5) may execute a software (program) for realizing a function of the exemplary embodiments described above. The terminal 1 or each network node may acquire a software (program) for realizing a function of each of the above-described embodiments via a variety of storage media such as CD-R (Compact Disc Recordable) or a network. A program acquired by the terminal 1 or each network node and a storage medium storing the program constitute the present invention. For example, a software (program) may be stored in advance in a predetermined storage unit included in the terminal 1 or each network node. A computer, CPU, MPU, or the like of the terminal 1 or each network node may read and execute a program code of an acquired software (program). Therefore, the terminal 1 or each network node executes the same processing as the processing of the terminal 1 or each network node in each of the exemplary embodiments described above.

REFERENCE SIGNS LIST 1 terminal
1A non-MTC device
1B MTC device
2 base station
3 SGW
3A virtual SGW
4 PGW
4A virtual PGW
5 MME
5A virtual MME
6 control server
7 HSS
8 controller
10 message generation unit
11 communication unit
12 selection unit
20 control unit
21 identification unit
22 interface
40 virtual PCRF
50 control unit
51 identification unit
60 control unit
61 identification unit
80 policy management DB
81 control unit
82 interface
83 virtual NW control unit
100 communication device
110 control unit
120 virtual network function

The invention claimed is:
1. A base station comprising:
at least one memory storing program instructions; and
at least one processor configured to execute the program instructions to:
receive from a communication terminal a message requesting a connection with a wireless network;
identify a type of the communication terminal based on information on an attribute of the communication terminal included in the received message;
determine whether or not a connection between the base station which has received the message from the communication terminal and the communication terminal is possible based on the type of the communication terminal identified by the message;
reject the requested connection when the identified type of the communication terminal indicates a predetermined specific terminal; and
transmit an instruction, to the communication terminal, indicating that the message is to be retransmitted to a specific base station which is prepared for the predetermined specific terminal.

2. The base station according to claim 1, wherein, said at least one processor is further configured to execute the program instructions to transmit, to the communication terminal, a rejection notification indicating rejection of the requested connection in response to a neighbor base station of the base station being the specific base station.

3. The base station according to claim 2, wherein said at least one processor is further configured to execute the program instructions to transmit information on the specific base station corresponding to the type of the communication terminal based on broadcasted information relating to parameters being set and a cell covered by the specific base station received from the neighbor base station.

4. The base station according to claim 1, wherein said at least one processor is further configured to execute the program instructions to determine whether or not the connection is possible based on the type of the communication terminal identified by information indicating priority of the communication terminal included in the message.

5. The base station according to claim 1, wherein said at least one processor is further configured to execute the program instructions to determine whether or not the connection is possible based on the type of the communication terminal identified by an LAPI (Low Access Priority Indicator) included in the message.

6. The base station according to claim 1, wherein said at least one processor is further configured to execute the program instructions to transmit a control signal relating to a connection of the communication terminal to an MME (Mobility Management Entity) according to the identified type of the communication terminal.

7. The base station according to claim 6, wherein the MME is a virtual MME in which a function of an MME is operated by a virtual machine.

8. A communication terminal which communicates with a wireless network, comprising:
at least one memory storing program instructions; and
at least one processor configured to execute the program instructions to:
receive broadcast information on a base station from the wireless network, wherein the broadcast information includes information indicating a type of base station corresponding to a type of communication terminal;
identify the type of the base station based on the received broadcast information;
select a specific base station corresponding to the type of the communication terminal; and
transmit a message requesting a connection with the wireless network to the specific base station.

9. The communication terminal according to claim 8, wherein said at least one processor is further configured to execute the program instructions to transmit the message including information indicating priority of the communication terminal as an attribute of the communication terminal to be used for identifying a type of the communication terminal to the specific base station corresponding to the type of the communication terminal.

10. The communication terminal according to claim 8, wherein said at least one processor is further configured to execute the program instructions to transmit the message including an LAPI (Low Access Priority Indicator) as an attribute of the communication terminal to be used for identifying a type of the communication terminal to the specific base station corresponding to the type of the communication terminal.

11. A communication method comprising:
receiving, at a base station, from a communication terminal a message requesting a connection with a wireless network;
identifying a type of the communication terminal based on information on an attribute of the communication terminal included in the received message;
determining whether or not a connection between the base station which has received the message from the communication terminal and the communication terminal is permitted based on the type of the communication terminal identified by the message;
rejecting the requested connection when the identified type of the communication terminal indicates a predetermined specific terminal; and
transmitting an instruction, to the communication terminal, indicating that the message is to be retransmitted to a specific base station which is prepared for the predetermined specific terminal.

12. The communication method according to claim 11, wherein a rejection notification indicating rejection of the requested connection is transmitted to the communication terminal in response to a neighbor base station of the base station being the specific base station.

13. The communication method according to claim 11, wherein whether or not the connection is possible is determined based on the type of the communication terminal identified by information indicating priority of the communication terminal included in the message.

14. The communication method according to claim 11, wherein whether or not the connection is possible is determined based on an LAPI (Low Access Priority Indicator) included in the message.

15. The communication method according to claim 11, wherein a control signal relating to connection of the communication terminal is transmitted to an MME (Mobility Management Entity) based on the identified type of the communication terminal.

* * * * *

UNITED STATES PATENT AND TRADEMARK OFFICE
CERTIFICATE OF CORRECTION

PATENT NO. : 10,524,163 B2
APPLICATION NO. : 15/528156
DATED : December 31, 2019
INVENTOR(S) : Makoto Fujinami It is certified that error appears in the above-identified patent and that said Letters Patent is hereby corrected as shown below:

On the Title Page

Item (56), Column 2, Foreign Patent Documents, Line 1; After "3/2015", insert --¶JP 2009-118356 A 5/2009--

Page 2, Column 2, Other Publications, Line 6; After "2016-560066.", insert --¶China Unicom, Generalize the environment of functions and nodes to cover NFV (Network Function Virtualization) scenarios [online], 3GPP TSG SA WG3 (Security) Meeting #72 S3-130641, Jun. 23, 2013, [retrieved on Jan. 15, 2016], URL: http://www.3gpp.org/ftp/tsg_sa/WG3_Security/TSGS3_72_Qingdao/Docs/S3-130892.zip--

In the Specification

Column 22, Line 34; Delete "(511-3)." and insert --(S11-3).-- therefor

Signed and Sealed this
Twenty-sixth Day of May, 2020

Andrei Iancu
*Director of the United States Patent and Trademark Office*